(12) United States Patent
Ohzeki et al.

(10) Patent No.: US 6,566,044 B2
(45) Date of Patent: May 20, 2003

(54) SILVER HALIDE PHOTOGRAPHIC MATERIAL

(75) Inventors: Katsuhisa Ohzeki, Kanagawa (JP); Tetsuo Nakamura, Kanagawa (JP); Takanori Hioki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/816,062

(22) Filed: Mar. 26, 2001

(65) Prior Publication Data

US 2002/0110764 A1 Aug. 15, 2002

(30) Foreign Application Priority Data

| Mar. 27, 2000 | (JP) | ................................... | 2000-086489 |
| Mar. 29, 2000 | (JP) | ................................... | 2000-091825 |
| Aug. 7, 2000 | (JP) | ................................... | 2000-238642 |

(51) Int. Cl.$^7$ .............................. G03C 1/08; G03C 1/12
(52) U.S. Cl. ....................... 430/572; 430/570; 430/574; 430/573; 430/576; 430/577; 430/580; 430/581; 430/583; 430/585; 430/586; 430/589; 430/567; 430/569; 430/600; 430/945; 430/963
(58) Field of Search .................... 430/570, 572, 430/573, 574, 576, 577, 580, 581, 583, 585, 586, 589, 567, 569, 600, 963, 945

(56) References Cited

U.S. PATENT DOCUMENTS

| 3,486,902 A | | 12/1969 | Kalenda | |
| 3,854,953 A | * | 12/1974 | Shiba et al. | ................. 430/589 |
| 5,057,406 A | * | 10/1991 | Usagawa et al. | ............ 430/522 |
| 5,397,693 A | * | 3/1995 | Kawata et al. | ................ 430/581 |
| 5,547,828 A | * | 8/1996 | Hioki et al. | ................. 430/597 |
| 5,744,287 A | * | 4/1998 | Roberts et al. | .............. 430/363 |
| 6,465,166 B1 | * | 10/2002 | Kobayashi et al. | ......... 430/581 |

FOREIGN PATENT DOCUMENTS

| FR | 1513840 | * | 3/1967 |
| JP | 2791499 | | 6/1988 |
| JP | 2000-63690 | | 2/2000 |

OTHER PUBLICATIONS

Research Disclosure 17643, Eastman Kodak Company, 17643.*
Patent Abstracts of Japan—JP 61–282834 (Dec. 13, 1986).
Patent Abstracts of Japan—JP 8–272029 (Oct. 18, 1996).
Patent Abstracts of Japan—JP 3–107140 (May 7, 1991).
Patent Abstracts of Japan—JP 61–279851 (Dec. 10, 1986).
European Search Report—Jul. 25, 2001.

* cited by examiner

*Primary Examiner*—Janet Baxter
*Assistant Examiner*—Amanda C. Walke
(74) *Attorney, Agent, or Firm*—Sughrue Mion, PLLC

(57) ABSTRACT

The present invention provides a silver halide photographic material that is excellent in photographic speed as well as image graininess and exhibits low residual color even after rapid processing. The silver halide photographic material contains a compound represented by formula (I) and a compound represented by formula (II), as defined.

12 Claims, No Drawings

SILVER HALIDE PHOTOGRAPHIC MATERIAL

FIELD OF THE INVENTION

The present invention relates to silver halide photographic emulsions and silver halide photographic materials using said emulsions. More specifically, the present invention provides silver halide photographic emulsions exhibiting an excellent solution storage stability and silver halide photographic materials exhibiting low fog, excellent graininess and less residual color after rapid processing.

BACKGROUND OF THE INVENTION

It is well known that sensitizing dyes used for spectral sensitization have noticeable effects on the performance of silver halide photographic materials. Trivial structural changes of sensitizing dyes often give an extreme influence on various photographic properties such as speed, fog, storage stability, residual color (i.e. , coloration after processing) or graininess. Similar phenomena are observed when two or more kinds of sensitizing dyes are used together. In both cases, it is substantially impossible to predict such influences in advance. Hence, emulsion researchers have synthesized a vast number of sensitizing dyes and studied the photographic effects of various combinations of those sensitizers for many years In spite of such efforts, the prediction of the photographic properties obtained by the use of sensitizing dyes is still almost impossible.

While photographic materials are expected to have higher speeds as well as better image quality, rapider photographic processing and reduction of processing waste for environmental protection are also urgently demanded. Therefore, technologies to achieve a high photographic speed by spectrally sensitizing silver halide grains without causing adverse effects such as fog or residual color are becoming more and more important.

Tabular grains are advantageous for spectral sensitization as the surface area per grain volume (specific surface area) is large, thus permitting the adsorption of a large amount of sensitizing dyes and improving speed/graininess ratio. On the other hand, the sensitizing dyes tend to remain in the material after processing, and the problem of residual color is serious as compared to the emulsions consisting of regular grains.

Separately, rapid processing that is eagerly expected tends to increase the amount of residual sensitizing dyes in the emulsion, thus making the problem of residual color more serious. Accordingly, techniques of reducing residual color have been earnestly expected.

It is already known that enhancement of the hydrophilic property of sensitizing dyes is effective to reduce residual color. However, the adsorption of hydrophilic dyes on silver halide grains is generally weak, causing adverse effects on the photographic properties of the resulting emulsion including speed reduction. Such a conflict has set a severe limitation on the improvement of residual color.

Moreover, a large amount of sensitizing dye adsorbed on the surface of tabular grains hinders the function of gelatin as protective colloid, leading to the sticking of grains in particular with high aspect ratios initiated by mutual contact of the main crystal plane. Such grain sticking readily proceeds to aggregation, which causes various adverse effects such as increase of fog and decrease of sensitivity as well as deterioration of graininess at solution storage of emulsion. The means for dissolving the problems is described in JP-A-6-332091 (The term "JP-A" as used herein means an "unexamined published Japanese patent application"), which discloses a method of adding a fine grain silver iodo-bromide emulsion that is substantially insoluble in water, during or after the chemical sensitization of the main emulsion. However, this method is applicable only to limited types of emulsion; in particular, it is not applicable to silver halide emulsions with high chloride contents. Thus, alternative methods applicable to the emulsions with high chloride content have been expected.

SUMMARY OF THE INVENTION

The object of the present invention is to provide silver halide photographic emulsions having an excellent solution storage stability, and silver halide photographic materials which have high sensitivity and excellent graininess showing reduced residual color ven after rapid processing.

As the result of our extensive study, the problems described above have been solved by the materials and method described in the following embodiments (1) to (14).

(1) A silver halide photographic material comprising at least one silver halide photographic emulsion layer provided on a support, wherein the emulsion layer contains at least one compound represented by formula (I) and at least one compound represented by formula (II):

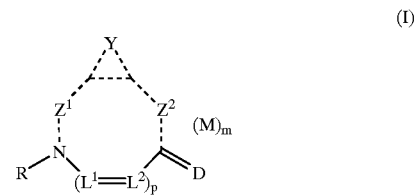

wherein Y represents an atomic group necessary to form a heterocyclic ring or an atomic group necessary to form a benzene ring condensed with a heterocyclic ring, which may further be condensed with another carbocyclic ring or another heterocyclic ring or may be substituted; $Z^1$ and $Z^2$ each represents an atomic group or a single bond necessary to form a nitrogen-containing heterocyclic ring which may be further condensed with another carbocyclic ring or heterocyclic ring or may be substituted; R represents an alkyl group, an aryl group or a heterocyclic ring; D represents a group necessary to form a methine dye; $L^1$ and $L^2$ each represents a methine group; p is an integer of 0 or 1; M represents a counter ion and m is an integer of 0 or 1 or more necessary to neutralize the charge of the molecule:

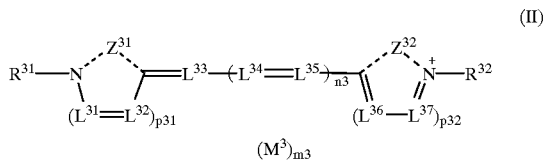

wherein $Z^{31}$ and $Z^{32}$ each represents an atomic group necessary to form anitrogen-containing heterocyclic ring which may be condensed with an aromatic or a non-aromatic carbocyclic ring and may be substituted, provided that the atomic group is not condensed with an aromatic or non-aromatic heterocyclic ring; $R^{31}$ and $R^{32}$ each represents an alkyl group, an aryl group or a heterocyclic ring; $L^{31}$, $L^{32}$, $L^{33}$, $L^{34}$, $L^{35}$, $L^{36}$ and $L^{37}$ each represents a methine group; $p^{31}$ and $p^{32}$ each represents an integer of 0 or 1; $n^3$ represents an integer of from 0, 1, 2, 3 or 4; $M^3$ represents a counter ion and $m^3$ is an integer of 0 or 1 or more necessary to neutralize the charge of the molecule.

(2) The silver halide photographic material as described in (1), wherein Y in formula (I) represents an atomic group necessary to form a pyrrole ring, a furan ring or a thiophene ring that may be condensed with a carbocyclic ring or a heterocyclic ring and may be substituted, or an atomic group to form a benzene ring condensed with a pyrrole ring, a furan ring or a thiophene ring.

(3) The silver halide photographic material as described in (1), wherein Y in formula (I) represents an atomic group necessary to form a pyrrole ring, a furan ring or a thiophene ring that may be condensed with a carbocyclic ring or a heterocyclic ring and may be substituted.

(4) The silver halide photographic material as described in (1), wherein the formula (I) is chosen from formula (Ia):

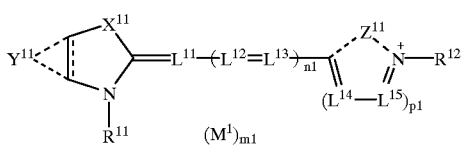

(Ia)

wherein $Y^{11}$ represents an atomic group necessary to form a pyrrole ring, a furan ring, a thiophene ring, an indole ring, a benzofuran ring or a benzothiophene ring, which may be further condensed with a carbocyclic ring or a heterocyclic ring and may be substituted; $X^{11}$ represents an oxygen atom, a sulfur atom, a selenium atom or $NR^{13;\ R11}$, $R^{12}$ and $R^{13}$ each represents an alkyl group, an aryl group or a heterocyclic ring; $Z^{11}$ represents an atomic group necessary to form a nitrogen-containing heterocyclic ring, which may be further condensed with a heterocyclic ring and may be substituted; $L^{11}$, $L^{12}$, $L^{13}$, $L^{14}$ and $L^{15}$ each represents a methine group; $p^1$ represents an integer of 0 or 1; $n^1$ represents an integer of from 0, 1, 2, 3 or 4; $M^1$ represents a counter ion and $m^1$ is an integer of 0 or 1 or more necessary to neutralize the charge of the molecule.

(5) The silver halide photographic material as described in (1), wherein the formula (I) is chosen from formula (Ib):

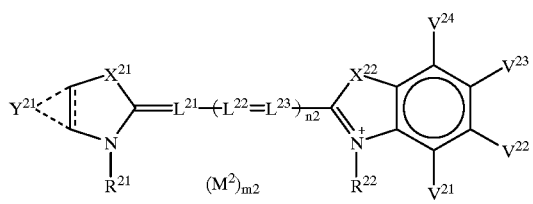

(Ib)

wherein $Y^{21}$ represents an atomic group necessary to form a pyrrole ring, a furan ring or a thiophene ring, which may be further condensed with a carbocyclic ring or a heterocyclic ring and may be substituted; $X^{21}$ and $X^{22}$ each represents an oxygen atom, a sulfur atom, a selenium atom or $NR^{23}$; $R^{21}$, $R^{22}$ and $R^{23}$ each represents an alkyl group, an aryl group or a heterocyclic ring; $V^{21}$, $V^{22}$, $V^{23}$ and $V^{24}$ each represents a hydrogen atom or a substituent, provided that the adjacent two substituents are not linked together to form a saturated or unsaturated condensed ring; $L^{21}$, $L^{22}$ and $L^{23}$ each represents a methine group; $n^2$ represents an integer of from 0, 1, 2, 3 or 4; $M^2$ represents a counter ion and m is an integer of 0 or 1 or more necessary to neutralize the charge of the molecule.

(6) The silver halide photographic material as described in (1) to (5), wherein the formula (II) is chosen from formula (IIa):

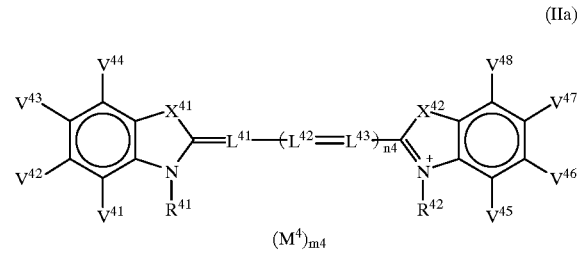

(IIa)

wherein $X^{41}$ and $X^{42}$ each represents an oxygen atom, a sulfur atom, a selenium atom or $NR^{43}$; $V^{41}$, $V^{42}$, $V^{43}$, $V^{44}$, $V^{45}$ $V^{46}$, $V^{47}$, and $V^{48}$ each represents a hydrogen atom or a substituent, provided that the adjacent two substituents may be linked together to form a saturated or unsaturated condensed ring; $R^{41}$, $R^{42}$ and $R^{43}$ each represents an alkyl group, an aryl group or a heterocyclic ring; $L^{41}$, $L^{42}$ and $L^{43}$ each represents a methine group; $n^4$ represents an integer of from 0, 1, 2, 3 or 4; $M^4$ represents a counter ion and $m^4$ is an integer of 0 or 1 or more necessary to neutralize the charge of the molecule.

(7) The silver halide photographic material as described in (1) to (5), wherein the formula (II) is chosen from formulae (III) or (IV):

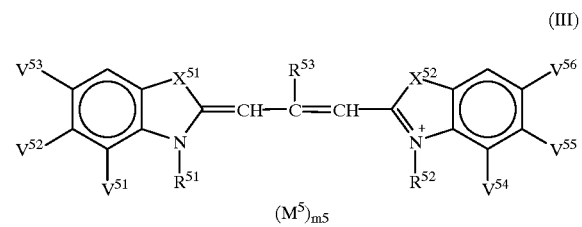

(III)

wherein $X^{51}$ and $X^{52}$ each represents an oxygen atom or a sulfur atom; $V^{51}$, $V^{52}$, $V^{53}$, $V^{54}$, $V^{55}$ and $V^{56}$ each represents a hydrogen atom or a substituent which that the adjacent two substituents are not linked together to form a saturated or unsaturated condensed ring; $R^{51}$, $R^{52}$ and $R^{53}$ each represents an alkyl group, an aryl group or a heterocyclic ring; $M^5$ represents a counter ion and $m^5$ is an integer of 0 or 1 or more necessary to neutralize the charge of the molecule:

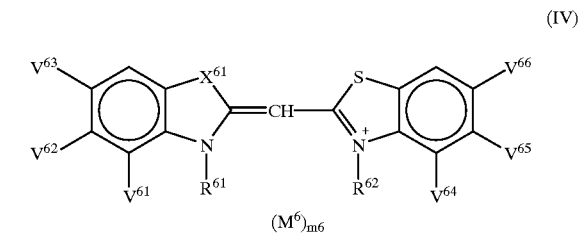

(IV)

wherein $X^{61}$ represents an oxygen atom or a sulfur atom; $V^{61}$, $V^{62}$, $V^{63}$, $V^{64}$, $V^{65}$ and $V^{66}$ each represents a hydrogen atom or a substituent, provided that the adjacent two substituents are not linked together to form a saturated or unsaturated condensed ring; $R^{61}$ and $R^{62}$ each represents an alkyl group, an aryl group or a heterocyclic ring; $M^6$ represents a counter ion and $m^6$ is an integer of 0 or 1 or more necessary to neutralize the charge of the molecule.

(8) The silver halide photographic material as described in (1) to (7), wherein the emulsion of the emulsion layer contains silver halide grains at least 50% of the total projected area of which is tabular grains with aspect ratio of not lower than 2.

(9) The silver halide photographic material as described in (1) to (8), wherein the emulsion layer contains an emulsion subjected to selenium sensitization.

(10) A silver halide photographic material having at least one silver halide photographic emulsion layer provided on a support, wherein the emulsion layer contains at least one compound represented by either of formulae (I), (Ia) and (Ib) shown above and the emulsion being subjected to selenium sensitization.

(11) A silver halide photographic material having at least one silver halide photographic emulsion layer provided on a support, in which the emulsion of the emulsion layer contains silver halide grains containing at least 80 mole % of silver chloride, at least 80% of the total projected area of the silver halide grains are tabular grains with an aspect ratio of not lower than 2, and the emulsion contains at least one methine dye represented by either of formulae (I), (Ia) and (Ib) described above.

(12) The silver halide photographic material as described in (1), wherein the emulsion of the emulsion layer contains silver halide grains containing at least 80 mole % of silver chloride and at least 80% of the total projected area of the silver halide grains is tabular grains with an aspect ratio of not lower than 2.

(13) The silver halide photographic material as described in (12), wherein the tabular grains contain at least 0.1 mole % of silver iodide, and has an outermost layer containing 1 to 6 mole % of silver iodide based on the total amount of silver.

(14) A method for forming an image by carrying out an image exposure and photographic processing for a silver halide photographic material having at least one silver halide emulsion layer provided on a support, wherein said silver halide photographic material is the one recited in (13) above and the total processing time of the photographic material is not longer than 75 sec.

(15) The method of forming an image as described in (14), wherein the image exposure is carried out by scanning exposure based on digital signals.

DETAILED DESCRIPTION OF THE INVENTION

The present invention will be described in detail below.

In the present invention, the term "group" used to describe a specific part of a compound means that that part may be substituted with one or more substituents, which number is allowed to the possible largest value even if it is not substituted itself. For example, "alkyl group" means both of unsubstituted and substituted alkyl groups. Further, the substituents contained in a compound of the present invention mean any type of substituent in spite of presence or absence of substitution.

The substituent, V, which designates a substituent in general with no limitation, includes, for example, a halogen atom, an alkyl group [e.g., an alkyl group including cycloalkyl and bicycloalkyl groups, an alkenyl group including cycloalkenyl and bicycloalkenyl and alkynyl groups], an aryl group, a hetero atom-containing cyclic group (sometimes called heterocyclic group), a cyano group, a hydroxy group, a nitro group, a carboxyl group, an alkoxy group, an aryloxy group, a silyloxy group, a heterocyclo-oxy group, an acyloxy group, a carbamoyloxy group, an alkoxycarbonyloxy group, an aryloxycarbonyloxy group, an amino group [including an anilino group], an ammonio group, an acylamino group, an aminocarbonylamino group, an alkoxyacrbonylamino group, an aryloxycarbonylamino group, a sulfamoylamino group, an alkyl- and arylsufonylamino group, a mercapto group, an alkylthio group, an arylthio group, a heterocyclo-thio group, a sulfamoyl group, a sulfo group, an alkyl- and arylsulfinyl group, an alkyl- and arylsulfonyl group, an acyl group, an alkoxycarbonyl group, an aryloxycarbonyl group, a carbamoyl group, an aryl- and heterocyclo-azo group, an imide group, a phosphino group, a phosphinyl group, a phosphinyloxy group, a phosphinylamino group, a phospho group, a silyl group, a hydrazino group, an ureido group, and other ones well known in the art.

More concretely, V includes halogen atoms such as fluorine, chlorine, bromine and iodine, and alkyl groups containing straight-chain, branched-chain, and cyclic ones all of which may be unsubstituted or substituted. Concrete examples of such alkyl groups include $C_{1-30}$ alkyl groups such as methyl, ethyl, n-propyl, isopropyl, t-butyl, n-octyl, eicosyl, 2-chloroethyl, 2-cyanoethyl or 2-ethylhexyl, unsubstituted or substituted, $C_{3-30}$ cycloalkyl groups such as cyclohexyl, cyclopentyl or 4-n-dodecylcyclohexyl, unsubstituted or substituted, $C_{5-30}$ bicycloalkyl groups such as bicyclo[1.2.2]heptane-2-yl or bicyclo[2.2.2]octane-3-yl, and those containing plural ring structures such as tricyclo. The alkyl group involved in the substituents (for example, the alkyl group in an alkylthio group) to be explained hereinafter includes, in addition to those shown above, alkenyl, cycloalkeyl, bicycloalkenyl and alkynyl groups below. Alkenyl groups include straight-chain, branched-chain or cyclic ones which may be unsubstituted or substituted. More concretely, suitable alkenyl groups include unsubstituted or substituted, $C_{2-30}$ alkenyl groups such as vinyl, allyl, prenyl, geranyl or oleyl, unsubstituted or substituted, $C_{3-30}$ cycloalkenyl groups such as 2-cyclopentene-1-yl or 2-cyclohexene-1-yl, unsubstituted or substituted, $C_{5-30}$ bicycloalkenyl groups such as bicyclo[2.2.1]hepto-2-en-1-yl or bicyclo [2.2.2]octo-2-en-4-yl, unsubstituted or substituted, $C_{2-30}$ alkynyl groups such as ethynyl, propargyl or trimethylsilylethynyl, unsubstituted or substituted, $C_{6-30}$ aryl groups such as phenyl, p-tolyl, naphthyl, m-chlorophenyl or o-hexadecanoylaminophenyl and heterocyclic ring groups. As the heterocyclic ring groups, preferable ones are 5- or 6-membered, unsubstituted or substituted, aromatic or non-aromatic heterocyclic compounds from which one hydrogen atom has been eliminated to form a monovalent group, and more preferable compounds are 5- or 6-membered, $C_{3-30}$ aromatic heterocyclic groups such as 2-furyl, 2-thienyl, 2-pyrimidinyl or 2-benzothiazolyl. Moreover, cationic heterocyclic groups such as 1-methyl-2-pyridinium or 1-methyl-2-quinolinium.

V also means a cyano group, a hydroxyl group, a nitro group, a carboxyl group, an alkoxyl group (preferably unsubstituted or substituted $C_{1-30}$ ones such as methoxy, ethoxy, isopropoxy, t-butoxy, n-octyloxy or 2-methoxyethoxy), an aryloxy grup (preferably unsubstituted or substituted $C_{6-30}$ ones such as phenoxy, 2-methylphenoxy, 4-t-butylphenoxy, 3-nitrophenoxy or 2-tetradecanoylaminophenoxy), a silyloxy group (preferably unsubstituted or substituted $C_{3-20}$ ones such as trimethylsilyloxy or t-butyldimethylsilyloxy), a heterocyclo-oxy group (preferably unsubstituted or substituted $C_{2-30}$ ones such as 1-phenyltetrazole-5-oxy or 2-tetrahydropyranyloxy), an acyloxy group (preferably formyloxy, unsubstituted or substituted $C_{2-30}$ alkylcarbonyloxy groups and unsubstituted or substituted $C_{6-30}$ arylcarbonyloxy, such as formyloxy, actyloxy, pivaloyloxy, stearoyloxy, benzoyloxy and p-methoxyphenylcarbonyloxy), a carbamoyloxy group (preferably unsubstituted or substituted $C_{1-30}$ ones such as N,N-dimethylcarbamoyloxy, N, N-diethylcarbamoyloxy, morphorinocarbonyloxy, N,N-di-n-octylaminocarbonyloxy and N-n-octylcarbamoyloxy), an alkoxycarbonyloxy group (preferably unsubstituted or substituted $C_{2-30}$ ones such as methoxycarbonyloxy, ethoxylcarbonyloxy, t-butoxycarbonyloxy and n-octylcarbonyloxy), an aryloxycarbonyloxy group (preferably unsubstituted or substituted $C_{7-30}$ ones such as phenoxycarbonyloxy, p-methoxyphenoxycarbonyloxy and p-n-hexadecyloxyphenoxycarbonyloxy), an amino group (preferably unsubstituted or substituted $C_{1-30}$ alkylamino groups such as amino, methylamino and dimethylamino, and unsubstituted or substituted $C_{6-30}$ anilino groups such as anilino, N-methylanilino and diphenylamino), an ammonio group (preferably ammonio and ammonio substituted with unsubstituted or substituted $C_{1-30}$ alkyl, aryl or heterocyclic groups such as trimethylammonio, triethylammonio and diphenylmethylammonio), an acylamino group (preferably formylamino and unsubstituted or substituted $C_{1-30}$ alkylcarbonylamino groups such as acetylamino, pivaloylamino and lauroylamino, and unsubstituted or substituted $C_{6-30}$ ones such as benzoylamino and 3,4,5-tri-n-octyloxyphenylcarbonylamino),an aminocarbonylamino group (preferably unsubstituted or substituted $C_{1-30}$ ones such as carbamoylamino, N,N-dimethylaminocarbonylamino, N,N-diethylaminocarbonylamino and morpholinocarbonylamino), an alkoxycarbonylamino group (preferably unsubstituted or substituted $C_{2-30}$ ones such as methoxycarbonylamino, ethyoxycarbonylamino, t-butoxycarbonylamino, n-octadecyloxycarbonylamino and N-methylmethoxycarbonylamino), an aryloxycarbonylamino group (preferably unsubstituted or substituted $C_{7-30}$ ones such as phenoxycarbonylamino, p-chlorophenoxycarbonyamino and m-(n-octyloxyphenoxycarbonylamino), a sulfamoylamino group (preferably unsubstituted or substituted $C_{0-30}$ ones such as sulfamoylamino, N,N-dimethylaminosulfonylamino and N-n-octylaminosulfonylamino), an alkyl or arylsulfonylamino group (preferably unsubstituted or substituted $C_{1-30}$ alkylsulfonylamino groups such as methylsulfonylamino and butylsulfonylamino, and unsubstituted or substituted $C_{6-30}$ arylsulfonylamino groups such as phenylsulfonylamino, 2,3,5-trichlorophenylsulfonylamino and p-methylphenylsulfonylamino), a mercapto group, an alkylthio group (preferably unsubstituted or substituted $C_{1-30}$ ones such as methylthio, ethylthio and n-hexadecylthio), an arylthio group (preferably unsubstituted or substituted $C_{6-30}$ ones such as, phenylthio, p-chlorophenylthio and m-methoxyphenylthio), a heterocyclo-thio group (preferably unsubstituted or substituted $C_{2-30}$ ones such as 2-benzothiazolylthio and 1-phenyltetrazole-5-ylthio), a sulfamoyl group (preferably unsubstituted or substituted $C_{0-30}$ ones such as N-ethylsulfamoyl, N-(3-dodecyloxypropyl) sulfamoyl, N,N-dimethylsulfamoyl, N-acetylsulfamoyl, N-benzoylsulfamoyl and N-(N'-phenylcarbamoyl) sulfamoyl), a sulfo group, alkyl- and arylsulfinyl groups (preferably unsubstituted or substituted $C_{1-30}$ alkylsulfinyl or $C_{6-30}$ arylsulfinyl groups such as methylsulfinyl, ethylsulfinyl, phenylsulfinyl and p-methylphenylsulfinyl), alkyl- and arylsulfonyl groups (preferably unsubstituted or substituted $C_{1-30}$ alkylsulfonyl or $C_{6-30}$ arylsulfonyl groups such as methylsulfonyl, ethylsulfonyl, phenyl sulfonyl and p-methylphenylsulfonyl), an acyl group (preferably formyl, unsubstituted or substituted $C_{2-30}$ alkylcarbonyl and $C_{7-30}$ arylcarbonyl groups, and unsubstituted or substituted $C_{4-30}$ heterocyclo-carbonyl groups in which the carbonyl group is linked to a carbon atom in the ring such as acetyl, pivaloyl, 2-chloroacetyl, stearoyl, benzoyl, p-n-octyloxyphenylcarbonyl, 2-pyridylcarbonyl, and 2-furylcarbonyl), an aryloxycarbonyl group (preferably, unsubstituted or substituted $C_{7-30}$ ones such as phenoxycarbonyl, o-chlorophenoxycarbonyl, m-nitrophenoxycarbonyl and p-t-butylphenoxycarbonyl), an alkoxycarbonyl group (preferably, unsubstituted or substituted $C_{2-30}$ ones such as methoxycarbonyl, ethoxycarbonyl, t-butoxycarbonyl and n-octadecyloxycarbonyl), a carbamoyl group (preferably, unsubstituted or substituted $C_{1-30}$ ones such as carbamoyl, N-methylcarbamoyl, N,N-dimethylcarbamoyl, N,N-di-n-octylcarbamoyl and N-(methylsulfonyl) carbamoyl), an aryl and heterocyclo-azo group (preferably, unsubstituted or substituted $C_{6-30}$ arylazo or $C_{3-30}$ heterocyclo-azo groups such as phenylazo, p-chlorophenylazo and 5-ethylthio-1,3,4-thiazole-2-ylazo), an imide group (preferably, N-succinimide and N-phthalimide), a phosphino group (preferably, unsubstituted or substituted $C_{2-30}$ ones such as dimethylphosphino, diphenylphosphino and methylphenoxyphosphino), a phosphinyl group (preferably, unsubstituted or substituted $C_{2-30}$ ones such as phosphinyl, dioctyloxyphosphinyl and diethoxyphosphinyl), a phosphinyloxy group (preferably, unsubstituted or substituted $C_{2-30}$ ones such as diphenoxyphosphinyloxy and dioctyloxyphosphinyloxy), a phosphinylamino group (preferably, unsubstituted or substituted $C_{2-30}$ ones such as dimethoxyphosphinylamino and dimethylaminophosphinylamino), a phospho group, a silyl group (preferably, unsubstituted or substituted $C_{3-30}$ ones such as trimethylsilyl, t-butyldimethylsilyl and phenyldimethylsilyl), a hydrazino group (preferably, unsubstituted or substituted $C_{3-30}$ ones such as trimethylhydrazino), and an ureido group (preferably, unsubstituted or substituted $C_{0-30}$ ones such as N,N-dimethylureido).

Furthermore, two V's may link together to form a ring such as aromatic or non-aromatic, hydrocarbon or heterocyclic ring, which may further condense with each other to form polynuclear condensed ring structures. Concrete examples of such rings include benzene, naphthalene, anthracene, quinoline, phenanthrene, fluorene, triphenylene, naphthacene, biphenyl, pyrrole, furan, thiophene, imidazole, oxazole, thiazole, pyridine, pyrazine, pyrimidine, pyridazine, indolizine, indole, benzofuran, benzothiophene, isobenzofuran, quinolizine, quinoline, isoquinoline, phthalazine, naphthyridine, quinoxaline, quinoxazoline, carbazole, phenanthridine, acridine, phenanthroline, thianthrene, chromene, xanthene, phenoxathiin, phenothiazine and phenazine.

Among the various groups represented by V, those having a hydrogen atom may be substituted with one of the groups described above by eliminating the hydrogen atom. Examples of such composite substituents include acylsulfamoyl, alkyl- and arylsulfonylcarbamoyl groups. Specific examples thereof include methylsulfonylcarbamoyl, p-methylphenylsulfonylcarbamoyl, acetylsulfamoyl and benzoylsulfamoyl.

Methine dyes represented by formula (I) of the present invention will be described in detail.

When Y is an atomic group necessary to form a heterocyclic ring, 5-membered unsaturated heterocyclic rings formed by Y include the following rings; pyrrole, pyrazole, imidazole, triazole, furan, oxazole, isoxazole, thiophene, thiazole, isothiazole, thiadiazole, selenophene, selenazole, isoselenazole, tellurophene, tellurazole and isotellurazole; 6-membered unsaturated heterocyclic rings include pyridine, pyridazine, pyrimidine, pyrazine, pyran and thiopyran. These rings may further condense with other 5- or 6-membered carbocyclic or heterocyclic rings to give an indole ring, a benzofuran ring, a benzothiophene ring or a thienothiophene ring. Moreover, the double bonds in these heterocyclic rings may be partly hydrogenated to give unsaturated heterocyclic rings such as pyrroline, pyrazoline, imidazoline, dihydrofuran, oxazoline, dihydrothiophene or thiazoline; or completely hydrogenated to give saturated heterocyclic rings such as pyrrolidine, pyrazolidine; imidazolidine, tetrahydrofuran, oxazolidine, tetrahydrothiophene or thiazolidine.

In the case where Y represents an atomic group necessary to form a benzene ring condensed with a heterocyclic ring, the ring structures formed by Y include indole, benzofuran and benzothiophene.

Preferable ring structures formed by Y include pyrrole, furan, thiophene, indole, benzofuran and benzothiophene, and more preferable ones are pyrrole, thiophene and furan.

Preferable nitrogen-containing heterocyclic rings formed by $Z^1$ and $Z^2$ are 5- or 6-membered ones such as oxazole, thiazole, selenazole, imidazole, 2-pyridine, 4-pyridine and 3,3-dimethyl-3H-pyrrole. These rings may be condensed with carbocyclic rings such as benzene, cyclohexene or naphthalene, or heterocyclic rings such as furan or thiophene in addition to the rings represented by Y.

More preferable nitrogen-containing heterocyclic rings formed by $Z^1$ and $Z^2$ are oxazole, thiazole, imidazole and 2-pyridine, among which the most preferable ones are oxazole and thiazole.

Each of the ring formed by Y and the nitrogen-containing heterocyclic ring formed by $Z^1$ and $Z^2$ may have substituents, which are exemplified by examples of substituents represented by V described above.

Preferable groups as the substituent V are alkyl groups, aryl groups, aromatic heterocyclic rings, alkoxy groups, alkylthio groups, cyano group and halogen atoms.

The alkyl group represented by R, which may be substituted or unsubstituted, include unsubstituted alkyl groups having 1 to 18 carbon atoms (i.e., $C_{1-18}$), preferably $C_{1-7}$, more preferably $C_{1-4}$, such as methyl, ethyl, propyl, isopropyl, butyl, isobutyl, hexyl, octyl, dodecyl and octadecyl, substituted ones of $C_{1-18}$, preferably $C_{1-7}$, and more preferably $C_{1-4}$ in which the substituent includes those represented by V such as aryl, unsaturated hydrocarbon, carboxy, sulfo, sulfato, cyano, halogen (fluorine, chlorine, bromine or iodine), hydroxy, mercapto, alkoxy, aryloxy, alkylthio, arylthio, acyl, alkoxycarbonyl, aryloxycarbonyl, acyloxy, carbamoyl, sulfamoyl, heterocyclic ring, alkylsulfonylcarbamoyl, acylcarbamoyl, acylsulfamoyl and alkylsulfonylsulfamoyl. These substituents may be further substituted.

The aryl group represented by R, which may be substituted or unsubstituted, includes unsubstituted aryl group having 6 to 20 carbon atoms (i.e. , $C_{6-20}$), preferably $C_{6-15}$, more preferably $C_{6-10}$, such as phenyl and 1-naphthyl, substituted ones of $C_{6-26}$, preferably $C_{6-21}$, and more preferably $C_{6-16}$ in which the substituent includes those represented by V such as alkyl, aryl, unsaturated hydrocarbon, carboxy, sulfo, sulfato, cyano, halogen (fluorine, chlorine, bromine or iodine), hydroxy, mercapto, alkoxy, aryloxy, alkylthio, arylthio, acyl, alkoxycarbonyl, aryloxycarbonyl, acyloxy, carbamoyl, sulfamoyl, heterocyclic ring, alkylsulfonylcarbamoyl, acylcarbamoyl, acylsulfamoyl and alkylsulfonylsulfamoyl. These substituents may be further substituted. A particularly preferred aryl group is phenyl.

The heterocyclic ring group represented by R, which may be substituted or unsubstituted, includes unsubstituted heterocyclic ring groups having 1 to 20 carbon atoms (i.e., $C_{1-20}$), preferably $C_{1-5}$, more preferably $C_{1-10}$, such as pyrrole, furan and thiophene, or substituted ones of $C_{1-26}$, preferably $C_{1-21}$ and more preferably $C_{1-16}$ in which the substituents are those represented by V.

Preferably, R represents a structure substituted with a group having an acid moiety or a dissociable proton such as carboxyl, sulfo, phosphonic acid, boric acid, —CONHSO$_2$—, —SO$_2$NHSO$_2$—, —CONHCO— and —SO$_2$NHCO—. More preferable examples include alkyl groups substituted with either of a carboxyl group, a sulfo group, an alkylsulfonylcarbamoyl group (for example, methanesulfonylcarbonyl), an acylcarbamoyl group (for example, acetylcarbamoyl), an acylsulfamoyl group (for example, acetylsulfamoyl) or an alkylsulfonylsulfamoyl group (for example, methanesulfonylsulfamoyl). Most preferable examples are carboxymethyl, 2-sulfoethyl, 3-sulfopropyl, 3-sulfobutyl, 4-sulfobutyl and methanesulfonylcarbamoylmethyl groups.

The methine group represented by $L^1$ and $L^2$ may have substituents such as those represented by V described above.

The preferable value for p is 0.

M in formula (I) is included in the formula in order to indicate the presence of a cationic or an anionic ion necessary to neutralize the ionic charge of the dye molecule. Whether a certain dye is of cationic or anionic ion or has a net ionic charge depends on the substituent of the dye or the surrounding condition such as the pH of the solution Typical cationic ions include inorganic ones such as hydrogen ion (H$^+$), alkali metal ions (Na$^+$, K$^+$ or Li$^+$) and alkaline earth metal ions (Ca$^{++}$) organic ones such as ammonium ion (NH$_4^+$, tetraalkylammonium ion, triethylammonium ion, pyridinium ion, ethylpyridinium ion or 1,8-diazabicyclo [5.4.0]-7-undecenium ion). The anionic ion may be inorganic or organic, including halogenated ions such as fluoride ion, chloride ion, bromide ion or iodide ion, substituted arylsulfonate ion such as p-toluenesulfonate ion or p-chlorobenzenesulfonate ion, aryldisulfonate ion such as 1,3-benzenesulfonate ion, 1,5-nahthalenedisulfonic acid ion or 2,6-naphthalenedisulfonic acid ion, alkylsulfonate ion such as methylsulfonate ion, sulfuric acid ion, thiocyanate ion, perchlorate ion, tetrafluoroborate ion, picric acid ion, acetate ion and trifluoromethanesulfonate ion. Further, ionic polymers or other dyes charged in the polarity opposite to that of the dye (i.e., other dyes having a reverse charge) may be used.

Preferable cationic ions include Na$^+$, K$^+$, triethylammonium ion, tetraethylammonium ion, pyridinium ion, ethylpyridinium ion and metylpyridinium ion. Preferable anionic ions include perchlorate ion, the iodide ion or bromide ion and substituted arylsulfonate ion such as p-toluenesulfonate ion.

m represents an integer of 0, or 1 or more necessary to neutralize the charge of the dye molecule, thus in the case where internal salts are formed, m is equal to 0. A preferable range of m is from 0 to 4.

D represents a group necessary to form a methine dye, and any type of methine dye may be formed by selecting a proper D. Preferable examples thereof include cyanine, merocyanine, rhodacyanine, trinuclear and tetranuclear merocyanines, allopolar, hemicyanine and styryl dyes. Detailed descriptions on these dyes are found in F. M. Hamer, "Heterocyclic Compounds—Cyanine Dyes and Related Compounds", published by John Wiley & Sons (New York, London, 1964) and p. 482 to 515, Section 14 of Chapter 18 of D. M. Sturmer, "Heterocyclic Compounds—Special Topics in Heterocyclic Chemistry" published by John Wiley & Sons (New York, London, 1977).

Formulae for preferable dyes include those described in the $32^{nd}$ to $36^{th}$ columns of U.S. Pat. No. 5,994,051, and in the $30^{th}$ to $34^{th}$ columns of U.S. Pat. No. 5,747,236. And, formulae for preferable cyanine, merocyanine and rhodacyanine dyes are shown as (XI), (XII) and (XIII) described in the $21^{st}$ to $22^{nd}$ columns of U.S. Pat. No. 5,340,694. (Note, however, $n_{12}$, $n_{15}$, $n_{17}$ and $n_{18}$, which are not limited, represents an integer of 0 or 1 or more, (preferably from 0 to 4). Preferable types are cyanine, merocyanine and rhodacyanine, among which cyanine dyes are particularly preferred.

In cases where a cyanine dye is formed by D in formula (I), the molecular structure can also be represented by resonance formula (I').

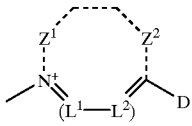

(I')

Concrete examples of preferable compounds represented by formula (I) will be described below. The compound represented by formula (I) preferably is chosen from formulae (a) to (l).

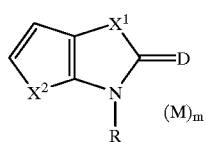

(a)

(b)

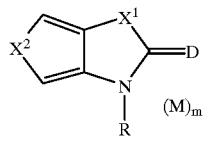

(c)

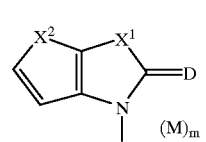

(d)

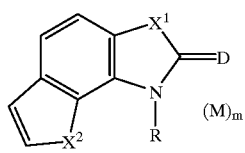

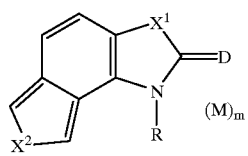

(e)

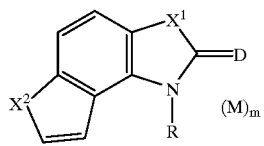

(f)

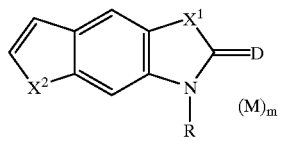

(g)

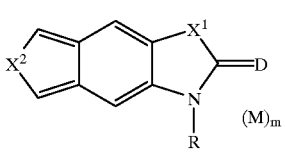

(h)

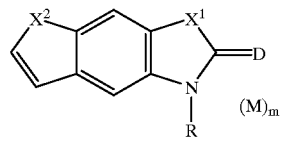

(i)

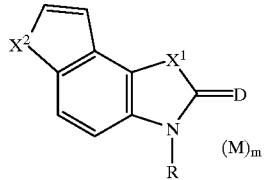

(j)

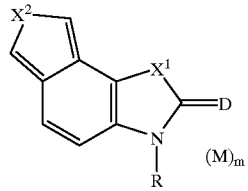

(k)

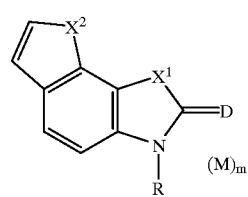

(l)

In the formulae, m is the same as in formula (I), $X^1$ represents an oxygen atom, a sulfur atom, a selenium atom or $NR^1$ in which $R^1$ is an alkyl or aryl group or a heterocyclic ring, and $X^2$ an oxygen atom, a sulfur atom or an $NR^2$ in which $R^2$ is an alkyl or an aryl group or a heterocyclic ring. The benzene and the heterocyclic rings may be substituted with any group represented by V described above, or condensed with other carbocyclic or heterocyclic ring.

Among those formulae, preferable ones are from (a) to (i), more preferable ones being from (a) to (c), and particularly preferable ones are from (a) to (c).

Most preferable cases are when the methine dyes represented by formula (I) are chosen from formulae (XI), (XII), (XIII) and (XIV).

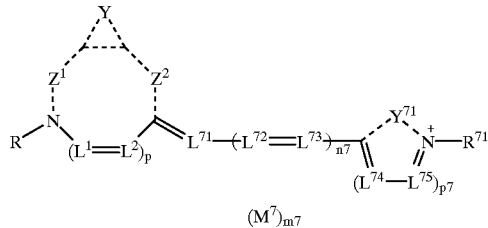

(XI)

In formula (XI), Y, R, $Z^1$, $Z^2$, $L^1$, $L^2$ and p have the same meanings as in formula (I), and $L^{71}$, $L^{72}$, $L^{73}$, $L^{74}$ and $L^{75}$ each represents a methine group. $p^7$ represents 0 or 1. $n^7$ represents an integer of 0, 1, 2, 3 or 4. $Y^{71}$ represents an atomic group necessary to form a 5- or 6-membered nitrogen-containing heterocyclic ring which may be condensed with other carbocyclic or heterocyclic rings. $M^7$ represents a counter ion, and $m^7$ represents an integer of 0, 1, 2, 3 or 4 necessary to neutralize the molecular charge. $R^7$ represents a substituted or unsubstituted alkyl, aryl or heterocyclic ring group.

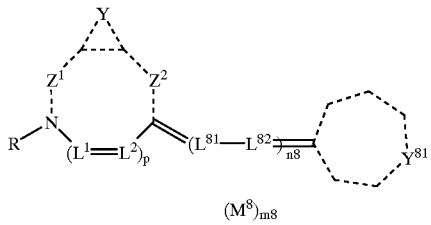

(XII)

In formula (XII), Y, R, $Z^1$, $Z^2$, $L^1$, $L^2$ and p have the same meanings as in formula (I), and $L^{81}$ and $L^{82}$ each represents a methine group. $n^8$ represents an integer of 0, 1, 2, 3 or 4. $Y^{81}$ represents an atomic group necessary to form an acid nucleus which may be condensed with other carbocyclic or heterocyclic rings. $M^8$ represents a counter ion, and $m^8$ represents an integer of 0, 1, 2, 3 or 4 necessary to neutralize the molecular charge.

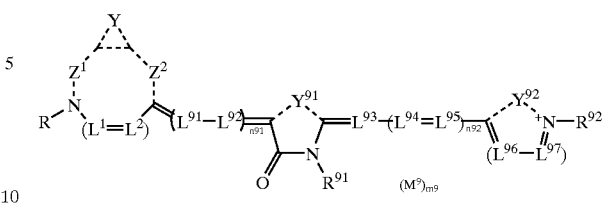

(XIII)

In formula (XIII), Y, R, $Z^1$, $Z^2$, $L^1$, $L^2$ and p have the same meanings as in formula (I), and $L^{91}$, $L^{92}$, $L^{93}$, $L^{94}$, $L^{95}$, $L^{96}$ and $L^{97}$ each represents a methine group. $p^9$ represents 0 or 1. $n^{91}$ and $n^{92}$ each represents an integer of 0, 1, 2, 3 or 4. $Y^{91}$ and $Y^{92}$ each represents an atomic group necessary to form a 5- or 6-membered nitrogen-containing heterocyclic ring which may have substituents. But, $Y^{92}$ may be condensed with other carbocyclic or heterocyclic rings. $M^9$ represents a counter ion, and $m^9$ represents an integer of 0, 1, 2, 3 or 4 necessary to neutralize the molecular charge. $R^{91}$ and $R^{92}$ each represents a substituted or unsubstituted alkyl, aryl or heterocyclic ring group.

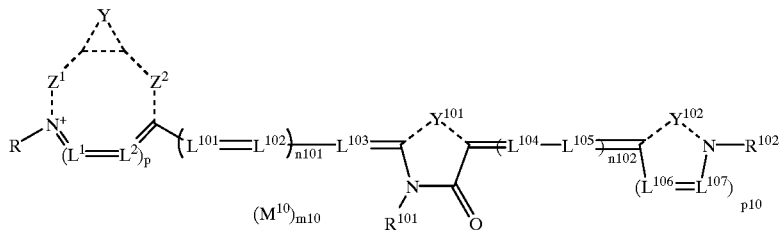

(XIV)

In formula (XIV), Y, R, $Z^1$, $Z^2$, $L^1$, $L^2$ and p have the same meaning as in formula (I), and $L^{101}$, $L^{102}$, $L^{103}$, $L^{104}$, $L^{105}$, $L^{106}$ and $L^{107}$ each represents a methine group. $p^{10}$ represents 0 or 1. $n^{101}$ and $n^{102}$ represents an integer of 0, 1, 2, 3 or 4. $Y^{101}$ and $Y^{102}$ represents an atomic group necessary to form a 5- or 6-membered nitrogen-containing heterocyclic ring which may be substituted. But, $Y^{102}$ may be condensed with other carbocyclic or heterocyclic rings. $M^{10}$ represents a counter ion, and $m^{10}$ represents an integer of 0, 1, 2, 3 or 4 necessary to neutralize the molecular charge. $R^{101}$ and $R^{102}$ each represents a substituted or unsubstituted alkyl, aryl or heterocyclic ring group.

The 5- or 6-membered heterocyclic ring represented by $Y^{71}$ $Y^{92}$ and $Y^{102}$ in formulae (XI), (XII), (XIII) and (XIV) may further be condensed with other 5- or 6-membered carbocyclic or heterocyclic rings. Such carbocyclic ring includes benzene or naphthalene ring, and such heterocyclic ring includes furan and thiophene. Preferably, the condensed ring is carbocyclic, and more preferably a benzene ring. Contretely, the 5- or 6-membered nitrogen-containing heterocyclic rings (systems) to be exemplified as the examples for $Z^{11}$ in formula (Ia) are preferred, and concrete examples include the examples for $Z_{11}$ $Z_{12}$, $Z_{13}$, $Z_{14}$ and $Z_{16}$ described in the $23^{rd}$ to $24^{th}$ columns of U.S. Pat. No. 5,340,694.

$Y^{81}$ represents an atomic group necessary to form a cyclic or non-cyclic acid nucleus, and may take any type of the acid nucleus for an ordinary merocyanine dye. In preferable structures, the group adjacent to the methine chain linkage in $Y^{81}$ is a thiocarbonyl or carbonyl group.

The definition of the term "acid nucleus" is found in p. 198 of T. H. James, "The Theory of the Photographic Process", 4th Edition, published by MacMillan Publishing Co., in 1977. Concretely, those compounds described in U.S. Pat. No. 3,567,719, No. 3,575,869, No. 3,804,634, No. 3,837,862, No. 4,002,480 and No. 4,925,777 and JP-A-3-167546.

The acid nucleus is preferably form a 5- or 6-membered nitrogen-containing heterocyclic ring comprising carbon, nitrogen and chalcogen atoms (typically, oxygen, sulfur, selenium or tellurium). Examples of preferable nucleus are listed below.

The nuclei of the following compounds; 2-pyrazoline-5-one, pyrazolidine-3,5-dione. imidazoline-5-one, hydantoin, 2- or 4-thiohydantoin, 2-iminooxazolidine-4-one, 2-oxazoline-5-one, 2-thiooxazoline-2,4-dione, isooxazoline-5-one, 2-thiazoline-4-one, thiazolidine-4-one, thiazolidine-2,4-dione, rhodanine, thiazolidine-2,4-dithione, isorhodanine, indane-1,3-dione, thiophene-3-one, thiophene-3-one-1,1-dioxide, indoline-2-one, indoline-3-one, 2-oxoindazolinium, 3-oxoindazolinium, 5,7-dioxo-6,7-dihydrothiazolo[3,2-a]pyrimidine, cyclohexane-1,3-dione, 3,4-dihydroisoquinoline-4-one, 1,3-dioxane-4,6-dione, barbituric acid, 2-thiobarbituric acid, curomane-2,4-dione, indazoline-2-one, pyrido[1,2-a]pyrimidine-1,3-dione, pyrazolo[1,5-b]quinazolone, pyrazolo[1,5-a]benzimidazole, pyrazolopyridone, 1,2,3,4-tetrahydroquinoline-2,4-dione, 3-oxo-2,3-dihydrobenzo [d] thiphene-1,1-dioxide, 3-dicyanomethylene-2,3-dihydrobenzo[d]thiophene-1,1-dioxide. And, those in which the carbonyl or thiocarbonyl group in each nucleus described above is substituted with an active methylene compound having a ketomethylene or cyanomethylene structure, linking at its active methylene site are also included.

Preferable examples of $Y^{81}$ include hydantoin, 2- or 4-thiohydantoin, 2-oxazoline-5-one, 2-thiooxazoline-2,4-dione, thiazolidine-2,4-dione, rhodanine, thiazolidine-2,4-dithione, barbituric acid and 2-thiobarbituric acid, and more preferable ones are hydantoin, 2- or 4-thiohydantoin, 2-oxazoline-5-one, rhodanine, barbituric acid and 2-thiobarbituric acid. Most preferable compounds are 2- or 4-thiohydantoin, 2-oxazoline-5-one, rhodanine and barbituric acid.

The 5- or 6-membered nitrogen-containing heterocyclic ring formed by $Y^{91}$ and $Y^{101}$ is from the heterocyclic ring represented by $Y^{81}$ from which the oxo or thioxo group has been eliminated. Preferable examples of $Y^{81}$ include those obtained by eliminating the oxo or thioxyo group from hydantoin, 2- or 4-thiohydantoin, 2-oxazoline-5-one, 2-thiooxazoline-2,4-dione, thiazolidine-2,4-dione, rhodanine, thiazolidine-2,4-dithione, barbituric acid or 2-thiobarbituric acid. More preferable examples include those obtained by eliminating the oxo or thioxyo group from hydantoin, 2- or 4-thiohydantoin, 2-oxazoline-5-one, rhodanine, barbituric acid or 2-thiobarbituric acid. Particularly preferred ones are those obtained by eliminating the oxo or thioxyo group from 2- or 4-thiohydantoin, 2-oxazoline-5-one or rhodanine.

$R^{71}$, $R^{91}$, $R^{92}$, $R^{101}$ and $R^{102}$ and the substituent, which is named $R^{81}$ if it exists, on the nitrogen atom of acid nucleus $Y^{81}$ each represents a substituted or unsubstituted alkyl, aryl or heterocyclic ring group, and preferably represents the groups exemplified as R of the methine dye represented by formula (I).

Among such groups, substituted or unsubstituted alkyl groups are preferred as $R^{71}$, $R^{81}$, $R^{91}$, $R^{92}$, $R^{101}$ and $R^{102}$, and more preferable ones contain an alkyl group having an acid group or a group with a dissociable proton. Most preferable ones are substituted alkyl groups containing any one of carboxyl group, sulfo group, —$CONHSO_2$—, —$SO_2NHS_2$—, —CONHCO— or —$SO_2NHCO$—. And particularly preferable ones are carboxylmethyl, 2-sulfoethyl, 3-sulfopropyl, 3-sulfobutyl, 4-sulfobutyl and methanesulfonylcarbamoylmethyl groups.

$L^{71}$, $L^{72}$, $L^{73}$, $L^{74}$, $L^{75}$, $L^{81}$, $L^{82}$, $L^{91}$, $L^{92}$, $L^{93}$, $L^{94}$, $L^{95}$, $L^{96}$, $L^{97}$, $L^{101}$, $L^{102}$, $L^{103}$, $L^{104}$, $L^{105}$, $L^{106}$ and $L^{107}$ each represents a methine group independently of each other. These methine groups may have substituents, which are preferably those represented by V described above.

The methine group may form a ring together with other methine groups or with $Y^{71}$, $Y^{81}$, $Y^{91}$, $Y^{92}$, $Y^{101}$ or $Y^{102}$.

$L^1$, $L^2$, $L^{74}$, $L^{75}$, $L^{96}$, $L^{97}$, $L^{106}$ and $L^{107}$ preferably are unsubstituted methine groups.

$n^7$, $n^8$, $n^{91}$, $n^{92}$, $n^{101}$ and $n^{102}$ represent an integer of f 0, 1, 2, 3 or 4; in the case of 2 or larger, methine groups are repeated, but they need not be the same. The preferable value for $n^7$, $n^8$, $n^{91}$ and $n^{102}$ is 0, 1, 2 or 3, a more preferable range is 0, 1 or 2, and the particularly preferable value is 0 or 1. $n^{92}$ and $n^{101}$ each is preferably 0 or 1, more preferably 0.

$p^7$, $p^9$ and $p^{10}$ each independently represents 0 or 1, and preferably 0.

$M^7$, $M^8$, $M^9$ and $M^{10}$ each represents a counter ion, and is preferably the same as M described above. $m^7$, $m^8$, $m^9$ and $m^{10}$ represents an integer of 0 or 1 or more necessary to neutralize the molecular charge, thus in the case where internal salts are formed, m is equal to 0. A preferable range of m is from 0 to 4.

Among the methine dyes represented by formula (I) and further by formula (XI), (XII), (XIII) or (XIV), particularly preferable ones are those represented by formula (XI), in which those represented by formula (Ia) are more preferable.

In the following, dyes represented by formula (Ia) will be described in detail.

In formula (Ia), $Y^{11}$ represents an atomic group necessary to form a pyrrole ring, a furan ring or a thiophene ring and further an indole ring, a benzofuran ring or a benzothiophene ring. The resulting compounds may further be condensed with other carbocyclic or heterocyclic rings and have substituents, but it is desirable that no other condensed ring exists. Particularly preferably rings formed with $Y^{11}$ are pyrrole, furan or thiophene.

$X^{11}$ which represents an oxygen atom, a sulfur atom, a selenium atom or $NR^{13}$ is preferably oxygen, sulfur or $NR^{13}$. In particular, oxygen or sulfur is preferred.

The nitrogen-containing heterocyclic ring formed by $Z^{11}$ may be condensed with a carbocyclic ring such as benzene, cyclohexene or naphthalene or with a heterocyclic ring such as furan or thiophene, however the ring to be condensed preferably is carbocyclic, and more preferably a benzene ring.

The nitrogen-containing heterocyclic ring formed by $Z^{11}$ is preferably thiazoline, thiazole, benzothiazole, oxazoline, oxasole, benzoxazole, selenazoline, selenazole, benzoselenazole, tellurazoline, tellurazole, benzotellurazole, 3,3-dialkylindolenine such as 3,3-dimethylindolenine, imidazoline, imidazole, benzimidazole, isooxazole, isothiazole, pyrazole, 2-pyridine, 4-pyridine, 2-quinoline, 4-quinoline, 1-isoquinoline, 3-isoquinoline, imidazo[4,5-b] quinoxaline, oxadiazole, thiadiazole, tetrazole, pyrimidine and those obtained by the condensation of a benzene ring to the rings described heretofore.

More preferably, the nitrogen-containing heterocyclic ring is benzoxazole, benzothiazole, benzimidazole or quinoline, and most preferably benzoxazole or benzothiazole, which may be substituted with a substituent represented by V described above. Concrete examples are those described as examples for $Z_{11}$, $Z_{12}$, $Z_{13}$, $Z_{14}$ and $Z_{16}$ shown in the 23$^{rd}$ to 24$^{th}$ columns of U.S. Pat. No. 5,340,694.

As the alkyl, aryl or heterocyclic ring group represented by $R^{11}$, $R^{12}$ and $R^{13}$, those described as R of the methine dyes represented by formula (I) can be exemplified. $R^{11}$ and $R^{12}$ preferably are an alkyl group having a substituent with an acid group or a group with a dissociable proton. Most preferably, substituted alkyl groups contain any one of carboxyl or sulfo group, —CONHSO$_2$—, —SO$_2$NHSO$_2$—, —CONHCO— or —SO$_2$NHCO—. And particularly preferable groups are 2-sulfoethyl, 3-sulfopropyl, 3-sulfobutyl, 4-sulfobutyl, carboxymethyl and methanesulfonylcarbamoylmethyl groups.

Preferable $R^{13}$ is an unsubstituted alkyl group, and particularly preferably methyl and ethyl.

The methine groups represented by $L^{11}$, $L^{12}$, $L^{13}$, $L^{14}$ and $L^{15}$ may be unsubstituted or substituted with the groups represented by V described above.

Preferably, $L^{14}$ and $L^{15}$ are both unsubstituted methine groups.

$n^1$ represents an integer of 0, 1, 2, 3 or 4; in the case of 2 or larger, methine groups are repeated, but they need not be the same. Preferable values of $n^1$ are 0, 1, 2 or 3, and most preferably 0, 1 or 2, but a particularly preferable value is 0 or 1.

$p^1$, which is 0 or 1, and preferably 0.

$M^1$ is substantially equivalent to M of the methine dyes represented by formula (I), and preferably a cationic ion. Preferable cations include Na$^+$, K+, triethylammonium, pyridinium and N-ethylpyridinium.

$m^1$ represents an integer of 0 or 1 or more necessary to neutralize the molecular charge, thus in the case where internal salts are formed, $m^1$ is 0. A preferred range of $m^1$ is from 0 to 3.

The methine dyes represented by formula (Ia) preferably are further represented by formula (Ib).

Descriptions on the dyes represented by formula (Ib) will be described below.

The ring formed by $Y^{21}$ in formula (Ib) is chosen from pyrrole, furan or thiophene ring.

The direction of condensation of ring formed by $Y^{21}$ is arbitrary; as an example, the cases of thiophene are explained. Among the thieno[3,2-d]azole form in which the sulfur atom in the thiophene ring stands in the same side as $X^{21}$ relative to the condensed carbon-carbon bond (corresponding to formula (c) of formula (I), the thieno[2,3-d]azole form in which the sulfur atom in the thiophene ring stands in the opposite side as $X^{21}$ relative to the condensed carbon-carbon bond (corresponding to formula (a) in formula (I)), the thieno[3,4-d]azole form which condenses at the 3- and 4-sites of the thiophene ring (corresponding to formula (b) in formula (I)), the former two are preferred. In cases where a spectral absorption at longer wavelength regions are required as sensitizing dyes, the form represented by formula (a) is particularly suited.

Further, the ring formed by $Y^{21}$ is preferably substituted with any one of substituents represented by V. Preferable substituents include alkyl groups such as methyl, aryl groups such as phenyl, aromatic heterocyclic rings such as 1-pyrrolyl, alkoxy groups such as methoxy, alkylthio groups such as methylthio, cyano group and halogen atoms such as F, Cl, Br or I. Among them, halogenatoms, in particular, chlorine or bromine atom is preferred.

$X^{21}$ and $X^{22}$ each represents an oxygen atom, a sulfur atom, a selenium atom or NR$^{23}$ among which oxygen, sulfur and NR$^{23}$ are preferred. In particular, sulfur or oxygen is preferred and further sulfur is most preferred.

As the alkyl, aryl or heterocyclic ring group represented by $R^{21}$, $R^{22}$ and $R^{23}$, those described as R of the methine dyes represented by formula (I) can be exemplified. $R^{21}$ and $R^{22}$ preferably are an alkyl group having a substituent with an acid group or a group with a dissociable proton. Most preferably, substituted alkyl groups contain any one of carboxyl group, sulfo group, —CONHSO$_2$—, —SO$_2$NHSO$_2$—, —CONHCO— or —SO$_2$NHCO—. And particularly preferable groups are 2-sulfoethyl, 3-sulfopropyl, 3-sulfobutyl, 4-sulfobutyl, carboxymethyl and methanesulfonylcarbamoylmethyl groups. More preferably, either of $R^{21}$ or $R^{22}$ is 2-sulfoethyl, 3-sulfopropyl, 3-sulfobutyl or 4-sulfobutyl, and the other is carboxymethyl or methanesulfonylcarbamoylmethyl.

Preferable $R^{23}$ is an unsubstituted alkyl group, and particularly preferably methyl and ethyl.

The substituents represented by $V^{21}$, $V^{22}$, $V^{23}$ and $V^{24}$ are those defined as V described above, but two adjacent substituents are not condensed together to form a saturated or unsaturated ring. $V^{21}$ and $V^{24}$ are preferably hydrogen atoms, $V^{22}$ and $V^{23}$ each is preferably chosen from a hydrogen atom, an alkyl group such as methyl, an aryl group such as phenyl, an aromatic heterocyclic ring such as 1-pyrrolyl, an alkoxy group such as methoxy, an alkylthio group such as methylthio, cyano group, and halogen atoms such as F, Cl, Br or I. $V^{23}$ more preferably is a hydrogen atom, while more preferable groups for $V^{22}$ are halogen atoms, among which Cl or Br is particularly preferred.

The methine groups represented by $L^{21}$, $L^{22}$ and $L^{23}$ may be substituted or unsubstituted with the groups represented by V described above.

$n^2$ represents an integer of 0, 1, 2, 3 or 4; in the case of 2 or larger, methine groups are repeated, but they need not be the same. Preferable values of $n^2$ are 0, 1, 2 or 3, and more preferably 0, 1 or 2, but a particularly preferable value is 0 or 1.

Preferably, $L^{21}$ represetns an unsubstituted methine group. When $n^2=1$, $L^{22}$ is preferably a methine group substituted by an unsubstituted alkyl group, and $L^{23}$ is preferably an unsubstituted methine group. Particularly, $L^{22}$ is preferably a methine group substituted by a methyl or an ethyl group.

$M^2$ is substantially equivalent to M of the methine dyes represented by formula (I), and preferably a cationic ion. Preferable cations include Na$^+$, K+, triethylammonium, pyridinium and N-ethylpyridinium.

$m^2$ represents an integer of 0 or 1 or more necessary to neutralize the molecular charge, thus in the case where internal salts are formed, $m^2$ is 0. A preferred range of $m^2$ is 0, 1, 2 or 3.

Now, the cyanine dyes represented by formula (II) to be used preferably together with the methine dyes represented by formula (I) will be described in detail.

The nitrogen-containing heterocyclic rings represented by $Z^{31}$ and $Z^{32}$ may be condensed with a carbocyclic ring such as benzene, cyclohexene or naphthalene, but not with heterocyclic ring.

The ring represented as $Z^{31}$ or $Z^{32}$ is preferably thiazoline, thiazole, benzothiazole, oxazoline, oxasole, benzoxazole, selenazoline, selenazole, benzoselenazole, tellurazoline, tellurazole, benzotellurazole, 3,3-dialkylindolenine such as, 3,3-dimethylindolenine, imidazoline, imidazole, benzimidazole, isooxazole, isothiazole, pyrazole, 2-pyridine, 4-pyridine, 2-quinoline, 4-quinoline, 1-isoquinoline, 3-isoquinoline, imidazo[4,5-b]quinoxaline, oxadiazole, thiadiazole, tetrazole, pyrimidine or those obtained by the condensation of a carbocyclic ring such as benzene or naphthalene ring to the rings described above.

More preferably, the nitrogen-containing heterocyclic ring is benzoxazole, benzothiazole, benzimidazole or quinoline, and most preferably, benzoxazole or benzothiazole, which may be substituted with a substituent represented by V described above. Concrete examples are those described as examples for $Z_{11}$, $Z_{12}$, $Z_{13}$, $Z_{14}$ and $Z_{16}$ shown in the $23^{rd}$ to $24^{th}$ columns of U.S. Pat. No. 5,340,694.

As the alkyl, aryl or heterocyclic ring group represented by $R^{31}$ and $R^{32}$, those described as R of the methine dyes represented by formula (I) may be exemplified. $R^{31}$ and $R^{32}$ preferably are an alkyl group having a substituent with an acid group or a group with a dissociable proton. Most preferably, substituted alkyl groups contain any one of carboxyl or sulfo group, —$CONHSO_2$—, —$SO_2NHSO_2$—, —CONHCO— or —$SO_2NHCO$—. And particularly preferable groups are 2-sulfoethyl, 3-sulfopropyl, 3-sulfobutyl, 4-sulfobutyl, carboxymethyl and methanesulfonylcarbamoylmethyl groups. More preferably, either of $R^{31}$ or $R^{32}$ is 2-sulfoethyl, 3-sulfopropyl, 3-sulfobutyl or 4-sulfobutyl, and the other is carboxymethyl or methanesulfonylcarbamoylmethyl.

The methine groups represented by $L^{31}$, $L^{32}$, $L^{33}$, $L^{34}$, $L^{35}$, $L^{36}$ and $L^{37}$ may be unsubstituted or substituted with the groups represented by V described above.

Preferably, $L^{31}$, $L^{32}$, $L^{37}$ and $L^{37}$ are unsubstituted methine groups.

$n^3$ represents an integer of 0, 1, 2, 3 or 4; for the case of 2 or larger, methine groups are repeated, but they need not be the same. Preferable values of $n^3$ are 0, 1, 2 or 3, and more preferably 0, 1 or 2, and a particularly preferably is 0 or 1.

$P^{31}$ and $P^{32}$ each is 0 or 1, preferably 0.

$M^3$ is substantially equivalent to M of the methine dyes represented by formula (I), and preferably a cationic ion. Preferable cations include $Na^+$, K+, triethylammonium, pyridinium and N-ethylpyridinium.

$m^3$ represents an integer of 0 or 1 or more necessary to neutralize the molecular charge, thus in the case where internal salts are formed, $m^3$ is 0. A preferred range of $m^3$ is 0, 1, 2 or 3.

The methine dyes represented by formula (II) preferably are further represented by formula (IIa).

In formula (IIa), $X^{41}$ and $X^{42}$ each represents an oxygen atom, a sulfur atom, a selenium atom or $NR^{23}$ among which oxygen, sulfur and $NR^{23}$ are preferred. In particular, sulfur or oxygen is the most preferred.

As the alkyl, aryl or heterocyclic ring group represented by $R^{41}$, $R^{42}$ and $R^{43}$, those described as R of the methine dyes represented by formula (I) can be exemplified. $R^{41}$ and $R^{42}$ preferably are an alkyl group having a substituent with an acid group or a group with a dissociable proton. Most preferably, substituted alkyl groups contain any one of carboxyl or sulfo group, —$CONHSO_2$—, —$SO_2NHSO_2$—, —CONHCO— or —$SO_2NHCO$—. And particularly preferable groups are 2-sulfoethyl, 3-sulfopropyl, 3-sulfobutyl, 4-sulfobutyl, carboxymethyl and methanesulfonylcarbamoylmethyl groups. More preferably, either of $R^{41}$ or $R^{42}$ is 2-sulfoethyl, 3-sulfopropyl, 3-sulfobutyl or 4-sulfobutyl, and the other is carboxymethyl or methanesulfonylcarbamoylmethyl.

Preferable $R^{43}$ is an unsubstituted alkyl group, and particularly preferably methyl and ethyl.

The substituents represented by $V^{41}$, $V^{42}$, $V^{43}$, $V^{44}$, $V^{45}$, $V^{46}$, $V^{47}$, and $V^{48}$ are those defined as V described above, and two adjacent substituents may link together to form a saturated or unsaturated carbocyclic ring. Such saturated or unsaturated carbocyclic rings include, for example, benzene, cyclohexene or naphthalene, and preferably ones which are not condensed.

$V^{41}$, $V^{44}$, $V^{45}$ and $V^{48}$ are preferably hydrogen atoms, and $V^{42}$, $V^{43}$, $V^{46}$ and $V^{47}$ each is preferably chosen from a hydrogen atom, an alkyl group such as methyl, an aryl group such as phenyl, an aromatic heterocyclic ring such as 1-pyrrolyl, an alkoxy group such as methoxy, an alkylthio group such as methylthio, cyano group, and halogen atoms such as F, Cl, Br or I. More preferably, $V^{43}$ and $V^{47}$ are hydrogen atoms while more preferable groups for $V^{42}$ and $V^{46}$ are halogen atoms, among which Cl or Br is particularly preferred.

The methine groups represented by $L^{41}$, $L^{42}$ and $L^{43}$ may be substituted or unsubstituted with the groups represented by V described above.

$n^4$ represents an integer of 0, 1, 2, 3 or 4; in the case of 2 or larger, methine groups are repeated, but they need not be the same. Preferable values of $n^4$ are 0, 1, 2 or 3, more preferably 0, 1 or 2, and particularly preferably 0 or 1.

$M^4$ is substantially equivalent to M of the methine dyes represented by formula (I), and preferably a cationic ion. Preferable cations include $Na^{30}$, $K^{30}$, triethylammonium, pyridinium and N-ethylpyridiniuin.

$m^4$ represents an integer of 0 or 1 or more necessary to neutralize the molecular charge, thus in the case where internal salts are formed, $m^2$ is 0. A preferred range of $m^4$ is 0, 1, 2 or 3.

The methine dyes represented by formula (IIa) preferably are further represented by formula (III) when used in green to red sensitive emulsions, and by formula (IV) when used in blue sensitive emulsions.

Next, the dyes represented by formula (III) will be described in detail.

$X^{51}$ and $X^{52}$ in formula (III) each represents an oxygen or a sulfur atom. When the dye is used in green sensitive emulsions, $X^{51}$ is preferably an oxygen or a sulfur atom and $X^{52}$ an oxygen atom; when the dye is used in red sensitive emulsions $X^{51}$ is preferably an oxygen or a sulfur atom and $X^{52}$ is a sulfur atom.

As the alkyl, aryl or heterocyclic ring group represented by $R^{51}$, $R^{54}$ and $R^{53}$, those described as R of the methine dyes represented by formula (I) can be exemplified. $R^{51}$ and $R^{52}$ are preferably an alkyl group having a substituent with an acid group or a group with a dissociable proton. Most preferably, substituted alkyl groups contain any one of carboxyl or sulfo group, —$CONHSO_2$—, —$SO_2NHSO_2$—, —CONHCO— or —$SO_2NHCO$—. And particularly preferable groups are 2-sulfoethyl, 3-sulfopropyl, 3-sulfobutyl, 4-sulfobutyl, carboxymethyl and methanesulfonylcarbamoylmethyl groups More preferably, either of $R^{51}$ or $R^{52}$ is 2-sulfoethyl, 3-sulfopropyl, 3-sulfobutyl or 4-sulfobutyl, and the other is carboxymethyl or methanesulfonylcarbamoylmethyl.

Preferable $R^{53}$ is an unsubstituted alkyl group, and particularly preferably methyl and ethyl.

The substituents represented by $V^{51}$, $V^{52}$, $V^{53}$ $V^{54}$, $V^{55}$ and $V^{56}$ are those defined as V described above, and two adjacent substituents are not linked together to form a saturated or unsaturated ring. $V^{51}$, $V^{53}$, $V^{54}$ and $V^{56}$ are preferably hydrogen atoms, and $V^{52}$ and $V^{55}$ each is preferably an alkyl group such as methyl, an aryl group such as phenyl, an aromatic heterocyclic ring such as 1-pyrrolyl, an alkoxy group such as methoxy, an alkylthio group such as methylthio, cyano group, or halogen atoms such as F, Cl, Br or I. More preferable groups for $V^{52}$ and $V^{55}$ are halogen atoms, among which Cl or Br is particularly preferred.

$M^5$ is substantially equivalent to the ions represented by M in the methine dyes represented by formula (I), and preferably cationic. Preferable cations include Na+, K+, triethylammonium, pyridinium and N-ethylpyridinium.

$m^5$ represents an integer of 0 or 1 or more necessary to neutralize the molecular charge, thus in the case where internal salts are formed, $m^5$ is 0. A preferred range of $m^5$ is 0, 1, 2 or 3.

A detailed description on the dyes represented by formula (IV) will be described below.

In formula (IV), $X^{61}$ represents an oxygen or a sulfur atom, and particularly preferably sulfur.

As the alkyl, aryl or heterocyclic ring group represented by $R^{61}$ and $R^{62}$, those defined as R of the methine dyes represented by formula (I) can be exemplified. $R^{61}$ and $R^{62}$ are preferably an alkyl group having a substituent with an acid group or a group with a dissociable proton. Most preferably, substituted alkyl groups contain any one of carboxyl or sulfo group, —CONHSO$_2$—, —SO$_2$NHSO$_2$—, —CONHCO— or —SO$_2$NHCO—. And particularly preferable groups are 2-sulfoethyl, 3-sulfopropyl, 3-sulfobutyl, 4-sulfobutyl, carboxymethyl and methanesulfonylcarbamoylmethyl groups. More preferably, either of $R^{61}$ or $R^{62}$ is 2-sulfoethyl, 3-sulfopropyl, 3-sulfobutyl or 4-sulfobutyl, and the other is carboxymethyl or methanesulfonylcarbamoylmethyl.

The substituents represented by $V^{61}$, $V^{62}$, $V^{63}$, $V^{64}$, $V^{65}$ and $V^{66}$ are those defined as V described above, but two adjacent substituents do not link together to form a saturated or unsaturated ring. $V^{61}$, $V^{63}$, $V^{64}$ and $V^{66}$ are preferably hydrogen atoms, $V^{62}$ and $V^{65}$ each is preferably an alkyl group such as methyl, an aryl group such as phenyl, an aromatic heterocyclic ring such as 1-pyrrolyl, an alkoxy group such as methoxy, an alkylthio group such as methylthio, cyano group or halogen atoms such as F, Cl, Br or I. Among these, halogen atoms are more preferred, and Cl or Br is particularly preferred.

$M^6$ is substantially equivalent to M of the methine dyes represented by formula (I), and preferably a cationic ion. Preferable cations include Na+, K+, triethylammonium, pyridinium and N-ethylpyridinium.

$m^6$ represents an integer of 0 or 1 or more necessary to neutralize the molecular charge, thus in the case where internal salts are formed, $m^6$ is 0. A preferred range of $m^6$ is 0, 1, 2 or 3.

Preferable combinations of the compound represented by formula (I) with the one by formula (II) in the silver halide emulsions of the present invention will be described.

In the case where the emulsion is red sensitive, the compound of formula (II) is further represented by formula (III). In formula (III), both of $X^{51}$ and $X^{52}$ are sulfur atoms, each of $R^{51}$ and $R^{52}$ is a sulfoalkyl, a carboxyalkyl or an alkylsulfonylcarbamoylalkyl group, $R^{53}$ is methyl or ethyl, $V^{51}$, $V^{53}$, $V^{54}$ and $V^{56}$ are hydrogen atoms, $V^{52}$ and $V^{55}$ each is preferably an alkyl group such as methyl, an alkoxy group such as methoxy, an alkylthio group such as methylthio, cyano group, and halogen atoms such as F, Cl, Br or I. Among these, halogen atoms are more preferred, and Cl is particularly preferred. $M^5$ represents an organic or inorganic monovalent cation, and $m^5$ is preferably 0 or 1.

The compound of formula (I) to be combined is represented by formula (Ib); either of $X^{21}$ or $X^{22}$ is an oxygen atom, the other is a sulfur atom, $Y^{21}$ is a pyrrole, furan or thiophene ring substituted with halogen atoms, $R^{21}$ and $R^{22}$ each is a sulfoalkyl, carboxyalkyl or alkylfulsonylcarbamoylalkyl group, $n^2$ is 1, $L^{21}$ and $L^{23}$ are unsubstituted methine groups, $L^{22}$ is a methyl- or ethyl-substituted methine group, $V^{21}$, $V^{23}$ and $V^{24}$ are hydrogen atoms, and $V^{22}$ is preferably an alkyl group such as methyl, an alkoxy group such as methoxy, an alkylthio group such as methylthio, cyano group, or halogen atoms such as F, Cl, Br or I. As $V^{22}$, halogen atoms are more preferred. $M^2$ is an organic or inorganic monovalent cation, and $m^2$ is preferably 0 or 1.

In the case of green sensitive emulsions, the compound of formula (II) is further represented by formula (III). In formula (III), both of $X^{51}$ and $X^{52}$ are oxygen atoms, $R^{51}$ and $R^{52}$ each is a sulfoalkyl, a carboxyalkyl or an alkylsulfonylcarbamoylalkyl group, $R^{53}$ is methyl or ethyl, $V^{51}$, $V^{53}$, $V^{54}$ and $V^{56}$ are hydrogen atoms, $V^{52}$ and $V^{55}$ each is preferably an alkyl group such as methyl, an aryl group such as phenyl, an aromatic heterocyclic group such as 2-thienyl, an alkoxy group such as methoxy, an alkylthio group such as methylthio, cyano group, or halogen atoms such as F, Cl, Br or I. Among these, halogen atoms are more preferred. $M^5$ represents an organic or inorganic monovalent cation, and $m^5$ is preferably 0 or 1.

The compound of formula (I) to be combined with the compound described above is represented by formula (Ib); both of $X^{21}$ and $X^{22}$ are oxygen atoms, y is a pyrrole, furan or thiophene ring substituted with Cl or Br, $R^{21}$ and $R^{22}$ each is a sulfoalkyl, carboxyalkyl or alkylfulsonylcarbamoylalkyl group, $n^2$ is 1, $L^{21}$ and $L^{23}$ are unsubstituted methine groups, $L^{22}$ is a methyl- or ethyl-substituted methine group, $V^{21}$, $V^{23}$ and $V^{24}$ are hydrogen atoms, $V^{22}$ is an alkyl group such as methyl, an aryl group such as phenyl, an aromatic heterocyclic group such as 2-thienyl, an alkoxy group such as methoxy, an alkylthio group such as methylthio, cyano group, or halogen atoms such as F, Cl, Br or I. As $V^{22}$, halogen atoms are more preferred. $M^2$ is an organic or inorganic monovalent cation, and $m^2$ is preferably 0 or 1.

In the case of blue sensitive emulsions, the compound of formula (II) is further represented by formula (IV). In formula (IV), $X^{61}$ is a sulfur atom, each of $R^{61}$ and $R^{62}$ is a sulfoalkyl, a carboxyalkyl or an alkylsulfonylcarbamoylalkyl group, $V^{61}$, $V^{63}$, $V^{64}$ and $V^{66}$ are hydrogen atoms, $V^{62}$ and $V^{65}$ each is preferably an alkyl group such as methyl, an aryl group such as phenyl, an aromatic heterocyclic group such as 1-pyrrolyl, an alkoxy group such as methoxy, an alkylthio group such as methylthio, cyano group, or halogen atoms such as F, Cl, Br or I. Among these, halogen atoms are more preferred, Cl being most preferred. $M^2$ represents an organic or inorganic monovalent cation, and $m^2$ is preferably 0 or 1.

The compound of formula (I) to be used with the compound above is represented by formula (Ib); $X^{21}$ and $X^{22}$ are sulfur atoms, $Y^{21}$ is a thiophene ring substituted with halogen atoms, $R^{21}$ and $R^{22}$ each is a sulfoalkyl, carboxyalkyl or alkylfulsonylcarbamoylalkyl group, $n^2$ is 0, $L^{21}$ is a unsubstituted methine group, $V^{21}$, $V^{23}$ and $V^{24}$ are hydrogen atoms, $V^{22}$ is an alkyl group such as methyl, an alkoxy group such as methoxy, an alkylthio group such as methylthio, cyano group, or halogen atoms such as F, Cl, Br or I. As $V^{22}$, halogen atoms, in particular Cl and Br, are more preferred. $M^2$ is an organic or inorganic monovalent cation, and $m^2$ is preferably 0 or 1.

The compounds represented by formula (I) of the present invention will be listed not to limit the scope of the present invention to those compounds. The compounds below include those represented by formulae (Ia) and (Ib) which constitute lower concepts of formula (I).

In addition to those described below, the methine dyes S-1 to S-95 described in U.S. patent application Ser. No. 09/536,679 can also be used.

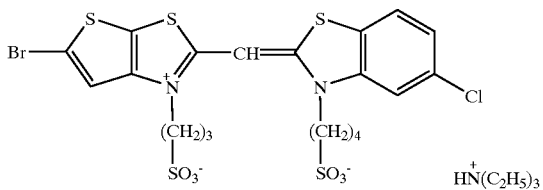

I-15
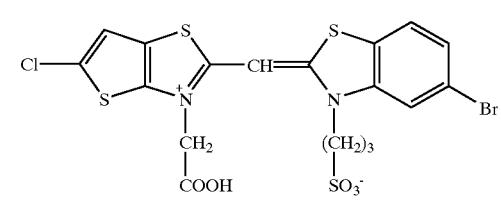
I-16
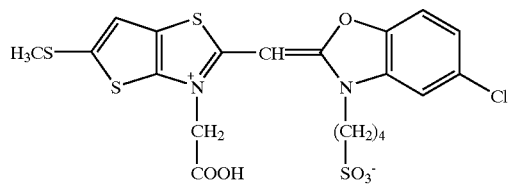
I-17
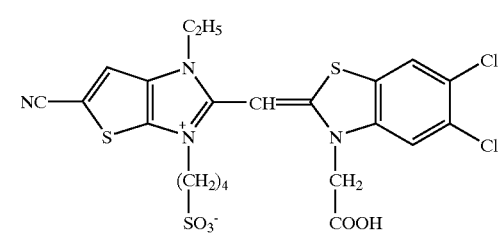
I-18
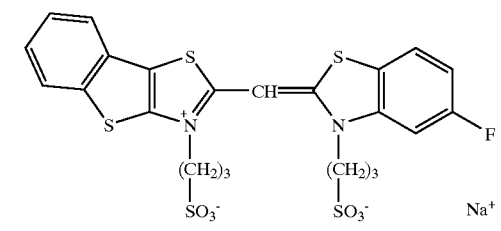
I-19
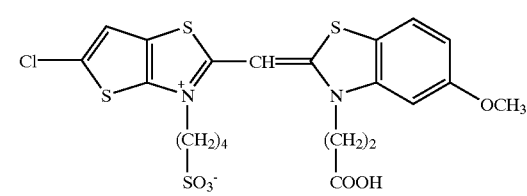
I-20
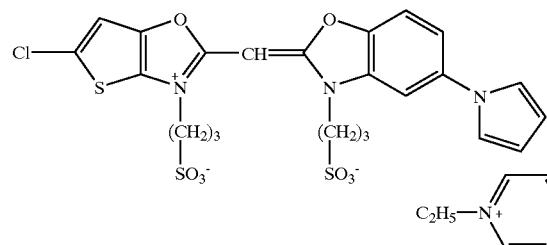
I-21
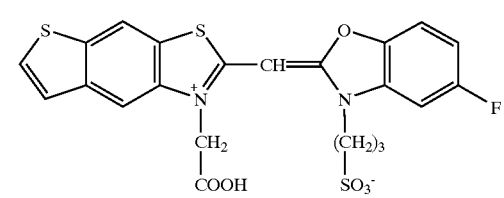
I-22
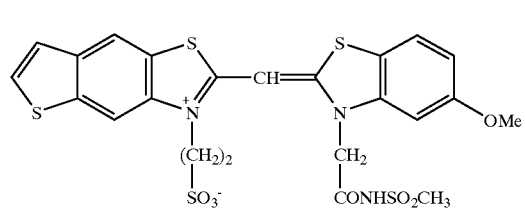
I-23
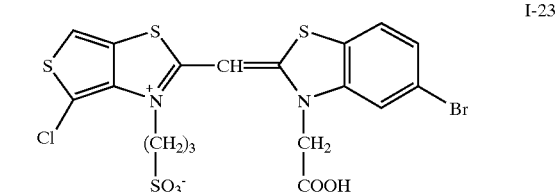
I-24
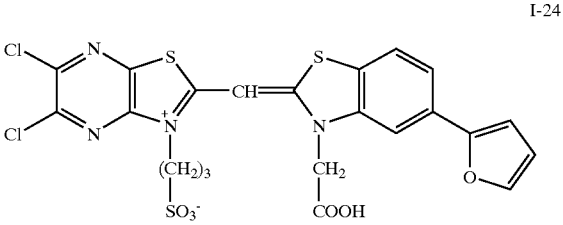
I-25
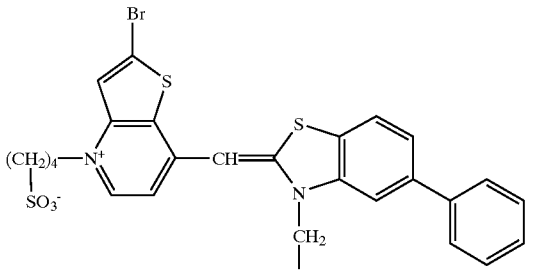
I-26
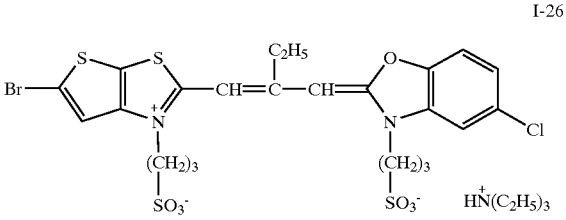
I-27
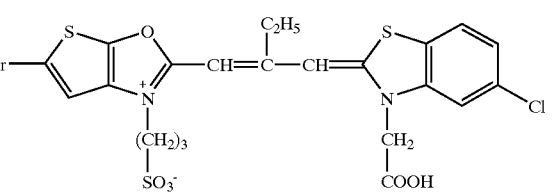
I-28
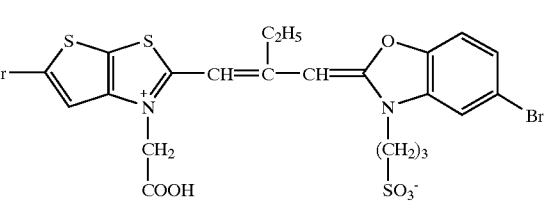

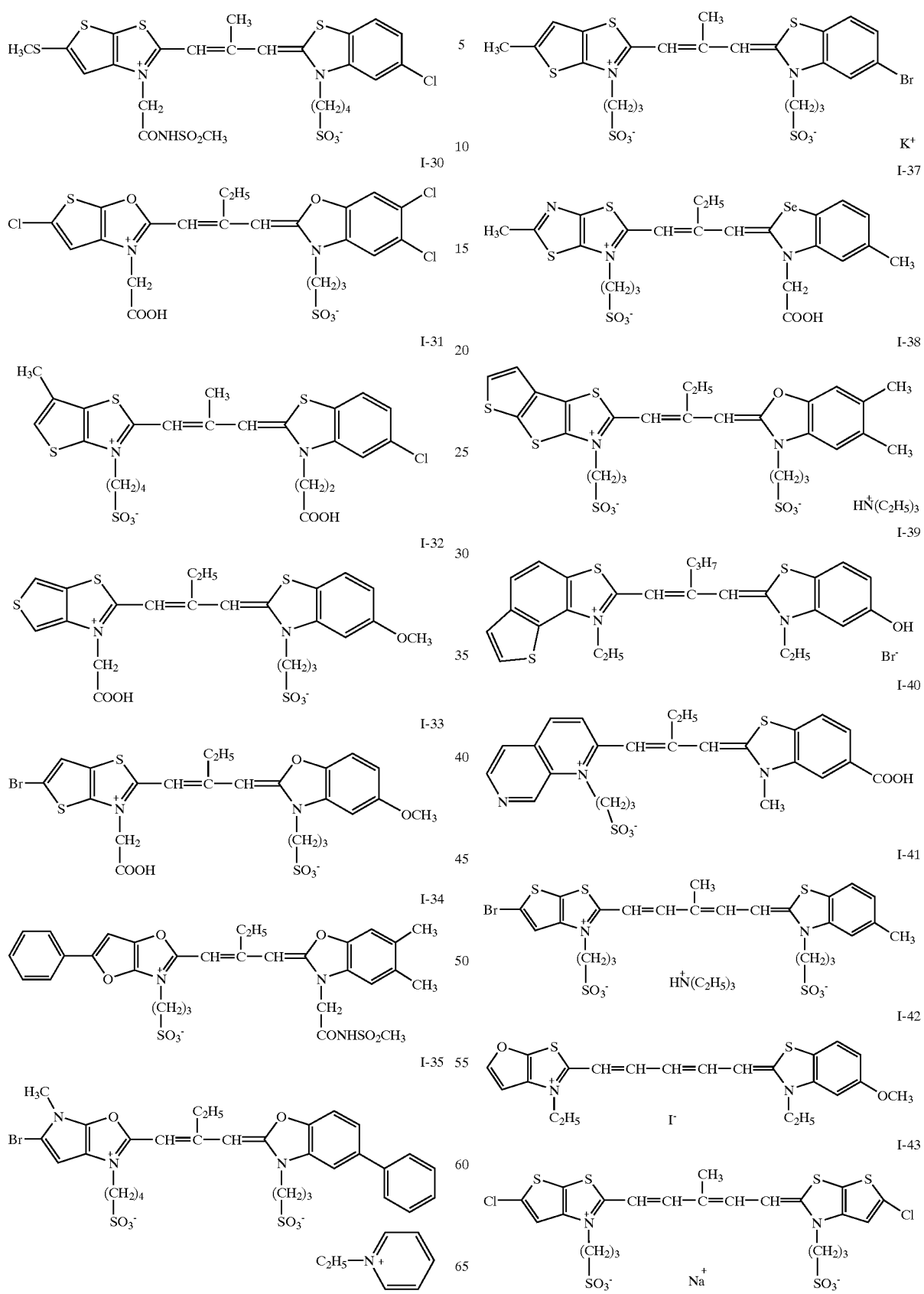

I-44
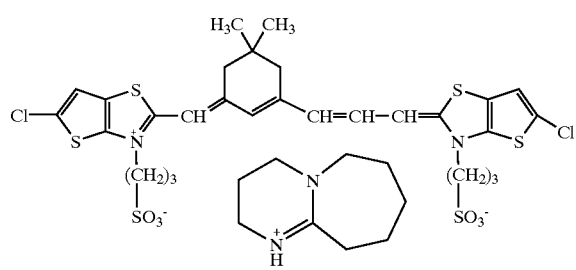
I-50
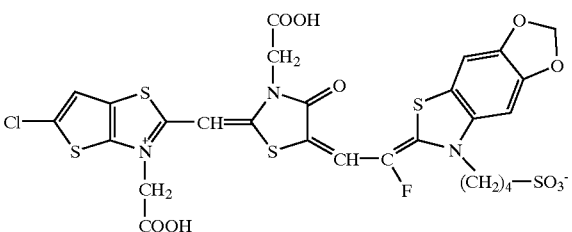
In the following, the compounds represented by formula (II) of the present invention will be listed not to limit the scope of the present invention to those compounds. The compounds below include those represented by formulae (IIa), (III) and (IV) which constitute lower concepts of formula (II).
I-45
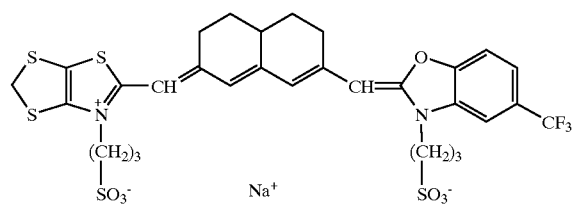
I-46
I-47
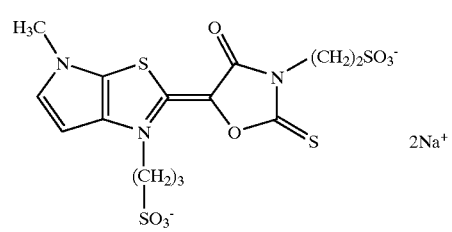
II-1, II-2, II-3, II-4, II-5
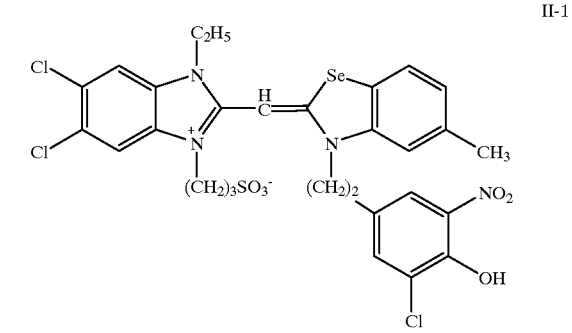
I-48
I-49
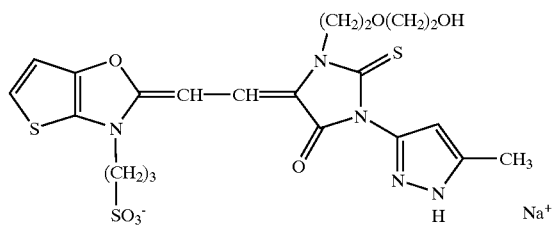

-continued
II-6
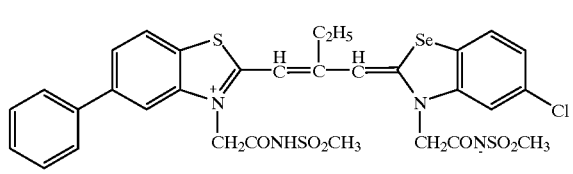
II-7
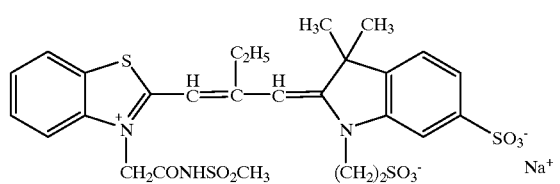
II-8
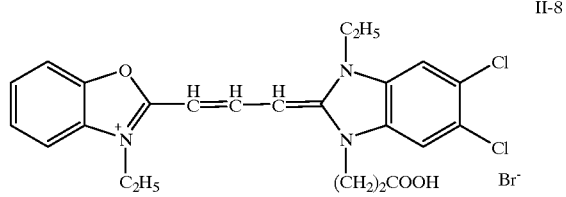
II-9
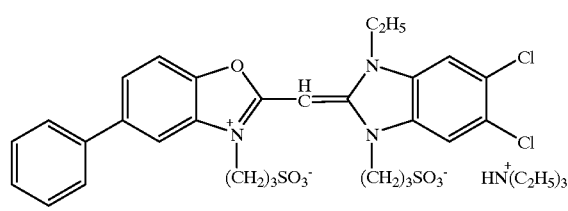
II-10
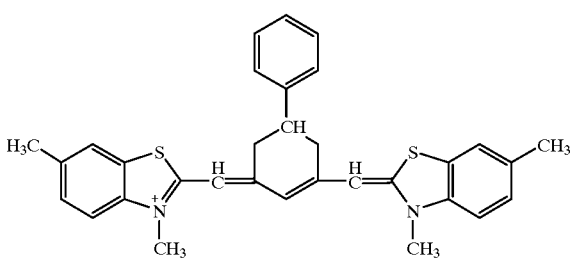
II-11
-continued
II-12
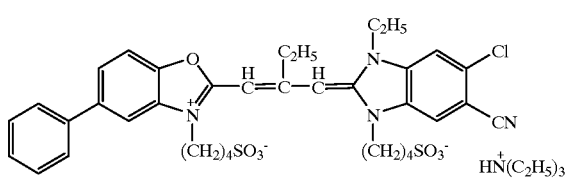
II-13
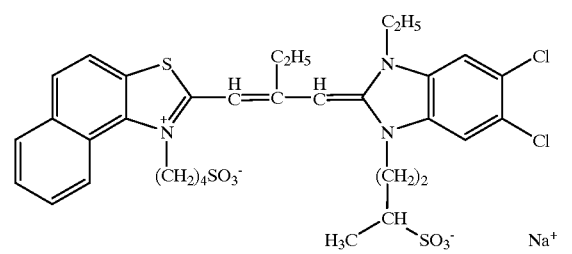
II-14
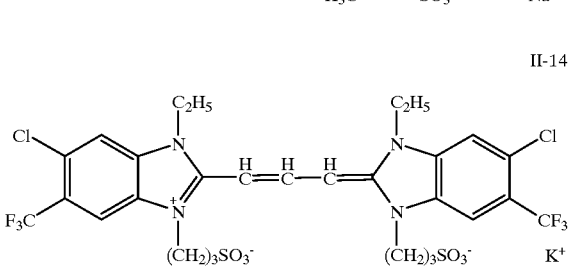
II-15
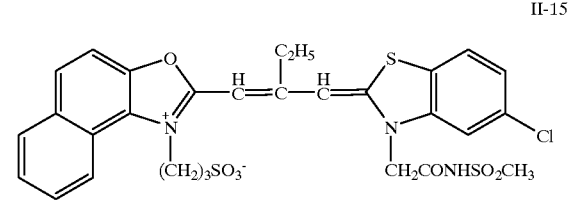
II-16
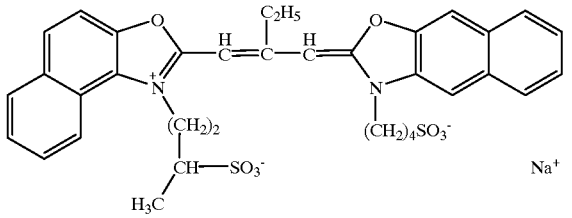
II-17
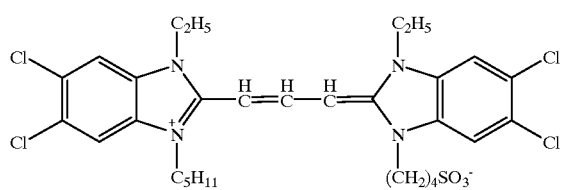
II-18
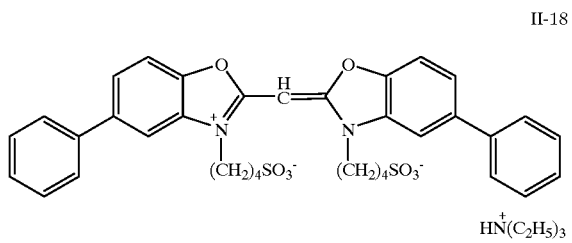

II-19
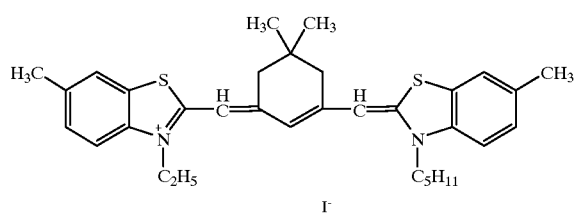
II-20
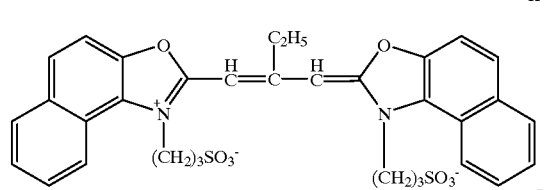
II-21
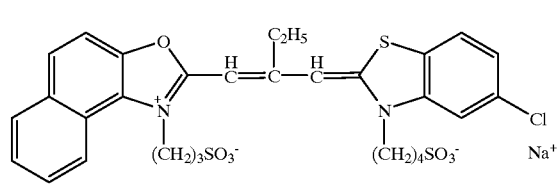
II-22
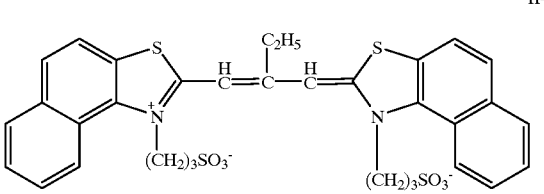
II-23
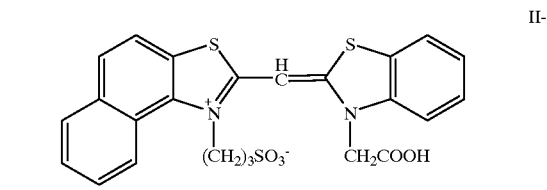
II-24
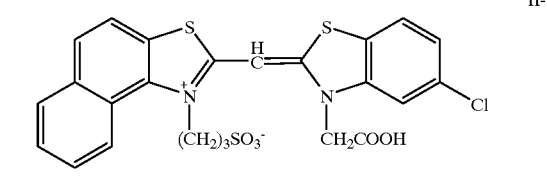
II-25
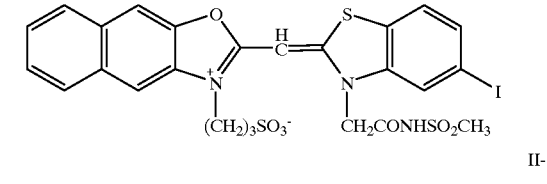
II-26
II-27
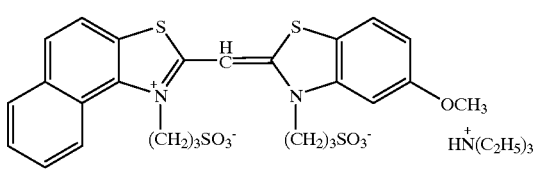
II-28
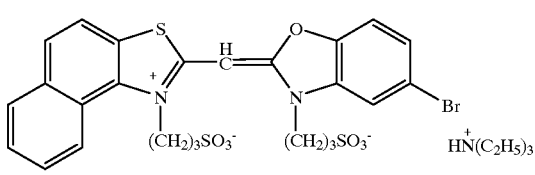
II-29
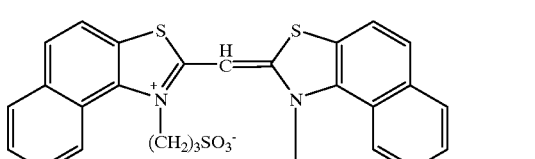
II-30
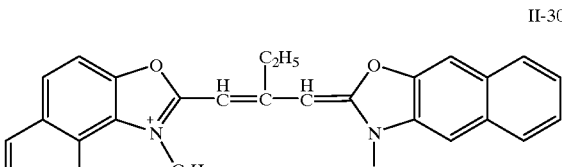
II-31
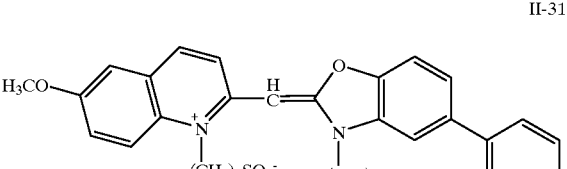
III-1
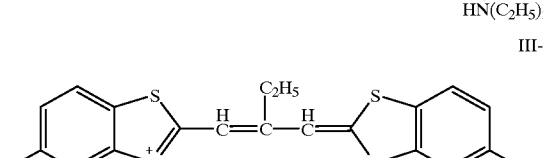
III-2
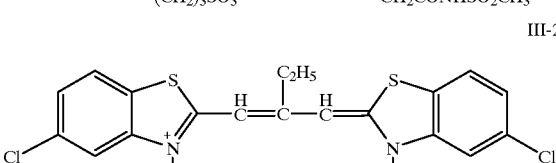
III-3
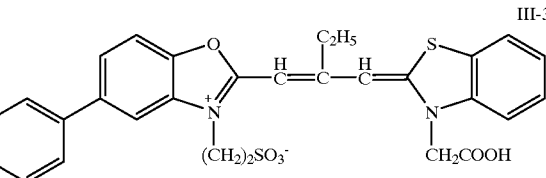

-continued

III-4 through III-18: chemical structures

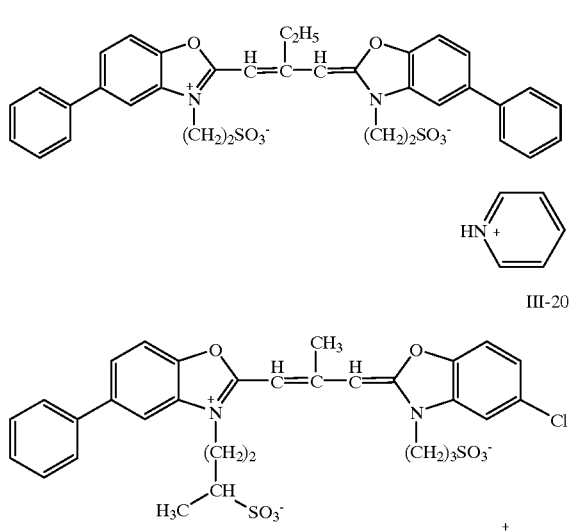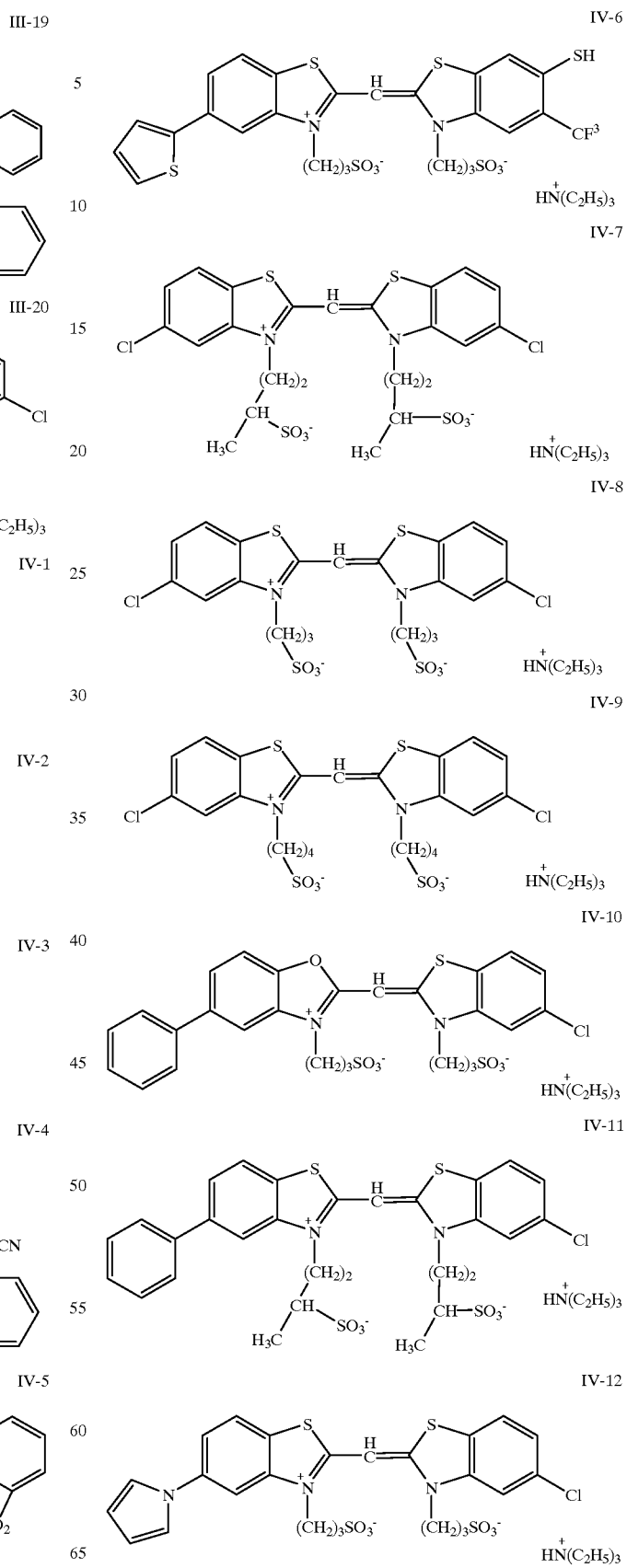

IV-13

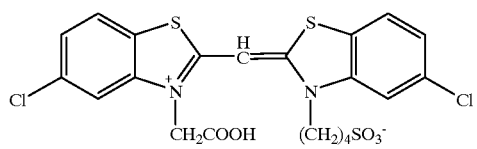

These compounds which are represented by formulae (I) and (II) including those belonging to the lower concepts can be synthesized by the methods described in the following literatures; F. M. Hamer, "Heterocyclic Compounds—Cyanine Dyes and Related Compounds", published by John Wiley & Sons (New York, London, 1964), p. 482 to 515, Section 14 in Chapter 18 of D. M. Sturmer, "Heterocyclic Compounds—Special Topics in Heterocyclic Chemistry" published by John Wiley & Sons (New York, London, 1977), and p. 369 to 422, Chapter 15 of Vol. IV part B of "Rodd's Chemistry of Carbon Compounds", $2^{nd}$ edition, published by Elsevier Science Publishing Company Inc. (New York).

When the compound represented by formula (I) and the compound represented by formula (II) are used in combination, one compound may be used alone, or two or more kinds of the compounds may be used, in the same emulsion.

The ratio of the compounds of formula (I) to the compounds of formula (II) added to the same emulsion is not specifically limited and depends on the application or the purpose of usage. A preferable range of the ratio is from 1000/1 to 1/1000, more preferably from 100/1 to 1/100, and most preferably from 10/1 to 1/10.

The compounds represented by formula (I) and those by formula (II) can be used in an emulsion in combination with other sensitizing dyes. Examples of such additional dyes preferably include cyanines, merocyanines, rhodacyanines, trinuclear and tetranuclear merocyanines, allopolar dyes, hemicyanines and styryl dyes. More preferable dyes are cyanines, merocyanines and rhodacyanines, among which cyanine dyes are particularly preferred. Detailed descriptions on these dyes are found in F. M. Hamer, "Heterocyclic Compounds—Cyanine Dyes and Related Compounds", published by John Wiley & Sons (New York, London, 1964), p. 482 to 515, and Section 14 in Chapter 18 of D. M. Sturmer, "Heterocyclic Compounds—Special Topics in Heterocyclic Chemistry", published by John Wiley & Sons (New York, London, 1977).

Formulae for preferable additional dyes are found in p. 32 to 44, U.S. Pat. No. 5,994,051, and p. 30 to 39, U.S. Pat. No. 5,747,236 in which some concrete examples are also shown.

Formulae for preferable cyanine, merocyanine and rhodacyanine dyes include (XI), (XII) and (XII) shown in the $21^{st}$ to $22^{nd}$ columns of U.S. Pat. No. 5,340,694, in which, however, the integers for $n_{12}$, $n_{15}$, $n_{17}$ and $n_{18}$ are not limited, being 0 or more (preferably 0 to 4).

One or more kinds of such additional dyes may be used; when two or more kinds are used, combinations exerting a supersensitizing effect are preferred. Typical examples are described in U.S. Pat. Nos. 2,688,545, 2,977,229, 3,397,060, 3,522,052, 3,527,641, 3,617,293, 3,628,964, 3,666,480, 3,672,898, 3,679,428, 3,303,377, 3,769,301, 3,814,609, 3,837,862 and 4,026,707, British Patent Nos. 1,344,281 and 1,507,803, JP-B-43-49336 and JP-B-53-12375 (The term "JP-B" as used herein means an "examined Japanese patent publication") JP-A-52-110618 and JP-A-52-109925.

The emulsion of the present invention may contain dyes having no spectral sensitizing effect itself or those that absorb substantially no visible light but exhibit supersensitizing effect.

Useful supersensitizers for the spectral sensitization of the present invention include, for example, pyrimidylamino compounds, triazinylamono compounds, azolium compounds, aminostyryl compounds, aromatic organic acid-formaldehyde condensates, azaindene compounds and cadmium salts. Preferable combinations of supersensitizers and sensitizing dyes are described in, for example, U.S. Pat. Nos. 3,511,664, 3,615,613, 3,615,632, 3,615,641, 4,596,767, 4,945,038, 4,965,182, 2,933,390, 3,635,721, 3,743,510, 3,617,295 and 3,635,721. Preferable methods of using such compounds are also described in the patents listed above.

Detailed descriptions on silver halide photographic emulsions and materials of the present invention will be described.

The methine dyes represented by formulae (I) and (II) (and other sensitizing dyes as well as supersensitizers) may be added to the silver halide emulsion at any emulsion preparation step that is recognized as useful in the art. For example, as is described in U.S. Pat. Nos. 2,735,766, 3,628,960, 4,183,756 and 4,225,666, JP-A-58-184142 and JP-A-60-196749, the dyes may be added during silver halide grain forming step and/or prior to desalting step, during desalting step and/or in the period between desalting and the initiation of chemical ripening. Further, as is described in JP-A-58-113920, the dyes may be added immediately before and during chemical ripening, at any point in time after chemical ripening until coating. Further, as is described in U.S. Pat. No. 4,225,666 and JP-A-58-7629, one compound may be added solely or in combination with another compound of a foreign structure during grain forming step, during and after chemical ripening step, or before, during or after chemical ripening in divided amounts. In such divided additions, combinations of compounds may be altered for each addition.

The added amount of the methine dye (and other sensitizing dyes as well as supersensitizers) used in the present invention which depends on the shape and size of silver halide grains, is from $1 \times 10^{-6}$ to $8 \times 10^{-3}$ mole per mole silver halide. For example, in the case of silver halide grains of 0.2 to 1.3 μm in size, a preferable addition amount is $2 \times 10^{-6}$ to $3.5 \times 10^{-3}$ mole and a more preferable one is $7.5 \times 10^{-6}$ to $1.5 \times 10^{-3}$ mole per mole silver halide.

The methine dye (and other sensitizing dyes as well as supersensitizers) used in the present invention may be dispersed directly in the emulsion, or first may be dissolved in a suitable solvent such as methyl alcohol, ethyl alcohol, methyl cellosolve, acetone, water, pyridine or mixtures of these, and then added to the emulsion in the form of solution. In the dye solution, a base, an acid or a surfactant may be incorporated. And, ultrasonic wave may be used to dissolve dyes. Suitable adding methods for these compounds include one described in U.S. Pat. No. 3,469,987 comprising dissolving a compound to be added in a volatile solvent, dispersing the resulting solution into a hydrophilic colloid, and adding the dispersion to the emulsion, one described in JP-B-46-24185 comprising dispersing the dye to be added in an aqueous solvent, and adding the resulting dispersion to the emulsion, one described in U.S. Pat. No. 3,822,135 comprising dissolving the dye in a surfactant, and adding the resulting solution to the emulsion, one described in JP-A-51-74624 comprising dissolving the dye by using a compound that causes red shift, and adding the resulting solution to the emulsion, and one described in JP-A-50-80826 comprising dissolving the dye in an acid substantially free of water, and adding the resulting solution to the emulsion. Still other methods described in U.S. Pat. Nos. 2,912,343, 3,342,605, 2,996,287 and 3,249,835 can also be used.

Organic solvents used to dissolve the methine dyes of the present invention include, for example, methyl alcohol, ethyl alcohol, n-propanol, isopropanol, n-butanol, isobutanol, t-butanol, benzyl alcohol, fluorinated alcohols, methyl cellosolve, acetone, pyridine and mixtures of these compounds.

To dissolve the methine dye of the present invention, a base material is preferably added to the solvent system comprising water, organic solvents described above or mixed solvent thereof. Suitable base materials may be an organic or inorganic salt. For example, amine derivatives such as triethylamine or triethanolamine, pyridine derivatives, sodium hydroxide, potassium hydroxide, sodium acetate and potassium acetate can preferably used. A preferable dissolving method comprises adding the dye in the mixed solvent comprising water and methanol, and then adding triethylamine in an molar amount equal to that of the dye.

The silver halide emulsion used in the present invention can contain silver halide grains comprising silver chloride, silver bromide, silver chlorobromide, silver iodobromide, silver iodochloride or silver chloroiodobromide. When the emulsion is used for color photographic paper, silver chlorobromide emulsions are preferred from the viewpoint of rapid and simple processing. Such high chloride content silver halide emulsions which consist of silver chloride, chlorobromide or chloroiodobromide grains is preferably contain not less than 80 mole % of silver chloride. When the emulsion is used for color picture-taking negative or reversal films, silver iodobromide emulsions are preferred. Such emulsions which consist of silver bromide, iodobromide or chloroiodobromide grains preferably contain not less than 95 mole % of silver bromide.

The mean grain size of the silver halide grains contained in the silver halide emulsion of the present invention represented by the number-averaged grain size calculated from the circle having the same projection area as the actual grain is preferably from 0.1 to 2 $\mu$m.

Further, the coefficient of variation (the standard deviation of the grain size distribution divided by the mean grain size) of the grain size is 20% or less, preferably 15% or less, and more preferably 10% or less corresponding to mono-disperse emulsion. To secure wide exposure latitudes, a plurality of such mono-disperse emulsions may be blended or coated as multi-layers.

The preferable shape of the silver halide grains contained in the photographic emulsion of the present invention includes regular ones such as cubic, octahedral or tetradecahedral, irregular or ones such as spherical, tabular or mixtures of these. In the present invention, the emulsion preferably contains regular shaped grains in an amount of 50% or more, preferably 70% or more and more preferably 90% or more.

The emulsion used in the present invention can be prepared by the methods described in P. Glafkides, "Chimie et Phisique Photographique", published by Paul Montel Co., in 1967, G. F. Duffin, "Photographic Emulsion Chemistry", published by Focal Press in 1966, and V. L. Zelikman et al, "Making and Coating Photographic Emulsion", published by Focal Press in 1964. In other words, any of acid, neutral and ammonia processes maybe used; as the method of reacting a water-soluble silver salt with a water-soluble halide, single jet method, double jet method and the combination of these methods may be used. Further, the so-called "reverse mixing method", in which grains are formed under the presence of excessive silver ion, may also be used. The so-called "controlled double jet method" may be used, too, in which, as a modified mode of simultaneous addition method, the pAg of the liquid phase in which silver halide grains are formed is kept constant. According to the controlled double jet method, grains tend to assume regular crystalline shapes and have a narrow size distribution, thus giving rise to mono-disperse emulsions.

In the emulsion used in the present invention, 50% or more, preferably 70% or more, and more preferably 80% or more of the total projected area of the silver halide grains is preferably tabular grains with an aspect ratio of 2 or more, preferably 4 to 100, more preferably 6 to 80 and particularly preferably 8 to 60. When the emulsion is applied to color photographic paper, silver chlorobromide tabular grains are suited while for color picture-taking films, silver iodobromide tabular grains are suited.

In general, a tabular grain has two parallel planes, and the thickness of the tabular grain means the distance between these two parallel planes. On the other hand, the diameter of a silver halide grain is defined as the diameter of a circle having the same area as the projection area of the grain recorded in electron microscope photographs. The aspect ratio of a tabular grain is defined by the ratio of the diameter to the thickness.

Tabular silver halide grains used for color photographic paper are preferably high chloride content silver halide grains containing preferably 80% or more, more preferably 95% or more, of silver chloride.

The high chloride content silver halide grains used in the present invention comprise a core and a shell (an outermost layer) containing a larger amount of iodide than the core. It is desirable that the core contains not less than 90% of silver chloride. The core may consist of two or more parts different in halide composition. The volume of the shell is preferably 50% or less and more preferably 20% or less of the total grain volume. The silver iodide content of the shell is preferably 0.5 to 13 mole % and more preferably 1 to 6 mole %. The silver iodide content in the total grain is preferably 0.1 to 5 mole % and more preferably 0.1 to 2 mole %.

The silver iodide content of the core is preferably 1 mole % or less, and particularly preferably 0 mole %.

The silver bromide content, which may differ between the core and the shell, is preferably 0 to 20 mole % and more preferably 0.1 to 5 mole % based on the total silver amount.

The diameter of the tabular silver halide grain used in the present invention is preferably 0.2 to 1.0 $\mu$m. The term "diameter" of a silver halide grain is defined as that of a circle having the same area as the projection area of the grain recorded by electron microscope photograph. On the other hand, the grain thickness is preferably 0.2 $\mu$m or less, more preferably 0.15 $\mu$m or less and most preferably 0.1 $\mu$m or less. The aspect ratio of a tabular grain (defined by the ratio of the diameter to the thickness) is preferably not less than 2, and more preferably 3 to 20.

In general, a tabular grain has two parallel planes, and the thickness of the tabular grain means the distance between these two parallel planes.

Though the size distribution of the silver halide grain used in the present invention may be poly- or mono-dispersed, mono-dispersed ones are preferred. The coefficient of variation for grain size is 5 to 25%, and in particular 5 to 20%.

The coefficient of variation for grain thickness is preferably 5 to 25% and in particularly preferably 5 to 15%.

Now, the preparation of {111} tabular grain will be described.

High chloride content silver halide tabular grains having {111} faces as their main outer surfaces can be formed by using the crystal habit controlling agent. Further, tabular grains can be formed by generating two parallel twin planes. As the generation of twin planes depends on the temperature, the dispersant (gelatin) and silver halide concentration, appropriate conditions including these factors must be established. In cases where a crystal habit controlling agent is used in the step of nuclear formation, the gelatin concentration of from 0.1 to 10% is preferred, while the chloride concentration is preferably not lower than 0.01 mole/L, and more preferably not lower than 0.03 mole/L.

To achieve a mono-dispersion, it is desirable not to use crystal habit controlling agents at the step of nuclear formation as is described in JP-A-8-184931. When crystal habit controlling agents are not used at the nuclear formation step, the concentration of gelatin is preferably 0.03 to 10%, and more preferably 0.05 to 1.0%, while the chloride concentration is preferably 0.01 to 1 mole/L, more preferably 0.003 to 1 mole/L. The temperature for nuclear formation is set at 2 to 90° C., preferably at 5 to 80° C. and particularly preferably at 5 to 40° C.

Nuclei for tabular grains are formed during the first nuclear formation step, but in the reaction vessel there are also present many nuclei of grains other than tabular grains. Accordingly, a technique is required with which only tabular nuclei are retained by diminishing all the other types of nuclei during ripening. When the ordinary Ostwald ripening is performed, tabular nuclei also tend to dissolve away, leading an undesirable size increase of tabular grains obtained by the decrease in the number of tabular nuclei. To prevent such adverse result, crystal habit controlling agents are used. Particularly, by jointly using phthalated or trimellited gelatin, the effect of crystal habit controlling agents is enhanced and the solution of tabular nuclei is prevented.

The value of pAg during ripening, which plays a specifically important role, is 60 to 130 mV relative to the silver/silver chloride electrode.

As a next step, tabular nuclei thus prepared are subjected to crystal growth via physical ripening and with the addition of silver salts and halides under the presence of crystal habit controlling agents. During crystal growth, the chloride concentration is preferably 5 mole/L or less, and more preferably 0.05 to 1.0 mole/L. The temperature during crystal growth, which is 10 to 90° C. and preferably 30 to 80° C. The total amount of the crystal habit controlling agent is preferably $6 \times 10^{-5}$ or more and more preferably $3 \times 10^{-4}$ to $6 \times 10^{-2}$ mole, per mole of silver halide in the finished emulsion. The crystal habit controlling agent may be added at any time of from the steps of nuclear formation to the step of physical ripening or crystal growth of silver halide grains. When the crystal habit controlling agent is added, the formation of {111} faces starts. The crystal habit controlling agent may be present in the reaction vessel prior to nuclear formation, however in order to produce tabular grains of small sizes, it is desirable to add the agent stepwise to the reaction vessel along with grain growth to gradually increase the concentration of the agent.

In cases where the quantity of dispersing medium needed for nuclear formation is too small for grain growth, the medium must be replenished. Usually, grain growth needs the presence of 10 to 100 g/L gelatin. Among various types of gelatin, phthalated or trimellitated one is preferred.

The pH value during grain formation is arbitrary, but neutral to acidic regions are preferred.

As the presence of the crystal habit controlling agent after the completion of grain formation has influences on the adsorption of sensitizing dyes and on the behavior during development, the crystal habit controlling agent is preferably eliminated after grain formation. It is noted, however, that high chloride content silver halide grains hardly keep the {111} faces in the absence of crystal habit controlling agents under ordinary conditions. Hence, it is preferred that the grain form is maintained by replacing the agent with certain photographically useful compounds such as sensitizing dyes. Such replacing methods are disclosed in JP-A-9-80656 and JP-A-9-106026, U.S. Pat. Nos. 5,221,602, 5,286,452, 5,298,387, 5,298,388 and 5,176,992.

By any of the replacing operations described above, crystal habit controlling agents are desorbed from the grain surface, and it is preferred to remove the desorbed agent from the emulsion by washing with water. Such washing can be performed at temperatures not causing the gelation of gelatin. Examples of suitable washing methods include those well known in the art such as those based on flocculation and ultrafiltration. For pyridinium salts as crystal habit controlling agent, washing is carried out at a temperature of preferably not lower than 40° C., and more preferably not lower than 50° C. As the flocculant used for flocculation washing, compounds having a sulfonic acid group or a carboxylic acid group are used. Pyridinium salts as crystal habit controlling agent tend to form salts with flucculants having sulfonic acid groups due to their strong interactions with sulfonic acid groups. Such salt formation makes the elimination of the pyridinium salt from the emulsion difficult. Accordingly, flocculants having carboxylic acid groups are preferred. Concrete examples of flucculants having carboxylic acid groups are described in British Patent No. 648,472.

As the desorption of crystal habit controlling agents are promoted under low pH conditions, it is preferred that the pH of washing water is lower unless the grain aggregation does not cause.

Preferable crystal habit controlling agents are preferably chosen from the compounds represented by formulae (A), (B) and (C).

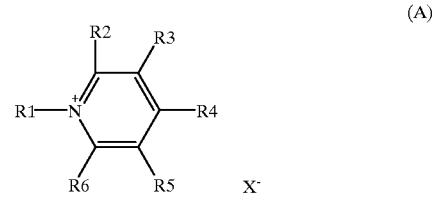

(A)

In the formula, R1 represents an alkyl group, an alkenyl group or an aralkylo group, and R2, R3, R4, R5 and R6 each represents a hydrogen atom or a substituent. R2 and R3, R3 and R4, R4 and R5, and R5 and R6 may be condensed together to form a ring, provided that, at least one of R2, R3, R4, R5 and R6 represents an aryl group, and X⁻ represents a counter anion.

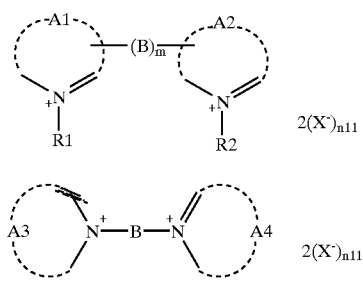

In the formulae, A1, A2, A3 and A4 each represents a group of non-metallic atoms necessary to form a nitrogen-containing heterocyclic ring, and may be the same or different from each other. B represents a bivalent linking group, and m represents an integer of o or 1. R1 and R2 each represents an alkyl group, and X represents an anion. n11 represents an integer of 0 or 1. When an intramolecular salt is formed, n11 is 0.

Now, the compounds represented by formula (A) will be described in detail.

In formula (A), R1 represents a straight, branched or cyclic chain alkyl group such as methyl, ethyl, isopropyl, t-butyl, n-octyl, n-decyl, n-hexadecyl, cyclopropyl, cyclopentyl or cyclohexyl, a $C_{2-20}$ alkenyl group such as allyl, 2-butenyl or 3-pentenyl, a $C_{7-20}$ aralkyl group such as benzyl or phenethyl. These groups represented by R1 may be substituted with those represented by the following R2 to R6.

R2, R3, R4, R5 and R6 may be the same or different, representing a hydrogen atom or groups that are replaceable with the hydrogen. Examples of the atoms or groups include the following ones.

Halogen atoms, alkyl groups, alkenyl groups, alkynyl groups, aralkyl groups, aryl groups, heterocyclic rings such as pyridyl, furyl, imidazolyl, pyperidinyl or morpholino, alkoxy groups, aryloxy groups, amino groups, acylamino groups, ureido group, urethane group, sulfonylamino group, sulfamoyl group, carbamoyl group, sulfonyl group, sulfinyl group, alkyloxycarbonyl groups, acyl group, acyloxy group, phosphoric acid amide group, alkylthio groups, arylthio groups, cyano group, sulfo group, carboxy group, hydroxy group, phosphono group, nitro group, sulfino group, ammonium groups such as trimethylammonium, phosphonium groups and hydrazino group. These groups may be further substituted.

Each pair of R2 and R3, R3 and R4, R4 and R5, and R5 and R6 may be linked together to form a quinoline ring, an isoquinoline ring or an acridine ring.

X⁻ represents a counter anion such as halogen (Cl⁻ or Br⁻) nitrate, sulfate, p-toluenesulfonate or trifluoromethanesulfonate ion.

In formula (A), preferably, R1 represents an aralkyl group, and at least one of R2, R3, R4, R5 and R6 represents an aryl group.

More preferably, R1 of formula (A) represents an aralkyl group, R4 represents an aryl group, and X⁻ represents a halogen ion. Some examples of such compounds are described in EP 723187A as crystal habit controlling agents 1 to 29. However, the scope of the present invention is not be limited by such examples.

Detailed descriptions on the compounds represented by formulae (B) and (C) of the present invention will described below.

A1, A2, A3 and A4 each represents a group of non-metallic atoms necessary to form a nitrogen-containing heterocyclic ring that may contain oxygen, nitrogen or sulfur atom and be condensed with a benzene ring The heterocyclic ring formed by each of A1, A2, A3 and A4 may be substituted, and may be the same or different each other. Examples of preferable substituents include alkyl groups, aryl groups, aralkyl groups, alkenyl groups, halogen atoms, acyl groups, alkyloxycarbonyl groups, aryloxycarbonyl groups, sulfo group, carboxy group, hydroxy group, alkoxy groups, aryloxy groups, amide groups, sulfamoyl group, carbamoyl group, ureido group, amino groups, sulfonyl group, cyano group, nitro group, mercapto group, alkylthio groups and arylthio groups. As a preferable combination, A1, A2, A3 and A4 each is chosen from a 5- or 6-membered ring such as pyridine, imidazole, thiazole, oxazole, pyradine or pyrimidine. Among these rings, pyridine is most preferred. B represents a divalent linking group such as alkylene, arylene, alkenylene, —$SO_2$—, —SO—, —O—, —S—, —CO— and —N($R_2$)—, in which $R_2$ is an alkyl group, an aryl group or a hydrogen atom. Preferable examples for B are alkylene and alkenylene.

R1 and R2 each represents an alkyl group having 1 to 20 carbon atoms. R1 may be the same as or different from R2.

The alkyl group here represents substituted or unsubstituted ones, in which the substituents represents those for A1, A2, A3 and A4.

As preferable examples, R1 and R2 are alkyl groups having 4 to 10 carbon atoms. As most preferable examples, R1 and $R^2$ each is an alkyl group substituted with unsubstituted or substituted aryl groups. X represents an anion such as Cl⁻, Br⁻, I⁻, nitrate, sulfate, p-toluenesulfonate or oxalate ion. n represents 0 or 1; in intramolecular salts, n is 0.

Concrete examples of the compound represented by formula (B) or (C) are disclosed in JP-A-2-32 as exemplary compounds 1 to 42. It is self-evident that the scope of the present invention is no limited to those compounds.

Now, {100} tabular grains will be explained.

This type of grain has {100} faces as its main planes. The shapes of the main plane include rectangular parallelogram, three- to five-cornered shapes obtained by lacking in one right triangle forming a corner of the rectangular parallelogram, and four- to eight-cornered shapes obtained by lacking in two to four right triangles forming corners of the rectangular parallelogram. To make sure, the lacking part is a right triangle which is formed by the two sides forming a corner of the rectangular parallelogram and has the corner as its vertex.

A supplemented quadrilateral is defined by supplementing the lacking parts to restore the initial rectangular parallelogram. Then, the ratio of the adjacent sides of such parallelogram and quadrilateral (the longer side length divided by the shorter side length) is 1 to 6, preferably 1 to 4 and more preferably 1 to 2.

Tabular silver halide grains having {100}main planes can be prepared by mixing, in a dispersing medium such as aqueous gelain, an aqueous silver salt solution with an aqueous halide salt solution under stirring. Among such preparing methods, JP-A-6-301129, JP-A-6-347929, JP-A-6-34045 and JP-A-9-96881 disclose use of silver iodide or iodide ion, or silver bromide or bromide ion in order to introduce distortions in the grains owing to the difference in the crystal lattice sizes of silver chloride from those of silver iodide or bromide. The introduction of such distortions leads to crystalline defects such as spiral dislocation that promotes anisotropic crystal growth. Once such spiral dislocation is introduced, the formation of the two-dimensional nucleus in that plane does not act as rate-determinant factor under low super-saturated conditions. Accordingly, the crystallization in the plane is promoted, and introduced with spiral dislocation and resulting in a tabular grain. Preferable low super-saturated conditions mean 35% or less of critical addition condition, and more preferably 2 to 20% of the critical condition. It must be noted that the crystalline defect playing the key role has not been identified as spiral dislocation, however, the direction of the introduced dislocation or the fact that an anisotropic growing property is imparted to the grain strongly suggests that the defect be a spiral dislocation. In order to make tabular grains thinner, it is desirable, as disclosed in JP-A-8-122954 and JP-A-9-189977, to maintain the introduced dislocation.

The mixing condition during nuclear formation is very important. To prepare tabular grains with a narrow distribution of the thickness, a highly efficient mixing is needed to completely mix the silver nitrate solution with the halide solution in a short period. In the case where the mixing device disclosed in JP-A-51-83097 is used, the rotation of the agitator is preferably adjusted to 800 to 2000 rpm and more preferably 1000 to 2000 rpm.

Japanese PP-A-6-347928 discloses the use of imidazoles or 3,5-diaminotriazole while JP-A-8-339044 describes the use of poly(vinyl alcohol). The two patents aim to prepare {100} tabular grains by adding the compounds described above as promoters for {100} face formation. Though the present invention can make use of these methods, the scope of the present invention is not limited to them Silver halide tabular grains used for picture-taking color films comprises silver iodobromide, silver iodochloride or silver iodochlorobromide, all containing silver iodide of not larger than 30 mole %. Particularly preferably compositions are silver iodobromide or silver iodochlorobromide containing 2 to 10 mole % of silver iodide. They may contain silver chloride, but the silver chloride content is preferably 8 mole % or less, more preferably 3 mol % or less, and most preferably 0 mole %.

The diameter of such silver iodobromide tabular grains preferably is 0.3 to 5.0 $\mu$m. On the other hand, the thickness of the tabular grains is preferably 0.05 to 0.5 $\mu$m. The aspect ratio preferably is 4 to 50, more preferably 5 to 30, and most preferably 6 to 25.

In the silver halide grains of the present invention, metals belonging to group VIII of Periodic Table, i.e., osmium, iridium, rhodium, platinum, ruthenium, palladium, cobalt, nickel, and iron can be incorporated in the form of ion or complex ion individually or in combination.

Further, these metal may be used with plural kinds.

Any compound that acts as the source of the metal ion described above can be added to the dispersion medium such as an aqueous gelatin solution, an aqueous halide solution or additional aqueous solutions all used for silver halide grain formation. Alternatively, such a compound is firstly incorporated in silver halide fine grains, which are then added to a silver halide emulsion; via various procedures such as dissolving the emulsion, the metal ion is included in the silver halide grains of the present invention. Such metal ion can be introduced into the grains at any point in time, i.e., before, during or immediately after grain formation, and the introduction timing is altered depending on in which place in the grain and how much the metal ion is located.

In the case of high chloride content silver halide grains of the present invention, not less than 50 mole %, preferably not less than 80 mole % and more preferably 100 mole % of the total metal ion source compound is localized in the surface portion of the grains corresponding to 50 volume % or less of the total grain volume. More preferably, the source compound is localized in the superficial portion of the grains having 30 volume % or less of the total grain volume. By localizing the metal ion near the grain surface, the internal sensitivity of the grain will not rise, leading to obtain high photographic speeds. To make the metal ion source compound concentrated at the superficial portion of silver halide grains, first only the core of silver halide is formed followed by the formation of the surface portion by reacting an aqueous silver salt solution with an aqueous halide solution in the presence of metal ion source compounds.

Besides metals belonging to group VIII, other polyvalent metal ion impurities can be incorporated into the silver halide emulsion of the present invention at any step from grain formation to physical ripening. Preferable addition amounts of such impurities, which vary depending on their purposes, are between $10^{-9}$ and $10^{-2}$ mole per mole silver halide.

The silver halide emulsions used in the present invention are usually chemically sensitized. Suitable chemical sensitization methods include gold sensitization using gold compounds (See, for example, U.S. Pat. Nos. 2,448,060 and 3,320,069.), sensitization using metals such as iridium, platinum, rhodium or palladium (See, for example, U.S. Pat. Nos. 2,448,060, 2,566,245 and 2,566,263.), sulfur sensitization using sulfur compounds (See for example, U.S. Pat. No. 2,222,264), selenium sensitization using selenium compounds, tellurium sensitization using tellurium compounds and reduction sensitization using stannous salts, thiourea dioxide or polyamines (See, for example, U.S. Pat. Nos. 2,487,850, 2,518,698 and 2,521,925.). These methods can be adopted individually or in combination.

The silver halide emulsions used in the present invention are preferably subjected to gold sensitization that can minimize the variation of photographic properties related to scanning exposure with laser and other light sources. For gold sensitization, chloroauric acid or salts thereof, gold thiocyanate and gold thiosulfate can be used. The added amount of such compounds is preferably $5 \times 10^{-7}$ to $5 \times 10^{-2}$ mole and more preferably $1 \times 10^{-6}$ to $1 \times 10^{-3}$ mole per mole silver halide. Such compounds for gold sensitization may be added by the end of the chemical sensitization adopted in the present invention.

Other sensitizations including sulfur, selenium, tellurium or reduction sensitization or sensitization with noble metal compounds other than gold compounds can be preferably combined with gold sensitization.

Among those chemical sensitizations, selenium sensitization is particularly preferred for the emulsions used in the present invention.

Various selenium compounds described in a number of published patents can be applied as selenium sensitizer. Concretely, an labile or non-labile selenium compound is added to the emulsion, which is agitated for a pre-determined period at an elevated temperature of 40° C. or higher. Labile selenium compounds include, for example, those disclosed in JP-B-44-15748, JP-B-43-13489, JP-A-4-25832 and JP-A-4-109240. Concrete examples of the labile selenium sensitizers include isoselenocyanates (for example aliphatic isoselenocyanate such as allylisoselenocyanate), selenoureas, selenoketones, selenoamides, selenocarboxylic acids (for example, 2-selenopropionic acid and 2-selenolactic acid), selenoesters, diacyl selenides (for example, bis(3-chloro-2,6-dimethoxybenzoyl) selenide), selenophosphates, phosphine selenides and colloidal selenium metal.

The preferable labile selenium compounds described above do not limit the scope of the present invention. As is well understood by emulsion engineers, the chemical structure of labile selenium compounds do not exert any significant influence on the property of the compounds as chemical sensitizer so far as the compounds are chemically labile. In other words, the role of the organic portion of the selenium sensitizer molecule is only to hold and introduce selenium into the emulsion. Therefore, in the present invention a variety of labile selenium compounds that can satisfy the above condition can be advantageously used without limitation.

Stable selenium compounds used in the present invention include those disclosed in JP-B-46-4553, JP-B-52-34492 and JP-B-5234491. Examples of the labile selenium sensitizers are, for example, selenious acid, potassium selenocyanide, selenazoles, quaternary salts of selenazoles, diaryl selenide, diaryl diselenide, dialkyl selenide, dialkyl diselenide, 2-selenazolidine-dione, 2-selenazolidine-thione, and the derivatives of these compounds.

Among such selenium compounds, those represented by formulae (VII) and (VIII) of JP-A-11-15115 are preferably used.

These compounds are dissolved in water, organic solvents such as methanol or ethanol, or in mixed solvents and added during chemical sensitization. They are preferably added prior to chemical sensitization. One or more kinds of selenium sensitizers may be used. Combinations of labile selenium compounds with non-labile selenium compounds are also preferred.

The addition amount of selenium sensitizers, which varies depending on the activity of the sensitizer to be used, the type and size of silver halide grains to be sensitized and ripening temperature and period, is preferably not lower than $1 \times 10^{-8}$, and more preferably $1 \times 10^{-7}$ to $5 \times 10^{-5}$ mole, per mole of silver halide of the emulsion. The temperature for chemical ripening using selenium sensitizer is 45° C. or more, and preferably 50 to 80° C. The pAg and pH are arbitrary. For example, the advantageous effects of the present invention can be achieved by pH values of from 4 to 9.

The silver halide emulsion used for the present invention can be added with various compounds or their precursors that act to prevent fog or stabilize photographic properties over the period of manufacture and storage and during photographic processing. Concrete examples of such compounds are described in p.39 to p.72 of JP-A-62-215272. Furthermore, 5-arylamino-1,2,3,4-thiatriazole compounds in which the aryl moiety has at least one electron attractive group are also preferably used.

The silver halide emulsions prepared according to the present invention can be used for color and black-and-white photographic materials. Color photographic materials include color photographic print materials, picture-taking negative and color reversal films while black-and-white materials include X-ray films, picture-taking negative films and graphic arts printing films.

Among various types of supports for the color photographic print materials used in the present invention including transparent and reflective ones, reflective supports are preferred. Particularly, those comprising a plurality of water-resistant resin layers such as polyethylene or polyester film layers which are laminated on a base and at least one of which contains a white pigment and/or a colored pigment such as ultramarine are particularly preferred.

Further, such a water-resistant resin layer preferably contain a fluorescent whitening agent. Alternatively, the whitening agent may be dispersed in the hydrophilic colloid layer of the photographic material. Preferable whitening agents include benzoxazole, cumarine and pyrazoline compounds. Particularly preferably fluorescent whitening agents are benzoxazolylnaphthalene and benzoxazolylstylbene compounds. These compounds can be preferably used in an amount of 1 to 100 mg/m$^2$, but there is no special limitation on the amount per unit area. When the whitening agent is mixed in a water-resistant resin, its content is preferably 0.0005 to 3% by weight and more preferably 0.001 to 0.5% by weight, based on resin weight.

Other types of reflective supports applicable to the present invention include the following. Base materials comprising a transparent film such as cellulose triacetate, poly(ethylene terephthalate), polyesters obtained by 2,6-naphthalene dicarboxylic acid (NDCA) and ethylene glycol (EG), or NDCA and terephthalic acid with EG, films coated with a magnetic recording layer, and those comprising a reflective support described above and a hydrophilic pigmented colloid layer containing white and colored pigments provided on such support.

With the purpose of improving image sharpness, the photographic materials of the present invention can be incorporated with a dye (particularly those of oxonol type) that can be decolorized by photographic processing Such dyes that are described in p.27 to p.76 of European Patent EP 0,337,490A2 are used in such an amount that the optical reflection density at 680 nm of the photographic material be at least 0.50.

In the present invention, a colored coating that can be decolorized during processing can be used in combination with or instead of water-soluble dyes. Such a decolorizable colored layer can be arranged in direct contact with the emulsion layer, or adjacent to an intermediate layer containing a color mixing preventing agents such as gelatin or hydroquinone which act to prevent color mixing occurring during processing. Such colored layer is preferably arranged beneath (closer to the support) the emulsion layer that records images of the same primary color as the color of the colored layer. One colored layer may be combined to every primary color image recording emulsion layer, or to limited emulsion layers. Alternatively, such a colored layer may be employed that is colored so as to cope with plural emulsion layers. The optical reflection density of such colored layer is preferably 0.2 to 3.0, more preferably 0.5 to 2.5 and particularly preferably 0.8 to 2.0 at the wavelength of the light source used for scanning exposure or at the one corresponding to the peak adsorption of the layer.

The color photographic print materials (color print paper) maybe not only areal-exposed but also scanning-exposed.

In typical scanning exposure, semiconductor lasers emitting visible light are modulated by image information. When visible light is not emitted from a semiconductor laser, a second harmonic generator (SHG) device comprising non-linear optical crystals are used in combination with such a laser.

The diameter of the scanning beam, which is usually 150 μm or less, preferably 10 to 120 μm, and more preferably 20 to 100 μm.

The diameter of light beam is defined as that of such a circle in the cross section perpendicular to the beam axis that, at the peripheral of the circle, the light intensity declines to $1/e^2$ (e being the base of natural logarithms) of the intensity at the beam axis.

The shape of the light beam for scanning exposure is not limited but preferably is substantially circular. The term "substantially" used here means that the ratio of the diameter along the sub-scanning direction to that along the main scanning direction is from 97 to 103%.

The effective beam diameter in scanning exposure can be obtained by the method described in the lower left column of p.4, JP-A-5-19423. The method consists of one scanning line exposing using the laser beams outputting an intensity equal to 50% of the laser intensity enough to give the maximum color-forming density of the formed image and then color-developing to obtain the linear color forming image. The density profile of the resulting linear image is obtained by scanning it with a micro-densitometer along the direction perpendicular to the line direction. The effective beam diameter is defined as the line width within which the density is not lower than one fifth of the maximum density Dmax.

The effective diameter at scanning exposure is 300 μm or less, preferably 10 to 240 μm and more preferably 20 to 200 μm.

The scanning pitch in scanning exposure is defined as the raster (beam track) interval, and therefore for a circular light beam, the scanning pitch is equal to the distance between the beam centers. The scanning pitch preferably is narrower than the effective beam diameter. The overlapping width between rasters, L is defined as $$L = d - p$$

in which p is scanning pitch and d effective beam diameter.

Practically, scanning pitches of 0.25 to 190 μm, and more preferably 2 to 80 μm are used.

The overlapping width, which is not limited but is usually set equal to 5 to 95%, preferably 15 to 85%, and more preferably 20 to 80%, of the effective beam diameter.

Scanning exposure using a light beam can be effected by means of drum scanning, but a method using a polygon mirror rotating at a very high speed is preferred, in which the beam is reflected by the mirror planes to perform main scanning while sub-scanning is carried out by moving the photographic material along the direction perpendicular to the main scanning direction. The number of mirror plane having no special limitation is preferably 2 to 36, and more preferably 6 to 14. A preferable range for stable number of rotation of such polygon mirror is from 4000 to 36000 rpm. By multiplying the number of rotation by the number of mirror plane, the number of scanning lines per minute is obtained.

The exposure time per pixel in scanning exposure is $10^{-4}$ sec or less, and preferably $10^{-6}$ sec or less for the pixel density of 400 dpi.

The method of preparing photographic emulsions described in line 36, column 63 to line 2, column 65 of JP-A-10-239789 can be applied to the emulsions used for the present invention.

Further, various additives to emulsions including color coupler, additives for the silver halide photographic materials, the types of photographic materials to which the present invention is applicable and processing methods are described in line 3, column 65 to line 13, column 73 of JP-A-10-239789.

In addition to the various additives described above, still other ones can also be used for the silver halide photographic materials of the present invention depending on the application purposes of the materials.

Such additives are described in detail in Item 17643 (December, 1978), Item 18716 (November, 1979) and Item 308119 (December, 1989) of Research Disclosure Journal. The following table summarizes where each additive is described.

| Kind of additive | RD17643 | RD18716 | RD308119 |
| --- | --- | --- | --- |
| 1. Chemical Sensitizer | p.23 | p.648, right column | p.996 |
| 2. Sensitivity icreasing agent | | p.648, right column | |
| 3. Spectral Sensitizer, super-sensitizer | p.23 to 24 | p.648, right column to p.649, right column | p.996, right column to p.998, right column |
| 4. Whitening agent | p.24 | | p.998, right column |
| 5. Anti-foggant and stabilizer | p.24 to p.25 | p.649, right column | p.998, right column to p.1000, right column |
| 6. Light absorber, filter and UV absorber | p.25 to p.26 | p.649, right column to p.650, left column | p.1003, left column to p.1003, right column |
| 7. Stain preventing agent | p.25, right column | p.650, left to right column | p.1002, right column |
| 8. Dye image stabilizer | p.25 | | p.1002, right column |
| 9. Hardener | p.26 | p.651, left column | p.1004, right column to p.1005, left column |
| 10. Binder | p.26 | p.651, left column | p.1003, right column to p.1004, left column |
| 11. Plasticizer, luricant | p.27 | p.650, right column | p.1006, left column to p.1006, right column |
| 12. Coating aid, surfactant | p.26 to p.27 | p.650, right column | p.1005, left column to p.1006, left column |
| 13. Anti-static agent | p.27 | p.650, right column | p.1006, right column to p.1007, left column |
| 14. Matting agent | | | p.1008, left column to p.1009, left column |

Various technologies such as layer arrangement, silver halide emulsion, functional coupler such as dye forming coupler or DIR coupler, various additives and development treatment all used for the emulsions as well as the photographic materials including such emulsions are described in European Patent No. 0565096A1 (published on Oct. 13, 1993) and the patent specifications described in the above patent. The following table summarizes where each technological term is described.

| | |
| --- | --- |
| 1. Layer structure: | Lines 23 to 35 of p.61, and line 41 of p.61 to line 14 of p.62. |
| 2. Intermediate layer: | Lines 36 to 40 of p.61. |

-continued

| | | |
|---|---|---|
| 3. | Interlayer effect-imparting layer: | Lines 15 to 18 of p.62. |
| 4. | Halide composition for silver halide: | Lines 21 to 25 of p.62. |
| 5. | Crystal habit of silver halide grain: | Lines 26 to 30 of p.62. |
| 6. | Size of silver halide grain | Lines 31 to 34 of p.62. |
| 7. | Manufacturing method of emulsion: | Lines 35 to 40 of p.62. |
| 8. | Size distribution of silver halide grain: | Lines 41 to 42 of p.62. |
| 9. | Tabular grain: | Lines 43 to 46 of p.62. |
| 10. | Internal structure of grain: | Lines 47 to 53 of p.62. |
| 11. | Type of latent image formation of emulsion: | Line 54 of p.62 to line 5 of p.63. |
| 12. | Physical ripening and chemical sensitization of emulsion: | Lines 6 to 9 of p.63. |
| 13. | Blended use of emulsions: | Lines 10 to 13 of p.63. |
| 14. | Fogging emulsion: | Lines 14 to 31 of p.63. |
| 15. | Light-insensitive emulsion: | Lines 32 to 43 of p.63. |
| 16. | Coated weight of silver: | Lines 49 to 50 of p.63. |
| 17. | Formaldehyde scavenger: | Lines 54 to 57 of p.64. |
| 18. | Mercapto type anti-foggant: | Lines 1 to 2 of p.65. |
| 19. | Foggant releasing agent: | Lines 3 to 7 of p.65. |
| 20. | Dye: | Lines 7 to 10 of p.65. |
| 21. | Color coupler in general: | Lines 11 to 13 of p.65. |
| 22. | Yellow, magenta and cyan couplers: | Lines 14 to 25 of p.65. |
| 23. | Polymer coupler: | Lines 26 to 28 of p.65. |
| 24. | Diffusible dye forming coupler: | Lines 29 to 31 of p.65. |
| 25. | Colored coupler: | Lines 32 to 38 of p.65. |
| 26. | Functional coupler in general: | Lines 39 to 44 of p.65. |
| 27. | Bleach accelerator releasing coupler: | Lines 45 to 48 of p.65. |
| 28. | Development accelerator releasing coupler: | Lines 49 to 53 of p.65. |
| 29. | Other DIR couplers: | Line 54 of p.65 to line 4 of p.66. |
| 30. | Coupler dispersing method: | Lines 5 to 28 of p.66. |
| 31. | Antiseptic and antifungal agents: | Lines 29 to 33 of p.66. |
| 32. | Type of photographic material: | Lines 34 to 36 of p.66. |
| 33. | Thickness of photo-sensitive layer and swelling speed: | Line 40 of p.66 to line 1 of p.67. |
| 34. | Backing layer: | Lines 3 to 8 of p.67. |
| 35. | Processing in general: | Lines 9 to 11 of p.67. |
| 36. | Developers and developing agent: | Lines 12 to 30 of p.67. |
| 37. | Developer additive: | Lines 31 to 44 of p.67. |
| 38. | Reversal treatment: | Lines 45 to 56 of p.67. |
| 39. | Opening rate for processing solution: | Line 57 of p.67 to line 12 of p.68. |
| 40. | Development time: | Lines 13 to 15 of p.68. |
| 41. | Blix, bleach and fix: | Line 16 of p.68 to line 31 of p.69. |
| 42. | Automatic processor: | Lines 32 to 40 of p.69. |
| 43. | Washing, rinse and stabilization: | Line 41 of p.69 to line 18 of p.70. |
| 44. | Replenishment and reuse of processing solution; | Lines 19 to 23 of p.70. |
| 45. | Inclusion of developing agent in photographic material: | Lines 24 to 33 of p.70. |
| 46. | Development and processing temperature: | Lines 34 to 38 of p.70. |
| 47. | Application to film with lens: | Lines 39 to 41 of p.70. |

EXAMPLE

In the following, the present invention is described by some concrete examples, but not limited to them.

Example 1
(Preparation of {111} Tabular, High Chloride Content Silver Halide Grains)

To a reaction vessel kept at 33° C. containing 1.2 L of water NaCl (2.0 g) and an inert gelatin (2.4 g) were added, a AgNO$_3$ aqueous solution (60 ml) containing AgNO$_3$ (9 g) and a NaCl aqueous solution (60 ml) containing NaCl (3.2 g) were added under stirring by double-jet method in one minute. One minute after the addition, crystal habit controlling agent-1 (1 millmole) was added. After another minute, NaCl (3.0 g) was added. The temperature of the reaction vessel was then elevated to 60° C. in the next 25 min. After 16 min ripening at 60° C., 10% aqueous solution (290 g) of phthalated gelatin was added together with crystal habit controlling agent-1 (0.8 millimole). Then, an AgNO$_3$ aqueous solution (754 ml) containing AgNO$_3$ (113 g) and a NaCl aqueous solution (768 ml) containing NaCl (41.3 g) were added with accelerated flow rate for 28 min. Over the period from the 21st to 28th minutes in this 28 min, an 0.25M NaCl aqueous solution (30 ml) containing KI, a potassium ferrocyanide (11 mg) and iridium hexachloride ($1.5 \times 10^{-8}$ mole) was added. The amount of KI was such as to make the outermost surface of the resulting grains have an iodine content of 0.5%.

After the addition, 1% aqueous potassium thiocyanate (5.6 ml) and the sensitizing dyes listed in Table 1 were added. Then, the content was heated to 75° C. followed by 10 min stirring.

After the temperature of the content was lowered to 40° C., the dissolved salts were removed by the ordinary flocculation method using sedimentation agent-1.

After the desalting operation, gelatin (67 g), 5% phenol (80 ml) and distilled water (150 ml) were added. With use of aqueous solutions of sodium hydroxide and AgNO$_3$, the pH and the pAg values were adjusted to 6.2 and 7.5, respectively. Via those procedures, silver halide emulsion Nos. 101 to 129 were prepared which contain tabular grains having the following characteristics; the grains occupying 96% of the total projected area have a mean equivalent sphere diameter of 0.65 μm, and a mean equivalent circle diameter of 1.19 μm, a mean thickness of 0.13 μm and a mean aspect ratio of 9.1.

(Chemical sensitization)

Emulsion Nos. 101 to 129 were subjected to an optimized chemical sensitization with sodium thiosulfonate, 1-(5-methylureidophenyl)-5-mercarptotetrazole, selenium compound-1, sodium thiosulfate and chloroauric acid at 60° C.

Crystal habit controlling agent-1

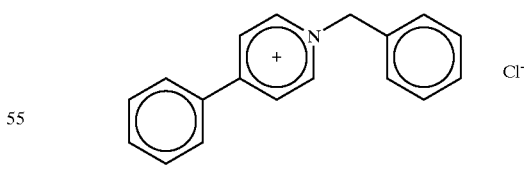

Sedimentation agent-1

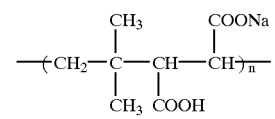

Average molecular weight=120,000

Selenium compound-1

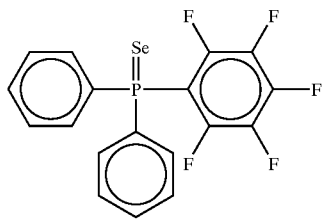

(Preparation of coated samples)

A support comprising a paper base coated on its both surfaces with a polyethylene resin was subjected to a corona discharge treatment, and then coated with a subbing layer solution comprising gelatin containing sodium dodecylbenzenesulfonate. On the subbing layer, first to seventh photographic constitution layers described in the following were formed in turn to prepare silver halide color photographic material samples No. 101 to No. 129. Separately, emulsions No. 101 to No. 129 were dissolved at 40° C., and then agitated for 12 hr. The resulting emulsions were coated in the same manner as above to provide Samples No. 101A to No. 129A.

The coating solution for each photographic layer was prepared as follows.

(Preparation of coating solutions):

Couplers, dye image stabilizers and UV absorbers were dissolved in a solvent and ethyl acetate, and the resulting solution was emulsified and dispersed in an aqueous 10% (by weight) gelatin solution containing a surfactant with a high-speed agitating emulsifier (dissolver). An emulsified dispersion was prepared by adding water to the resulting dispersion.

By blending the emulsified dispersion with the high silver chloride content emulsion, a coating solution having the following composition was prepared.

As gelatin hardener, Na salt of 1-oxy-3,5-dichlorotriazine was added to each layer. Further, the following compounds Ab-1, Ab-2 and Ab-3 were added to each layer in the total amounts of 15.0 mg/m², 60.0 mg/m² and 5.0 mg/m², respectively.

(Ab-1) Antiseptic

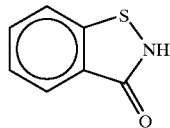

(Ab-2) Antiseptic

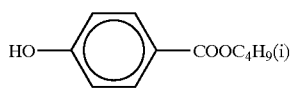

(Ab-3) Antiseptic

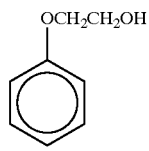

The high chloride content silver halide emulsion used in each photographic emulsion layer is described below.
(Blue-sensitive emulsion layer)
The silver chloride tabular grain emulsion described in above was used.
(Green-sensitive emulsion layer)
To a silver chlorobromide emulsion [a solution of a coarse grain emulsion containing cubic grains of mean grain size of 0.45 μm with a fine grain emulsion containing cubic grains of mean grain size of 0.35 μm in a mixing ratio of 1:3 (expressed by silver mole ratio); the coefficient of variation for grain size was 10% and 8% for each emulsion; and in the grains of both emulsions, 0.4 mole % silver bromide was localized at a part of the grain surface substantially consisting of silver chloride.], sensitizing dyes were added as follows. To the coarse grain emulsion, sensitizing dye III-19 was added in an amount of $3.0 \times 10^{-4}$ mole per mole of silver halide, and $3.6 \times 10^{-4}$ mole per mole of silver halide to the fine grain emulsion. Further, sensitizing dye II-18 was added in an amount of $4.0 \times 10^{-5}$ mole per mole of silver halide to the coarse grain emulsion, and $2.8 \times 10^{-4}$ mole per mole of silver halide to the fine grain emulsion.
(Red-sensitive emulsion layer)
A silver chlorobromide emulsion comprising a mixture of a coarse grain emulsion A containing cubic grains of mean grain size of 0.50 μm with a fine grain emulsion B containing cubic grains of mean grain size of 0.41 μm in a mixing ratio of 1:4 (in terms of silver mole ratio) The coefficient of variation for grain size was 9% and 11% for each emulsion. In the grains of both emulsions, 0.8 mole % silver bromide was localized at a part of the grain surface substantially comprising silver chloride. Sensitizing dyes II-19 and II-10 were added in an amount of $6.0 \times 10^{-5}$ mole per mole of silver halide to the coarse grain emulsion, and $9.0 \times 10^{-5}$ mole per mole of silver halide to the fine grain emulsion, respectively.

The following compound-I was further added in an amount of $2.6 \times 10^{-3}$ mole per mole of silver halide.
Compound-I

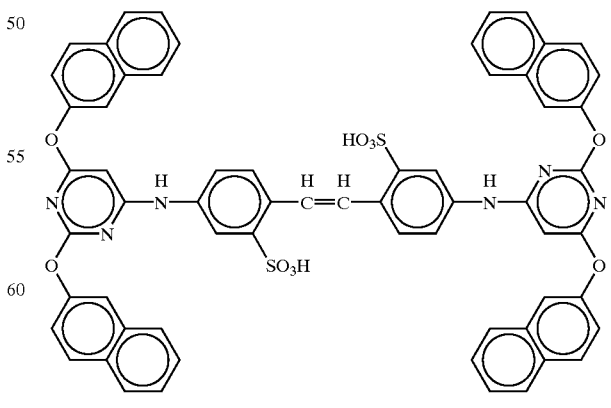

To each of the blue-, green- and red-sensitive emulsion layers, 1-(3-methylureidophenyl)-5-mercaptotetrazole was added in an amount of $3.3\times10^{-4}$, $1.0\times10^{-3}$ and $5.9\times10^{-4}$ mole per mole of silver halide, respectively. The same compound was added to the second, forth, sixth and seventh layer in an amount of 0.2, 0.2, 0.6 and 0.1 $mg/m^2$, respectively.

To the red-sensitive emulsion layer, a methacrylic acid/butyl acrylate copolymer (copolymerization ratio of 1:1 in weight ratio, and a mean molecular weight of 200,000 to 400,000) was added in an amount of 0.05 $g/m^2$.

To the second, forth and sixth layer, sodium catechol-3,5-disulfonate was added in an amount of 6,6 and 18 $mg/m^2$, respectively.

To prevent irradiation, the following dyes were added to the emulsion layers. The numeral in the parenthesis indicates the coated amount.

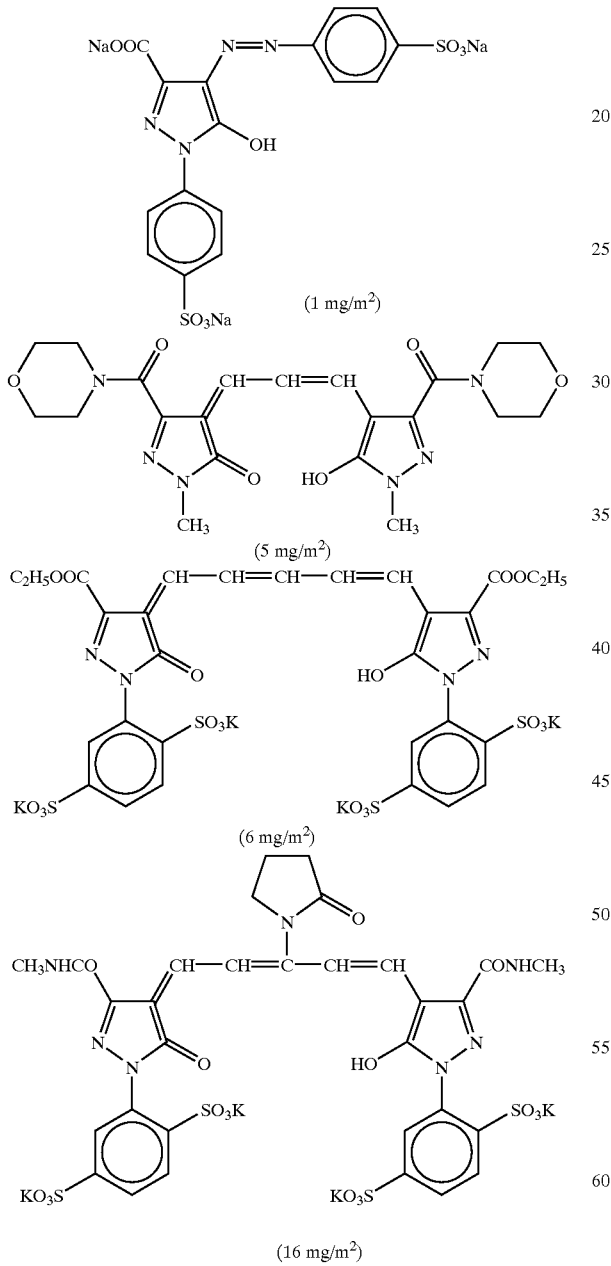

(Layer arrangement)
In the following, the layer arrangement will be shown. The numerals indicate the coated amounts in $g/m^2$, wherein the coating amount of silver halide is shown as the calculated silver amount.

Support; a paper base laminated with polyethylene resin layers [The polyethylene resin used in the laminated layer close to the first layer contains a white pigment (comprising 16% by weight of $TiO_2$ and 4% by weight of ZnO), a fluorescent whitening agent (4,4'-bis (5-methylbenzoxazolyl) stylbene (13 $mg/m^2$), and a blue-shade dye (ultramarine) (96 $mg/m^2$).]

| First layer (Blue-sensitive emulsion layer): | |
|---|---|
| Emulsion | 0.24 |
| Gelatin | 1.25 |
| Yellow coupler (ExY) | 0.57 |
| Dye image stabilizer (Cpd-1) | 0.07 |
| Dye image stabilizer (Cpd-2) | 0.04 |
| Dye image stabilizer (Cpd-3) | 0.07 |
| Dye image stabilizer (Cpd-4) | 0.02 |
| Solvent (Solv-1) | 0.21 |
| Second layer (Color mixing preventing layer): | |
| Gelatin | 0.60 |
| Color mixing preventing agent (Mid-1) | 0.10 |
| Color mixing preventing agent (Mid-2) | 0.18 |
| Color mixing preventing agent (Mid-3) | 0.02 |
| UV absorber (UV-C) | 0.05 |
| Solvent (Solv-5) | 0.11 |
| Third layer (Green-sensitive emulsion layer): | |
| Emulsion | 0.14 |
| Gelatin | 0.73 |
| Magenta coupler (ExM) | 0.15 |
| UV absorber (UV-A) | 0.05 |
| Dye image stabilizer (Cpd-2) | 0.02 |
| Dye image stabilizer (Cpd-3) | 0.008 |
| Dye image stabilizer (Cpd-4) | 0.08 |
| Dye image stabilizer (Cpd-5) | 0.02 |
| Dye image stabilizer (Cpd-6) | 0.009 |
| Dye image stabilizer (Cpd-7) | 0.0001 |
| Solvent (Solv-3) | 0.06 |
| Solvent (Solv-4) | 0.11 |
| Solvent (Solv-5) | 0.06 |
| Fourth layer (Color mixing preventing layer): | |
| Gelatin | 0.48 |
| Color mixing preventing agent (Mid-4) | 0.07 |
| Color mixing preventing agent (Mid-2) | 0.006 |
| Color mixing preventing agent (Mid-3) | 0.006 |
| UV absorber (UV-C) | 0.04 |
| Solvent (Solv-5) | 0.09 |
| Fifth layer (Red-sensitive emulsion layer): | |
| Emulsion | 0.12 |
| Gelatin | 0.59 |
| Cyan coupler (ExC-A) | 0.13 |
| Cyan coupler (ExC-B) | 0.03 |
| Color mixing preventing agent (Mid-3) | 0.01 |
| Dye image stabilizer (Cpd-5) | 0.04 |
| Dye image stabilizer (Cpd-8) | 0.19 |
| Dye image stabilizer (Cpd-9) | 0.04 |
| Solvent (Solv-5) | 0.09 |
| Sixth layer (UV absorbing layer): | |
| Gelatin | 0.32 |
| UV absorber | 0.42 |
| Solvent (Solv-7) | 0.08 |
| Seventh layer (Protective layer): | |
| Gelatin | 0.70 |
| Acrylic-modified poly(vinyl alcohol) (degree of modification = 17%) | 0.04 |
| Liquid paraffin | 0.01 |
| Surfactant (Cpd-13) | 0.01 |
| Poly(dimethylsiloxane) | 0.01 |
| Silicon dioxide | 0.003 |

(ExY) Yellow coupler
A 70:30 (in molar ratio) mixture of
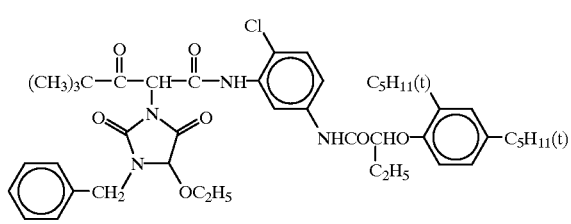
and
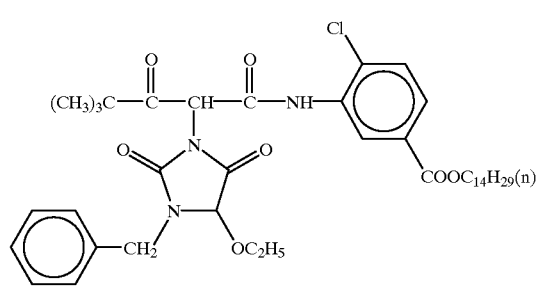
(ExM) Magenta coupler
A 40:40:20 (in molar ratio) mixture of
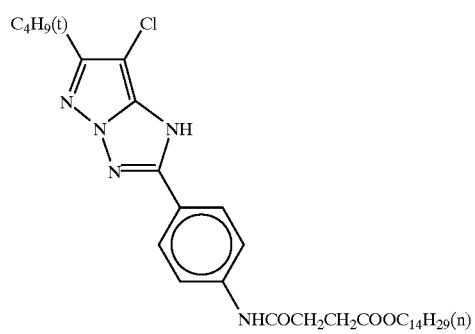
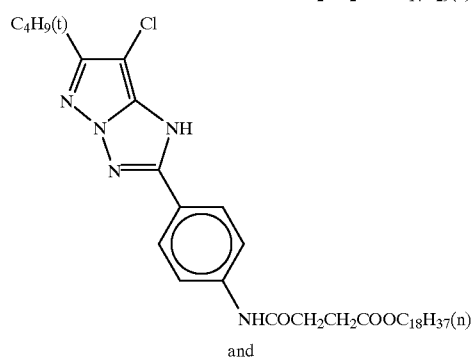
and
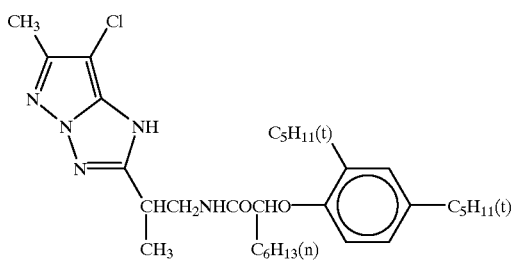
(ExC-A) Cyan coupler
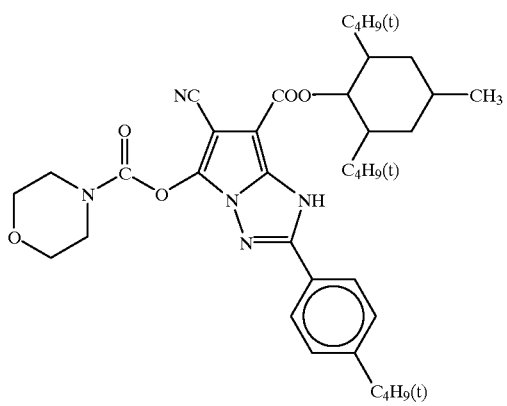
(ExC-B) Cyan coupler
A 50:25:25 (in molar ratio) mixture of
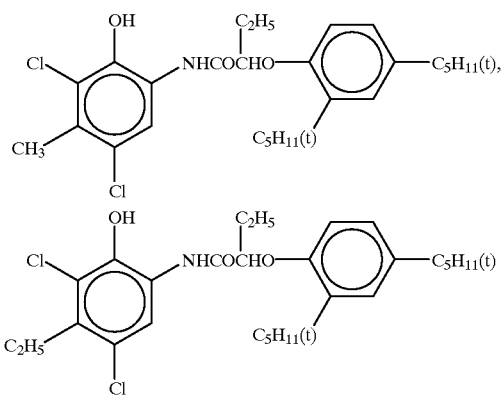
and
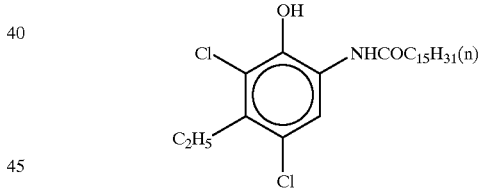
(Cpd-1) Dye image stabilizer
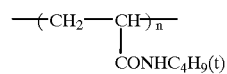
Number-averaged molecular weight=60,000
(Cpd-2) Dye image stabilizer
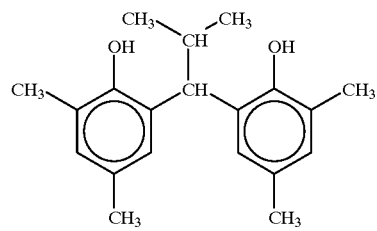

(Cpd-3) Dye image stabilizer
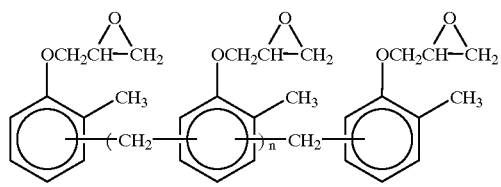
n = 7–8 in average value
(Cpd-4) Dye image stabilizer
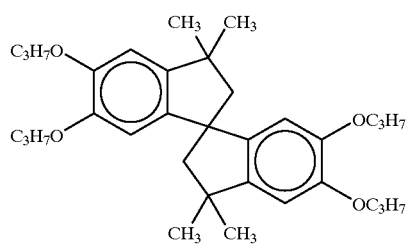
(Cpd-5) Dye image stabilizer
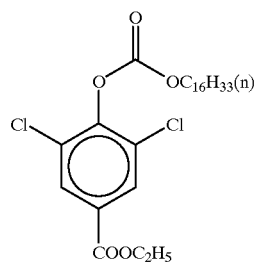
(Cpd-6) Dye image stabilizer
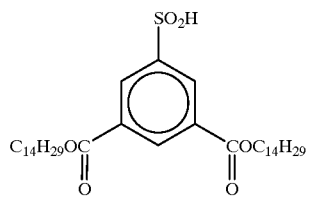
(Cpd-7) Dye image stabilizer
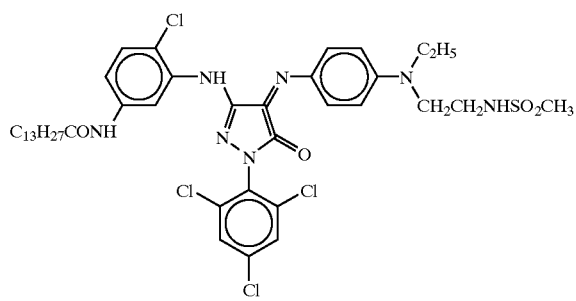
(Cpd-8) Dye image stabilizer
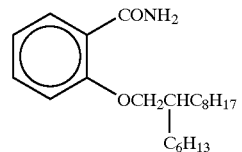
(Cpd-9) Dye image stabilizer
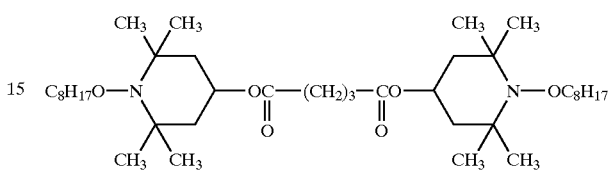
(Cpd-13) Surfactant
A 7:3 (in molar ratio) mixture of
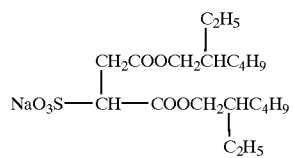
and
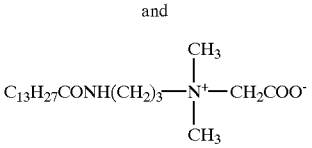
(Mid-1) Color mixing preventing agent
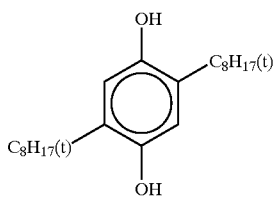
(Mid-2) Color mixing preventing agent
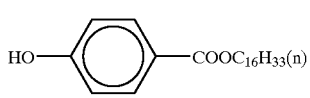
(Mid-3) Color mixing preventing agent
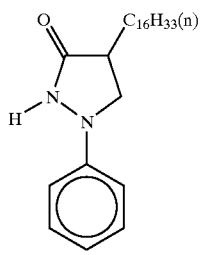

(Mid-4) Color mixing preventing agent

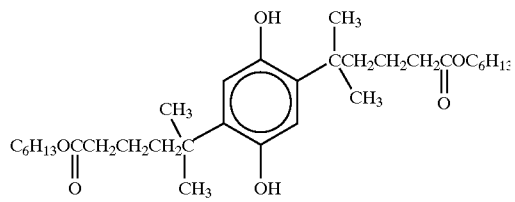

(Solv-1)

(Solv-3)

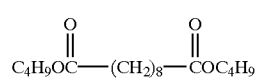

(Solv-4)

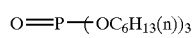

(Solv-5)

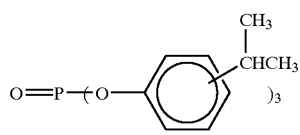

(Solv-7)

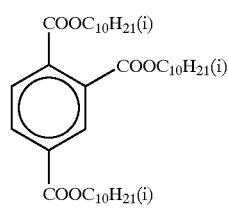

(UV-1) UV absorber

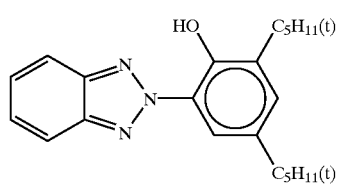

(UV-2) UV absorber

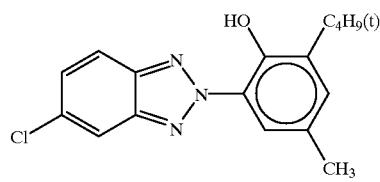

(UV-3) UV absorber

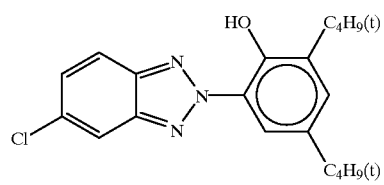

(UV-4) UV absorber

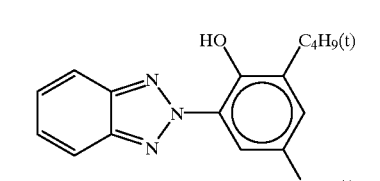

(UV-6) UV absorber

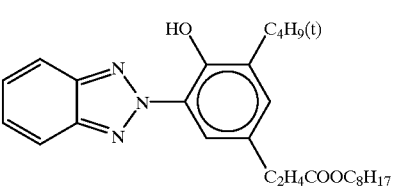

(UV-7) UV absorber

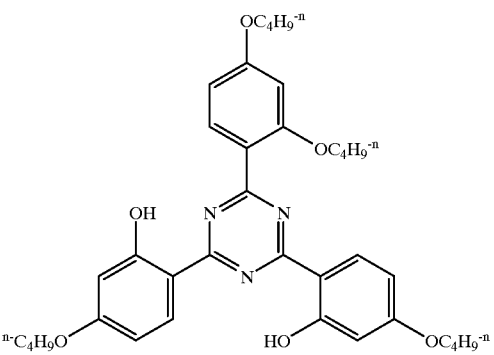

(UV-A): A mixture of UV-1, UV-2, UV-3 and UV-4 in 4/2/2/3 in weight ratio.
(UV-C): A mixture of UV-2, UV-3, UV-6 and UV-7 in 1/1/1/2 in weight ratio.

Via the procedures described heretofore, coated samples Nos. 101 to 129, and sample Nos. 101A to 129A were prepared.

(Exposure)

By using the following exposure apparatus installed with three laser sources of B, G and R, three, color-separated gradation patterns were exposed to the coated samples. The laser output conditions were optimized for each samples.
(Exposure apparatus)

For color exposure, 473 nm light obtained by converting the wavelength of 946 nm light from a YAG solid laser excited by a GaAlAs semiconductor laser (Oscillation wavelength=808.5 nm) with a $LiNbO_3$ SHG crystal having an inversion domain structure, 532 nm light obtained by converting the wavelength of 1064 nm light from a $YVO_4$ solid laser excited by a GaAlAs semiconductor laser (Oscillation wavelength=808.5 nm) with a $LiNbO_3$ SHG crystal having an inversion domain structure, and 680 nm light from an AlGaInP laser (No. LN9R20 made by Matsushita Electric Industries, Ltd.) were used. The intensity of each of the three laser beams was modulated with an AOM; the beam was moved along the direction perpendicular to the scanning direction with a polygon mirror so as to sequentially scanning-expose the entire area of the color photographic paper. The possible intensity fluctuation that might be caused by the temperature shift of the semiconductor lasers was suppressed by keeping the temperature of the lasers constant with the use of Peltier elements. The resolution of the scanning exposure was 600 dpi, and the beam diameters measured with a light beam diameter measuring apparatus [1180GP, a product of Beamscan Co., Ltd., USA] proved to be 65 μm for the three beams. The shape of the beams was substantially circular with a below 1% beam diameter difference along the main and sub-scanning directions.

(Processing; dry to dry=55 Sec)

The exposed sample pieces were then subjected to color development in which each processing step had the following conditions.

| Processing step | Temp. | time | Replenished amount* | Tank volume |
|---|---|---|---|---|
| Color dev. | 45° C. | 15 sec | 35 mL | 2 L |
| Blix | 40° C. | 15 sec | 38 mL | 1 L |
| Rinse-1 | 40° C. | 5 sec | — | 1 L |
| Rinse-2 | 40° C. | 5 sec | — | 1 L |
| Rinse-3 | 40° C. | 5 sec | 90 mL | 1 L |
| Drying | 80° C. | 10 sec | — | — |

(Rinse was carried out in a counter-flow method from Rinse-3 to Rinse-1.)
* The amount per 1 $m^2$ of photographic material.

In the above processing, the rinse water of Rinse-3 was pushed toward a reverse osmosis membrane, and the permeated water having passed through the membrane was supplied to Rinse-3 while the concentrated fraction not having passing through the membrance was returned to Rinse-2. To shorten the cross-over time, a blade was installed between the adjacent rinse baths, and color paper pieces were passed beneath the blades. In each processing step, the spraying device described in JP-A-8-314088 was used to spray each processing solution under circulation at a rate of 4-6 L/min in each tank.

The formulation of each processing solution is shown below.

| Color developer | Tank solution | Replenisher |
|---|---|---|
| Water | 700 ml | 700 ml |
| Disodium triisopropylnaphthalene (β) sulfonate | 0.1 g | 0.1 g |
| Ethylenediaminetetraacetic acid | 3.0 g | 3.0 g |
| Disodium 1,2-dihydroxybenzene-4,6-disulfonate | 0.5 g | 0.5 g |
| Triethanolamine | 12.0 g | 12.0 g |
| Potassium chloride | 15.8 g | — |
| Potassium bromide | 0.04 g | — |
| Potassium carbonate | 27.0 g | 27.0 g |
| Disodium N,N-bis(sulfonatoethyl) hydroxylamine | 18.0 g | 18.0 g |
| N-ethyl-N-(β-methanesulfonamideethyl)-3-methyl-4-aminoaniline sulfuric acid salt | 8.0 g | 23.0 g |
| Sodium bis(2,4-disulfonatoethyl-1,3,5-triazine-6-yl) diaminostylbene-2,2-disulfonate | 5.0 g | 6.0 g |
| Water to make | 1000 ml | 1000 ml |
| pH (25° C.) | 10.35 | 12.80 |

The blix solution was prepared by mixing the following first and second replenishers as follows.

| Blix solution | Tank solution | Replenished quantity (The quantity below, i.e., 38 ml in total is for 1 $m^2$.) |
|---|---|---|
| First replenisher | 260 ml | 18 ml |
| Second replenisher | 290 ml | 20 ml |
| Water to make | 1000 ml | |
| pH (25° C.) | 5.0 | |

The first and second replenishers had the following compositions.

| (First replenisher) | |
|---|---|
| Water | 150 ml |
| Ethylene bisguanidine nitric acid salt | 30 g |
| Ammonium sulfite monohydrate | 226 g |
| Ethylenediaminetetraacetic acid | 7.5 g |
| Triazinylaminostylbene type fluorescent whitening agent (Hakkol FWA-SF, a product of Showa Chemical Co.) | 1.0 g |
| Ammonium bromide | 30 g |
| Ammonium thiosulfate (700 g/L) | 340 ml |
| Water to make | 1000 ml |
| pH (25° C.) | 5.82 |
| (Second replenisher) | |
| Water | 140 ml |
| Ethylenediaminetetraacetic acid | 11.0 g |
| Fe(III) ammonium ethylenediaminetetraacetate | 384 g |
| Acetic acid (50%) | 230 ml |
| Water to make | 1000 ml |
| pH (25° C.) | 3.35 |

(Rinse solution)
Ion exchanged water (each concentration of Ca and Mg is 3 ppm or less)
(Comparative processing)

For the purpose of comparison, CP45-X processing of Fuji Photo Film Co., Ltd., in which the duration of water washing is shortened, the dry-to-dry time being 130 sec.

The total processing time of 130 sec consists of 45 sec for each of color development and blix, 20 sec for each of Rinse-1 and Rinse-2.

The reflection density of the processed samples were measured with a TCD reflection densitometer, a product of Fuji Photo Film Co., Ltd. The photographic speed (i.e., sensitivity) was determined from the exposure necessary to achieve a density of (1.0+the fog density). The speed for blue light was represented relatively to the reference speed of 100 for sample 101 subjected to the 130 sec processing.

The fog density consists of the sum of the density developed by couplers present in unexposed areas and that of the sensitizing dyes remaining in the material.

TABLE 1

(Photographic speed to blue light, fog level and the influence of solution storage of emulsion)

| Coated sample No. | Sensitizing Dye for Blue-sensitive emulsion (Added amount: × $10^{-4}$ mole/mole-Ag) | | 130 sec processing | | 130 sec processing (after solution storage) | | 55 sec processing | | Note |
|---|---|---|---|---|---|---|---|---|---|
| | | | Blue speed | Fog | Blue speed | Fog | Blue speed | Fog | |
| 101/101A | IV-9 (9.0) | | 100 | 0.25 | 84 | 0.36 | 110 | 0.40 | Comparative example |
| 102/102A | IV-1 (9.0) | | 107 | 0.22 | 92 | 0.27 | 110 | 0.35 | Comparative example |
| 103/103A | IV-2 (9.0) | | 104 | 0.21 | 91 | 0.25 | 108 | 0.33 | Comparative example |
| 104/104A | | II-26 (9.0) | 130 | 0.55 | 120 | 0.69 | 138 | 1.02 | Comparative example |
| 105/105A | | I-2 (9.0) | 144 | 0.07 | 128 | 0.18 | 155 | 0.19 | Comparative example |
| 106/106A | | I-12 (9.0) | 142 | 0.09 | 124 | 0.21 | 153 | 0.21 | Comparative example |
| 107/107A | I-2 (4.5) | I-12 (4.5) | 145 | 0.09 | 130 | 0.20 | 156 | 0.21 | Comparative example |
| 108/108A | IV-9 (5.4) | II-26 (3.6) | 120 | 0.44 | 105 | 0.59 | 128 | 0.76 | Comparative example |
| 109/109A | IV-9 (5.4) | I-2 (3.6) | 186 | 0.14 | 183 | 0.16 | 192 | 0.27 | Invention |
| 110/110A | IV-9 (5.4) | I-3 (3.6) | 184 | 0.15 | 183 | 0.18 | 191 | 0.29 | Invention |
| 111/111A | IV-9 (5.4) | I-12 (3.6) | 188 | 0.13 | 186 | 0.15 | 194 | 0.30 | Invention |
| 112/112A | IV-9 (5.4) | I-15 (3.6) | 180 | 0.12 | 179 | 0.13 | 193 | 0.28 | Invention |
| 113/113A | IV-1 (5.4) | II-26 (3.6) | 125 | 0.40 | 109 | 0.49 | 130 | 0.70 | Comparative example |
| 114/114A | IV-1 (5.4) | I-1 (3.6) | 195 | 0.15 | 193 | 0.17 | 205 | 0.27 | Invention |
| 115/115A | IV-1 (5.4) | I-2 (3.6) | 192 | 0.11 | 190 | 0.13 | 203 | 0.24 | Invention |
| 116/116A | IV-1 (5.4) | I-3 (3.6) | 192 | 0.08 | 190 | 0.10 | 204 | 0.20 | Invention |
| 117/117A | IV-1 (5.4) | I-4 (3.6) | 196 | 0.09 | 194 | 0.12 | 202 | 0.21 | Invention |
| 118/118A | IV-1 (5.4) | I-11 (3.6) | 200 | 0.07 | 199 | 0.09 | 205 | 0.22 | Invention |
| 119/119A | IV-1 (5.4) | I-12 (3.6) | 202 | 0.09 | 200 | 0.11 | 206 | 0.23 | Invention |
| 120/120A | IV-1 (5.4) | I-13 (3.6) | 198 | 0.08 | 196 | 0.09 | 202 | 0.22 | Invention |
| 121/121A | IV-1 (5.4) | I-14 (3.6) | 195 | 0.05 | 193 | 0.07 | 199 | 0.18 | Invention |
| 122/122A | IV-1 (5.4) | I-15 (3.6) | 198 | 0.06 | 196 | 0.08 | 204 | 0.19 | Invention |
| 123/123A | IV-1 (5.4) | I-18 (3.6) | 176 | 0.17 | 173 | 0.20 | 188 | 0.45 | Invention |
| 124/124A | IV-1 (5.4) | I-22 (3.6) | 179 | 0.18 | 175 | 0.22 | 190 | 0.49 | Invention |
| 125/125A | IV-2 (5.4) | II-26 (3.6) | 126 | 0.43 | 107 | 0.53 | 133 | 0.75 | Comparative example |
| 126/126A | IV-2 (5.4) | I-2 (3.6) | 197 | 0.13 | 195 | 0.14 | 204 | 0.26 | Invention |
| 127/127A | IV-2 (5.4) | I-3 (3.6) | 201 | 0.10 | 199 | 0.12 | 206 | 0.22 | Invention |
| 128/128A | IV-13 (5.4) | I-12 (3.6) | 204 | 0.11 | 201 | 0.12 | 208 | 0.25 | Invention |
| 129/129A | IV-13 (5.4) | I-15 (3.6) | 202 | 0.08 | 200 | 0.09 | 204 | 0.21 | Invention |

The results shown in Table 1 indicate that, separate use of the compound represented by formula (I) or the compound represented by formula (II) which in the present case involves formula (IV) as its lower concept not only fails to achieve a sufficient photographic speed (i.e., sensitivity) but also cannot prevent the aggregation of silver halide grains during solution storage, thus causing a drop of photographic speed as well as fog increase. These drawbacks were not solved by the use of two compounds both belonging to (I) or (II) Moreover, the use of one or two compounds belonging to (II) increased fog density caused by remaining sensitizing dyes particularly after rapid processing.

In a clear contrast, the combination use of a compound of (I) with that of (II) achieved a remarkable increase in photographic speed, an effective prevention of photographic properties from deterioration after solution storage, and the reduction of residual coloration (fog) after processing As is apparent from these results, it has been confirmed that, only by the combination use of a compound represented by formula (I) with that by (II), photographic emulsions can be obtained that have specifically high photographic speeds without deterioration of residual color, accompanying neither speed deterioration nor fog increase due to solution storage.

Example 2
(Preparation of an emulsion containing pure silver chloride {100} tabular grains)

In a reaction vessel were charged 1200 ml of water, 25 g of a bone gelatin subjected to deionization alkaline treatment and containing about 40 $\mu$mole/g methionine, 0.4 g of NaCl and 4.5 ml of IN nitric acid. The mixture showed a pH of 4.5, and was kept at 40° C. Under vigorous stirring, solution Ag-1 containing 0.2 g/ml AgNO$_3$ and solution X-1 containing 0.069 g/ml NaCl were added at 48 ml/min for 4 min. 15 sec after the addition, 150 ml of an aqueous solution of poly (vinyl alcohol) consisting of 6.7 g of the following PVA-1 and 1000 ml of water was added. PVA-1 has resulted the saponification of poly(vinyl alcohol) with a mean polymerization degree of 1700, having a mean saponification ratio of 98% or higher. Further, by adding 12.3 ml of IN nitric acid, the pH was adjusted to 3.5. After elevating the temperature of the content to 75° C. in 15 min, 23 ml of IN sodium hydroxide was added to make the pH 6.5. Then, 4.0 ml of 0.05% 1-(5-methylureidophenyl)-5-mercaptotetrazole solution and 4.0 ml of 1% aqueous N,N-dimethylimidazolidine 2-thion solution were added. After the silver potential relative to the (room temperature) saturated calomel electrode was adjusted to 100 mV by adding 4 g NaCl, a grain growing operation was performed by simultaneously adding solutions Ag-1 and X-1 in such a manner that the addition rate was increased linearly from 40 to 42 ml/min over 17 min of addition period under a constant silver potential of 100 mV. Then, the pH was set at 4.0 by adding 12.5 ml of 1 N nitric acid. After the addition of 28.8 g of NaCl and the adjustment of silver potential at 60 mV, sensitizing dyes I-3 and IV-9 were added in an amount of $3.6 \times 10^{-4}$ and $5.4 \times 10^{-4}$ mole per mole of silver, respectively, and solution Ag-2 containing 0.1 g/ml AgNO$_3$ and solution X-2 containing 0.0345 g/ml NaCl were simultaneously added at an flow rate of 40 ml/min for 5 min. After the addition, the content was left for 10 min at 75° C.

Then, the content was washed and desalted by flocculation washing at 40° C. The resulting emulsion was dispersed again after the addition of 100 g gelatin, and the pH and pAg were adjusted to 6.0 and 7.3, respectively. By sampling a part of the emulsion, transmission electron micrographs of replicated grain shapes were taken. According to the micrographs, it was confirmed that 90% of the total projected area of silver halide grains was occupied by tabular grains having {100} plane as the main surface. The mean grain size was 0.80 $\mu$m, the mean grain thickness was 0.10 $\mu$m, the mean aspect ratio was 7.8 and the mean adjacent side length ratio was 1.2.

The emulsion thus prepared was chemically sensitized and used for the preparation of coated samples in the same manner as in Example 1. Each resulting sample was subjected to sensitivity and pressure fog measurement. As in Example 1, the samples containing the sensitizing dyes of the present invention exhibited high photographic speeds (i.e., high sensitivity) and reduced pressure fog densities.

Example 3
(Preparation of sample 201)

By following the method of preparing sample 101 of Example 1 of JP-A-11-119365, a multi-layer color photographic material was prepared and designated sample 201. The photographic emulsions used in sample 201 are shown in Table 2

TABLE 2

(Silver halide grains in the emulsion and the sensitizing dyes used)

| Emulsion | Equiv. sphere-diameter (mm) | Coeff. of variation for equiv. circle Diameter (%) | Aspect ratio averaged over all grains | Iidide content (mole %) | Sensitizing dye Compound | Added amount ($\times 10^{-4}$ mole/ mole Ag) | Sensitizing dye Compound | Added amount ($\times 10^{-4}$ mole/ mole Ag) | Sensitizing dye Compound | Added amount ($\times 10^{-4}$ mole/ mole Ag) |
|---|---|---|---|---|---|---|---|---|---|---|
| A | 0.20 | 16 | 1.6 | 4.0 | III-15 | 8.1 | | | II-22 | 0.3 |
| B | 0.25 | 15 | 3.0 | 4.0 | III-15 | 8.9 | | | II-22 | 0.3 |
| C | 0.22 | 14 | 2.5 | 4.0 | III-15 | 8.8 | II-21 | 0.2 | II-22 | 0.2 |
| D | 0.35 | 10 | 3.6 | 4.0 | III-15 | 9.8 | II-21 | 0.3 | II-22 | 0.2 |
| E | 0.49 | 16 | 5.0 | 2.0 | III-15 | 6.7 | II-21 | 0.5 | II-22 | 0.2 |
| F | 0.15 | 15 | 1.0 | 3.5 | III-9 | 15.1 | III-10 | 1.5 | | |
| G | 0.23 | 14 | 1.9 | 3.5 | III-9 | 10.4 | III-10 | 2.0 | | |
| H | 0.32 | 11 | 2.4 | 3.5 | III-9 | 7.5 | III-10 | 1.4 | | |
| I | 0.28 | 11 | 4.5 | 3.3 | III-9 | 7.7 | III-10 | 1.4 | | |
| J | 0.40 | 16 | 4.0 | 3.3 | III-9 | 7.2 | III-10 | 1.4 | | |
| K | 0.59 | 20 | 5.9 | 2.8 | III-9 | 6.4 | III-10 | 1.2 | | |
| L | 0.24 | 14 | 3.4 | 4.6 | II-28 | 6.5 | IV-11 | 2.5 | | |
| M | 0.30 | 10 | 3.0 | 4.6 | II-28 | 6.2 | IV-11 | 2.0 | | |
| N | 0.40 | 9 | 4.5 | 1.6 | II-28 | 5.6 | IV-11 | 1.8 | | |
| O | 0.60 | 15 | 5.5 | 1.0 | II-28 | 4.0 | IV-11 | 1.5 | | |
| P | 0.80 | 18 | 2.5 | 1.0 | II-28 | 3.4 | IV-11 | 1.1 | | |

Note 1) All the emulsions in the table are silver iodobromide type chemically sensitized with gold, sulfur and selenium sensitizers.

Note 2) To all the emulsions in the table, the sensitizing dyes were added prior to chemical sensitization.

Note 3) All the emulsions in the table were properly added with compounds F-5, F-7, F-8, F-9, F-10, F-11, F-12, F-13 and F-14 disclosed in JP-A-11-119365.

Note 4) All the emulsions in the table comprise three-layer structured tabular grains. Among them, the grains in emulsions A, B, I and J have the main plane of (100) while those in the other emulsions have the main plane of (111).

Note 5) In emulsions A, B, E, F, I and P, the surface sensitivity is higher than the internal sensitivity.

Note 6) Emulsions E, I and P consist of grains in which silver chloride was grown epitaxially after chemical sensitization.

Note 7) In the grains contained in the emulsions in the table except emulsions A, E and F, at least 50 dislocation lines per one grain were observed by transmission electron microscope photograph.

(Preparation and evaluation of Sample 200 and Samples 202 to 211)

By replacing sensitizing dyes III-15 and II-21 incorporated in emulsions A to E used in sample 201 with other dyes as shown in Table 3, samples 202 to 211 were prepared. Further, bye liminating the two dyes described above, dye blank sample 200 was prepared. It is noted that samples 202, 203 and 210 in the table do not contain dyes corresponding to II-21 of sample 201.

Each sample piece was given sensitometric stepped exposures through a gray wedge with 1/100 sec exposure time at 20 CMS, then processed in the following steps, and subjected to sensitometry. The level of residual coloration was determined by subtracting the cyan stain density of dye blank sample 200 from that of each processed sample piece. The stain density was measured with an X-RITE densitometer in status A.

The RMS graininess of each sample was measured by exposing the sample through a pattern for RMS measurement with a halogen lamp of 3200° K color temperature as light source, processing it in the following manner, and performing micro-densitometry with a micro-densitometer using 48 μm diameter scanning aperture.

(Processing)

| Processing step | Time | Temp. | Tank volume | Replenished amount |
|---|---|---|---|---|
| First dev. | 6 min | 38° C. | 12 L | 2200 ml/m² |
| First rinse | 2 min | 38° C. | 4 L | 7500 ml/m² |
| Reversal | 2 min | 38° C. | 4 L | 1100 ml/m² |
| Color dev. | 6 min | 38° C. | 12 L | 2200 ml/m² |
| Pre-bleachmin | | 38° C. | 4 L | 1100 ml/m² |
| Bleach | 6 min | 38° C. | 2 L | 220 ml/m² |
| Fix | 4 min | 38° C. | 8 L | 1100 ml/m² |
| Second rinse | 2 min | 38° C. | 8 L | 7500 ml/m² |
| Final rinse | 1 min | 25° C. | 2 L | 1100 ml/m² |

The composition of each processing solution is the same as those described in Example 1 of JP-A-11-119365.

Table 3 shows the sensitometric data and the evaluation results of residual color and graininess. Relative photographic speeds to red light were compared in terms of the relative exposure amount required to obtain (1.0+the minimum density). The speed of sample 202 was set to 100. RMS graininess was measured at the uniform density (D=0.7) area of the cyan image and expressed relatively to the reference value of 100 for sample 202. In this expression, smaller values correspond to less grainy images.

TABLE 3

Photographic speed to red light, cyan residual color and graininess)

| Coated sample No. | Sensitizing dyes | | Red sensitivity | Cyan residual color | RMS graininess | Note |
|---|---|---|---|---|---|---|
| 200 | None | None | — | 0 (Stand.) | — | Blank |
| 201 | III-15 | II-21 | 105 | 0.092 | 88 | Comparative example |
| 202 | III-15 | None | 100 (Stand.) | 0.032 | 100(Stand.) | Comparative example |
| 203 | III-1 | None | 98 | 0.022 | 97 | Comparative example |
| 204 | III-15 | II-15 | 107 | 0.065 | 86 | Comparative example |
| 205 | III-15 | I-33 | 154 | 0.033 | 69 | Invention |
| 206 | III-1 | I-27 | 175 | 0.023 | 66 | Invention |
| 207 | III-1 | I-28 | 190 | 0.025 | 62 | Invention |
| 208 | III-1 | I-33 | 168 | 0.021 | 67 | Invention |
| 209 | III-2 | I-33 | 163 | 0.026 | 63 | Invention |
| 210 | I-31 | None | 106 | 0.022 | 102 | Comparative example |
| 211 | I-31 | I-33 | 103 | 0030 | 93 | Comparative example |

As is apparent in Table 3, separate use of the compound represented by formula (I) or the compound represent by formula (II) which in the present case involves formula (III) as its lower concept not only fails to achieve a sufficient photographic speed but also suffers from the graininess deterioration probably caused by the aggregation of silver halide grains. When two compounds both belonging to either (I) or (II) are used, photographic speed did not improve with a fair improvement in graininess level. Moreover, in the latter case, residual color (i.e., coloration after processing) increased.

In contrast, the combination use of a compound of (I) with that of (II), which features the present invention, achieved a remarkable increase in photographic speed and reduction of graininess. Moreover, residual color did not deteriorate.

As is apparent from these results, it has been confirmed that only by the combination use of a compound represented by formula (I) with a compound represented by formula (II), preferable photographic emulsions can be obtained that have specifically high photographic speeds with low graininess without causing residual color to increase.

Example 4

(Preparation of sample 301)

By following the method of preparing sample 101 of Example 1 of JP-A-11-305396, a multi-layer color photographic material was prepared and designated sample 301. However, the sensitizing dyes in Example 1 of JP-A-11-305396 were replaced as follows.

ExS-1→Dye II-21

ExS-2 →Dye II-22

ExS-3 →Dye III-15

ExS-4 →Dye III-10

ExS-5 →Dye II-30

ExS-6 →Dye III-9

ExS-7 →Dye II-16

ExS-8 →Dye III-8

ExS-9 →Dye IV-7

ExS-10 →Dye II-31

The silver iodide content of grains, the grain size and the iodide content at grain surface are shown in Table 4.

TABLE 4

(Characteristics of the emulsions used)

| Emulsion | Mean iodide content (mole %) | Coeff. Of variation for distribution among grains (%) | Mean grain size (equiv. sphere-diam. (μm) | Coeff. of variation for equiv. sphere-grain size (%) | Projection area diam. (equiv. circle-diam. (μm) | Aspect ratio (diam./thickness) | Iodide content at grain surface (mole %) | Grain shape |
|---|---|---|---|---|---|---|---|---|
| A | 3.9 | 20 | 0.37 | 19 | 0.40 | 2.7 | 2.3 | Tabular |
| B | 5.1 | 17 | 0.52 | 21 | 0.67 | 5.2 | 3.5 | Tabular |
| C | 7.0 | 18 | 0.86 | 22 | 1.27 | 5.9 | 5.2 | Tabular |
| D | 4.2 | 17 | 1.00 | 18 | 1.53 | 6.5 | 2.8 | Tabular |
| E | 7.2 | 22 | 0.87 | 22 | 1.27 | 5.7 | 5.3 | Tabular |
| F | 2.6 | 18 | 0.28 | 19 | 0.28 | 1.3 | 1.7 | Tabular |
| G | 4.0 | 17 | 0.43 | 19 | 0.58 | 3.3 | 2.3 | Tabular |
| H | 5.3 | 18 | 0.52 | 17 | 0.79 | 6.5 | 4.7 | Tabular |
| I | 5.5 | 16 | 0.73 | 15 | 1.03 | 5.5 | 3.1 | Tabular |
| J | 7.2 | 19 | 0.93 | 18 | 1.45 | 5.5 | 5.4 | Tabular |
| K | 1.7 | 18 | 0.40 | 16 | 0.52 | 6.0 | 2.1 | Tabular |
| L | 8.7 | 22 | 0.64 | 18 | 0.86 | 6.3 | 5.8 | Tabular |
| M | 7.0 | 20 | 0.51 | 19 | 0.82 | 5.0 | 4.9 | Tabular |
| N | 6.5 | 22 | 1.07 | 24 | 1.52 | 7.3 | 3.2 | Tabular |
| O | 1.0 | — | 0.07 | — | 0.07 | 1.0 | — | Homogeneous structure |
| P | 0.9 | — | 0.07 | — | 0.07 | 1.0 | — | Homogeneous structure |

In table 4, (1) Emulsions L to O were subjected to reduction sensitization during grain formation with thiourea dioxide and thiosulfonic acid according to the examples of JP-A-2-191938.

(2) Emulsions A to O were subjected to sulfur and selenium sensitizations according to the examples of JP-A-3-237450 under the presence of the sensitizing dyes used in the examples and sodium thiocyanate.

(3) For the preparation of tabular grains, a low molecular weight type of gelatin was used according to the examples of JP-A-1158426.

(4) In the tabular grains contained in the emulsions, dislocation lines similar to those described in JP-A-3-237450 was observed with the use of a high voltage electron microscope.

(Preparation of samples 302 to 304)

The procedures for the preparation of sample 301 were repeated to prepare samples 302 to 304 except that the sensitizing dyes in the tenth and eleventh layers were replaced with those shown in Table 5.

(Preparation of samples 305 to 308)

The coating solutions for the tenth and eleventh layers used for samples 301 to 304 were agitated for 12 hr after preparation. Then, they were coated in the same manner to provide samples 305 to 308.

By the following procedures, the photographic speed, the fog and the influence of solution storage of emulsion were evaluated.

Each sample was given 1/100 sec sensitometric exposures through a continuous wedge coupled with a gelatin filter SC-50, a product of Fuji Photo Film Co., Ltd. with a light source of 4800° K. color temperature, and subjected to the following color development.

(Processing)

| Process step | Processing time | Processing temperature |
|---|---|---|
| Color development | 3 min 15 sec | 38° C. |
| Bleach | 3 min 00 sec | 38° C. |
| Water rinse | 30 sec | 24° C. |
| Fix | 3 min 00 sec | 38° C. |
| Water rinse (1) | 30 sec | 24° C. |
| Water rinse (2) | 30 sec | 24° C. |
| Stabilization | 30 sec | 38° C. |
| Drying | 4 min 20 sec | 55° C. |

The composition of each processing solution is the same as described in Example 1 of JP-A-11-305396.

The magenta density was measured for samples 301 to 308 processed by the procedures described above.

The photographic speed is relatively expressed by the reciprocal of the exposure needed to achieve a density of (0.2+the fog density) to a reference value of 100 for sample 301. The fog density consists of the sum of the density developed by couplers present in unexposed areas and that of the sensitizing dyes remaining in the material.

TABLE 5

(Photographic speed to green light, and residual color)

| Sample | Dyes used in 10th and 11th layers (added amount: x 10⁻⁴ mole/mole Ag) | | | Green speed (relative) | Magenta fog | Note |
|---|---|---|---|---|---|---|
| 301 | III-10 (0.53, | II-16 (1.5, | III-8 (6.3, | 100 | 0.092 | Comparative example |
| 305 (Stored as solution) | 0.41) | 1.1) | 4.9) | 83 | 0.124 | |
| 302 | III-10 (0.53, | I-30 (1.5, | III-8 (6.3, | 125 | 0.036 | Invention |
| 306 (Stored as solution) | 0.41) | 1.1) | 4.9) | 122 | 0.044 | |
| 303 | III-10 | I-34 | III-8 | 135 | 0.042 | Invention |

TABLE 5-continued (Photographic speed to green light, and residual color)

| Sample | Dyes used in 10th and 11th layers (added amount: × $10^{-4}$ mole/mole Ag) | | | Green speed (relative) | Magenta fog | Note |
|---|---|---|---|---|---|---|
| 307 (Stored as solution) | (0.53, 0.41) | (1.5, 1.1) | (6.3, 4.9) | 131 | 0.052 | |
| 304 | III-10 | I-35 | III-8 | 140 | 0.057 | Invention |
| 308 (Stored as solution) | (0.53, 0.41) | (1.5, 1.1) | (6.3, 4.9) | 137 | 0.065 | |

As is apparent from the results in Table 5, peculiarly only when a compound represented by formula (I) is jointly used with that by formula (II) which in the present case involves formula (III) as its lower concept, high speed, low coloration silver halide photographic emulsions result in contrast to those shown as comparative examples in which the compound belonging to (II) is solely used. The silver halide photographic emulsions of the present invention secure their desirable features of high speed and low fog even after stored in a dissolved state, which can be attributed to effective prevention of grain aggregation.

As is apparent from these results, it has been confirmed that, only by the combination use of a compound represented by formula (I) with that by (II), preferable photographic emulsions can be obtained that have specifically high photographic speeds with low graininess even after solution storage without causing residual color to increase.

Example 5
(Preparation of an octahedral silver bromide emulsion (Emulsion A) and tabular silver bromide emulsions (Emulsions B and C))

A reaction vessel charged with 1000 ml of water, 25 g of deionized bone gelatin, 15 ml of aqueous 50% $NH_4NO_3$, and 7.5 ml of aqueous 25% ammonium, was heated to 50° C. To the vessel, 750 ml of 1 N aqueous $AgNO_3$ solution and 1 mole/l aqueous KBr solution were added in 50 min under stirring and with −40 mV silver potential kept constant over the addition period. The obtained silver bromide consisted of octahedral grains having an equivalent sphere diameter of 0.846±0.036 μm. The emulsion was cooled and added with a copolymer of isobutene and maleic acid mono-sodium salt as flocculating agent. The flocculate was washed with water for desalting. Next, 9 g of a deionized bone gelatin and 430 ml water were added to the resulting emulsion. After the pH and pAg were adjusted to 6.5 and 8.3 at 50° C., respectively, the emulsion was chemically sensitized to achieve an optimum speed with the addition of potassium thiocyanate, chloroauric acid and sodium thiosulfate followed by ripening at 55° C. for 50 min. The final product is named Emulsion A.

In 1.2 L of water, 6.4 g of KBr and 6.2 g of a low molecular weight gelatin having a mean molecular weight of 15000 or less were dissolved. To the resulting solution kept at 30° C. were added 8.1 ml of 16.4% aqueous $AgNO_3$ solution and 7.2 ml of 23.6% aqueous KBr solution for 10 sec by double jet method. With a further addition of 11.7% aqueous gelatin solution, the solution was heated to 75° C. and ripened for 40 min. Then, with maintaining the silver potential at −20 mV, 370 ml of 32.2% aqueous $AgNO_3$ solution and 20% aqueous KBr solution were added for 10 min. After one minute physical ripening, the temperature was lowered to 35° C. A pure silver bromide, mono-disperse emulsion of 1.15 specific gravity resulted, in which the mean grain diameter based on projection area was 2.32 μm, the mean grain thickness was 0.09 μm and the coefficient of variation for the diameter was 15.1%. After the water-soluble salts were removed by flocculation method, the emulsion temperature was raised to 40° C., 45.6 g of gelatin, 10 ml of 1 mole/L aqueous sodium hydroxide solution, 167 ml of water and 1.66 ml of 35% phenoxyethanol were added, and the pAg and the pH were adjusted to 8.3 and 6.20, respectively.

The resulting emulsion was ripened to achieve an optimized photographic speed at 55° C. for 50 min with the addition of potassium thiocyanate, chloroauric acid and sodium thiosulfate. The final product is named Emulsion B.

Emulsion C was obtained by replacing the combination of potassium thiocyanate, chloroauric acid and sodium thiosulfate to another combination of potassium thiocyanate, chloroauric acid, pentafluorophenyl-diphenylphosphine selenide and sodium thiosulfate for chemical sensitization.

The emulsion thus obtained was added with the dyes shown in Table 6 at 50° C., followed by 30 min stirring. Then the emulsions were agitated for 60 min at 60° C.

After added with a gelatin hardener and a coating aid, the emulsion was coated on a cellulose acetate film support simultaneously with a protective layer in such a manner that the coated weight of silver becomes 3.0 g/m². As a result, samples 401 to 409 were obtained. Each samples was exposed for 1 sec through a continuous wedge coupled with a color filter to a light source of tungsten lamp of 2854° K color temperature. The color filter used for the exposure was Fuji gelatin filter SC-46, a product of Fuji Photo Film Co., Ltd., which cuts the light having wavelengths of not longer than 460 nm, thus being capable of exciting only the dye-sensitized spectral region. The exposed pieces were developed with the following surface developer MAA-1 for 10 min at 20° C., and then fixed with the fixing solution below. Finally, the pieces were washed with water and dried.

| (Surface developer MAA-1) | |
|---|---|
| Methol | 2.5 g |
| L-ascorbic acid | 10 g |
| Nabox (a product of Fuji Photo Film) | 35 g |
| Potassium bromide | 1 g |
| Water to make | 1000 ml |
| PH | 9.8 |
| (Fixing solution) | |
| Ammonium thiosulfate | 170 g |
| Sodium sulfite, anhydrous | 15 g |
| Boric acid | 7 g |
| Glacial acetic acid | 15 ml |
| Potassium alum | 20 g |
| Ethylenediaminetetraacetic acid | 0.1 g |
| Tartaric acid | 3.5 g |
| Water to make | 1000 ml |

The optical density of each samples was measured with a Fuji's automatic densitometer, and the speed was expressed in terms of the reciprocal of the exposure necessary to give a density of (0.2+fog), and relatively to the reference value of 100 for sample 401.

The results are shown in Table 6.

TABLE 6

(Comparison of grain shape and the effect of selenium sensitization)

| Sample | Emulsion (Grain shape, chemical sensitization) | Dye (added amount: mole/mole Ag) | Speed | Fog | Note |
|---|---|---|---|---|---|
| 401 | A (octahedral, S-sensitized) | IV-1 ($5.0 \times 10^{-4}$) | 100 | 0.05 | Comparative example |
| 402 | A | I-12 ($5.0 \times 10^{-4}$) | 110 | 0.04 | Comparative example |
| 403 | A | IV-1 ($3.0 \times 10^{-4}$) I-12 ($2.0 \times 10^{-4}$) | 138 | 0.03 | Invention |
| 404 | B (tabular, S-sensitized) | IV-1 ($8.0 \times 10^{-4}$) | 140 | 0.09 | Comparative example |
| 405 | B | I-12 ($8.0 \times 10^{-4}$) | 154 | 0.04 | Comparative example |
| 406 | B | IV-1 ($4.8 \times 10^{-4}$) I-12 ($3.2 \times 10^{-4}$) | 205 | 0.03 | Invention |
| 407 | C (tabular, Se-sensitized) | IV-1 ($8.0 \times 10^{-4}$) | 159 | 0.15 | Comparative example |
| 408 | C | I-12 ($8.0 \times 10^{-4}$) | 171 | 0.05 | Comparative example |
| 409 | C | IV-1 ($4.8 \times 10^{-4}$) I-12 ($3.2 \times 10^{-4}$) | 233 | 0.04 | Invention |

As is apparent from Table 6, the emulsions containing a compound represented by formula (I) and the one by (II) are superior in photographic speed as well as fog level compared with those spectrally sensitized with a dye belonging to (I) alone or with one belonging to (II) alone. Such tendency is more prominent in tabular than octahedral grain emulsions, and in selenium-sensitized than sulfur-sensitized emulsions. Accordingly, sample 409 that is the combination of those more prominent cases achieved a remarkable photographic speed and a very low coloration.

Again, the combination use of compounds represented by formula (I) with those by formula (II) can specifically result in high speed, low residual color emulsions, and such preferable effects are enhanced by applying the present invention to tabular grain emulsions and for selenium-sensitized ones.

Example 6

Emulsions 1 to 4 were prepared by the following method.
(1) Preparation of Emulsion 1:

To an aqueous gelatin solution comprising 1200 ml of water, 7.0 g of a gelatin having a mean molecular weight of 15000 and 4.5 g of KBr kept at 30° C., 1.9M $AgNO_3$ aqueous solution and 1.9 M of KBr aqueous solution were added under stirring by double jet method at a feeding rate of 25 ml/min for 70 sec. Tabular grain nuclei were obtained. To 400 ml of the resulting emulsion which is used as the seeds for crystal growth, 650 ml of an aqueous gelatin solution containing 20 g of an inert gelatin and 1.2 g of KBr was added. The solution was heated to 75° C., at which temperature it was ripened for 40 min. Then, an aqueous $AgNO_3$ solution containing 1.7 g of $AgNO_3$ was added in 1 min 30 sec followed by the addition of 7.0 ml of 50% by weight aqueous $NH_4NO_3$ solution and the addition of 7.0 ml of 25% by weight aqueous ammonia. The solution was further ripened for 40 min.

To the emulsion added with 3N nitric acid to make the pH 7, 1.0 g of KBr was added. Then, 366.5 ml of 1.9M $AgNo_3$ aqueous solution and a KBr aqueous solution, further 53.6 ml of 1.9 M $AgNO_3$ aqueous solution and another KBr aqueous solution containing 33.3 mole % KI, and still further 160.5 ml of 1.9 M $AgNO_3$ aqueous solution and a KBr aqueous solution were added with the pAg kept constant at 7.9 throughout the triple additions. The final product is named Emulsion 1.

The resulting Emulsion 1 consisted of three-layer structured grains in which the middle shell had the highest silver iodide content. The mean aspect ratio was 2.8 and tabular grains having an aspect ratio of not lower than 3 occupied 26% of the total projected area. The coefficient of variation for grain size was 7%, and the mean equivalent sphere grain diameter of the grain was 0.98 μm.

After desalting by ordinary flocculation method, Emulsion 1 was added with the sensitizing dyes shown in Table 8, and under the presence of the dyes, subjected to optimally controlled gold, sulfur and selenium sensitization.
(2) Preparation of Emulsions 2 and 3:

To an aqueous gelatin solution comprising 1200 ml of water, 7.0 g of a gelatin having a mean molecular weight of 15000 and 4.5 g of KBr kept at 30° C., 1.9M $AgNO_3$ aqueous solution and 1.9M KBr aqueous solution were added under stirring by double jet method at a feeding rate of 25 ml/min for 70 sec. Tabular grain nuclei were obtained. To 350 ml of the resulting emulsion which is used as the seeds for crystal growth, an aqueous gelatin solution containing 20 g of an inert gelatin and 1.2 g of KBr was added by 650 ml. The solution was heated to 75° C., at which temperature it was ripened for 40 min. Then, an aqueous $AgNO_3$ solution containing 1.7 g of $AgNO_3$ was added in 1 min 30 sec followed by the addition of 6.2 ml of 50% (by weight) aqueous $NH_4NO_3$ solution and of 6.2 ml of 25% (by weight) aqueous ammonia. The solution was further ripened for 40 min. The obtained emulsion is named A. From Emulsion A, Emulsions 2 and 3 were prepared via two different procedures as follows.

Emulsion 2 was prepared by adding 1.0 g of KBr to emulsion A that had been added with 3N $HNO_3$ to adjust the pH to 7.0, then adding 366.5 ml of 1.9M $AgNO_3$ aqueous solution and a KBr aqueous solution, next 53.6 ml of 1.9M $AgNO_3$ aqueous solution and another KBr aqueous solution containing 33.3 mole % KI, and finally 160.5 ml of 1.9M $AgNO_3$ aqueous solution and a KBr aqueous solution with keeping the pAg constant at 8.3 throughout the triple additions.

Emulsion 3 was prepared by adding 1.2 g of KBr to emulsion A that had been added with 3N $HNO_3$ to adjust the pH to 7.0, then adding 366.5 ml of 1.9M $AgNO_3$ aqueous solution and a KBr aqueous solution, next 53.6 ml of 1.9M $AgNO_3$ aqueous solution and another KBr aqueous solution containing 33.3 mole % KI, and finally 160.5 ml of 1.9M $AgNO_3$ aqueous solution and a KBr aqueous solution with keeping the pAg constant at 8.8 throughout the triple additions.

Emulsion 2 thus prepared consisted of three-layer structured grains in which the middle shell had the highest silver iodide content. The mean aspect ratio was 6.7 and tabular grains having aspect ratios of not lower than 6 occupied 80% of the total projected area, and those with an aspect ratio of from 3 to 100 occupied 95% of the total projected area. The coefficient of variation for grain size was 11%, and the mean equivalent sphere grain diameter was 1.00 μm.

Emulsion 3 thus prepared consisted of three-layer structured grains in which the middle shell had the highest silver iodide content. The mean aspect ratio was 8.8 and tabular grains having aspect ratios not lower than 6 occupied 90% of the total projected area, and those with aspect ratios of from 3 to 100 occupied 97% of the total projected area. The coefficient of variation for grain size was 13%, and the mean equivalent sphere grain diameter was 1.13 μm.

After desalting by ordinary flocculation method, each of Emulsion 2 and 3 was added with the sensitizing dyes shown in Table 8, and under the presence of the dyes, subjected to optimally controlled gold, sulfur and selenium sensitization.

(3) Preparation of emulsion 4:

To 1500 ml of 0.8% aqueous gelatin solution containing a gelatin having a mean molecular weight of 15000 and 0.05 mole KBr, 15 ml of 0.5M $AgNO_3$ aqueous solution and 15 ml of 0.5M KBr aqueous solution were added under stirring by double jet method for 15 sec. During the addition, the solution was kept at 40° C. The pH of the solution was 5.0. After the addition, the temperature of the solution was elevated to 75° C. After 220 ml of 10% trimeritated gelatin (the degree of modification being 95%) solution was added, the resulting solution was ripened for 20 min. Then, 80 ml of 0.47M $AgNO_3$ solution was added.

After further ripened for 10 min, 150 g of $AgNO_3$ and a KBr solution containing 5 mole % KI were added by control double jet method in such a manner that pBr is kept at 2.55, the flow rate of addition was accelerated by 19 times from the start to the end of addition, and the silver potential was kept at 0 mV. After the addition, 30 ml of 10% KI solution was added. After the pH adjustment to 7.2 with 1 N NaOH, 327 ml of 0.5M $AgNO_3$ solution and 16.4 ml of a $10^{-2}$M potassium ferrocyanide salt solution were added. Next, 327 ml of 0.5M KBr solution was added by control double jet in 20 min at 0 mV potential (shell formation). The emulsion was cooled to 35° C., and washed with water by ordinary flocculation method. At 40° C., 80 g of a deionized alkali-treated bone gelatin and 40 ml of 2% $Zn(NO_3)_2$ solution were added. After the pH and pAg of the dissolved emulsion was adjusted to 6.5 and 8.6, respectively, the emulsion was stored in a cool dark place.

The tabular grains in Emulsion 4 had a coefficient of variation of equivalent circle diameter of 15%, the equivalent circle diameter of 2.5 μm, the mean thickness of 0.10 μm (hence, the aspect ratio being 25) and consisted of silver iodobromide containing 5.7 mole % silver iodide.

After desalted by ordinary flocculation method, each of Emulsion 4 was added with the sensitizing dyes shown in Table 8, and under the presence of the dyes, subjected to optimally controlled gold, sulfur and selenium sensitization.

(4) Preparation of coated samples:

On a triacetyl cellulose film base provided with a subbing layer, the emulsion layer and the protective layer shown in Table 7 were coated to obtain samples 501 to 508.

TABLE 7

(Emulsion coating conditions)

(1) Emulsion layer

| | | |
|---|---|---|
| Emulsions 1 to 4 (See Table 8 as for added dyes.) | Silver amount: | $2.1 \times 10^{-2}$ mole/m$^2$ |
| The following coupler | | $1.5 \times 10^{-3}$ mole/m$^2$ |

(2) Protective layer

| | |
|---|---|
| Gelatin | 1.80 g/m$^2$ |
| 2,4-dichloro-6-hydroxy-s-triazine Na salt | 0.08 g/m$^2$ |

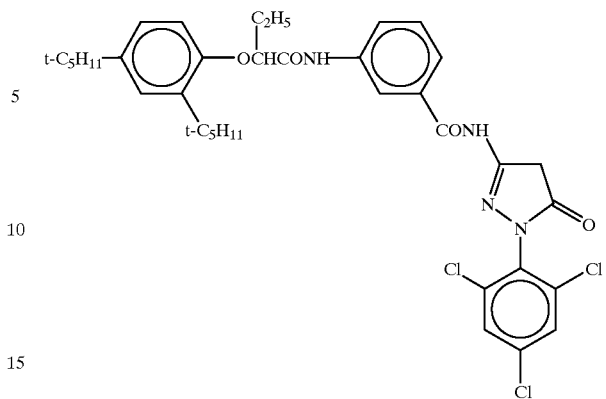

These samples were given sensitometric exposures (1/100 sec), and then subjected to color development.

| Process step | Time | Temp. | Replenished amount | Tank volume |
|---|---|---|---|---|
| Color dev. | 2 min 45 sec | 38° C. | 33 ml | 20 L |
| Blix | 6 min 30 sec | 38° C. | 25 ml | 40 L |
| Water rinse | 2 min 10 sec | 24° C. | 1200 ml | 20 L |
| Fix | 4 min 20 sec | 38° C. | 25 ml | 30 L |
| | | | Counterflow from (2) to (1) | 10 L |
| Water rinse (1) | 1 min 05 sec | 24° C. | 1200 ml | 10 L |
| Water rinse (2) | 1 min 00 sec | 24° C. | 25 ml | 10 L |
| Stabilization | 1 min 05 sec | 38° C. | | |
| Drying | 4 min 20 sec | 55° C. | | |

The replenished amount in the table is the value per 35 mm width, 1 m long processed area.

The replenished amount in the table is the value per 35 mm width, 1 m long processed area.

Next, the compositions of the processing solutions will be described.

| | Tank solution(g) | Replenisher(g) |
|---|---|---|
| (Color developer) | | |
| Diethylenetriaminepentaacetic acid | 1.0 | 1.1 |
| 1-Hydroxyethylidene-1,1-disulfonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfuric acid salt | 2.4 | 2.8 |
| 4-[N-ethyl-N-b-hydroxyethylamino]-2-methylaniline sulfuric acid salt | 4.5 | 5.5 |
| Water to make | 1000 ml | 1000 ml |
| pH | 10.05 | 10.05 |
| (Bleaching solution) | | |
| Ethylenediaminetetraacetic acid ion (III) sodium salt trihydrate | 100.0 | 120.0 |
| Ethylenediaminetetraacetic acid disodium salt | 10.0 | 11.0 |
| Ammonium bromide | 140.0 | 160.0 |

-continued

|  | Tank solution(g) | Replenisher(g) |
|---|---|---|
| Ammonium nitrate | 30.0 | 35.0 |
| Aqueous ammonia (27%) | 6.5 ml | 4.0 ml |
| Water to make | 1000 ml | 1000 ml |
| pH | 6.0 | 5.7 |
| (Fixing solution) | | |
| Ethylenediaminetetraacetic acid sodium salt | 0.5 | 0.7 |
| Sodium sulfite | 7.0 | 8.0 |
| Sodium bisulfite | 5.0 | 5.5 |
| Aqueous ammonium sulfate (70%) | 170.0 ml | 200.0 ml |
| Water to make | 1000 ml | 1000 ml |
| pH | 6.7 | 6.6 |
| (Stabilizing solution) | | |
| Formalin (37%) | 2.0 ml | 3.0 ml |
| Polyoxyethylene-p-monononyl phenyl ether (mean degree of polymerization = 10) | 0.3 | 0.45 |
| Ethylenediaminetetraacetic acid disodium salt | 0.05 | 0.08 |
| Water to make | 1000 ml | 1000 ml |
| pH | 5.8 to 8.0 | 5.8 to 8.0 |

The processed samples were subjected to density measurement by using a green filter for photographic speed determination.

The photographic speed is relatively expressed by the reciprocal of the exposure needed to achieve a density of (0.2+fog density) to a reference value of 100 for sample 501.

The emulsions and the sensitizing dyes used in the samples are shown in Table 8 together with the photographic speeds.

TABLE 8

(Effects of the aspect ratio of tabular grain)

| Sample | Emulsion (Mean aspect ratio) | Sensitizing dye (Added amount: × 10⁻⁴ mole/mole Ag) | | | Photogr. Speed | Note |
|---|---|---|---|---|---|---|
| 501 | 1 (2.8) | III-8 (3.1) | III-10 (0.26) | II-16 (0.72) | 100 | Comparative example |
| 502 | 1 (2.8) | III-8 (3.1) | III-10 (0.26) | I-35 (0.72) | 150 | Invention |
| 503 | 2 (6.7) | III-8 (4.1) | III-10 (0.34) | II-16 (0.95) | 113 | Comparative example |
| 504 | 2 (6.7) | III-8 (4.1) | III-10 (0.34) | I-35 (0.95) | 173 | Invention |
| 505 | 3 (8.8) | III-8 (5.3) | III-10 (0.45) | II-16 (1.2) | 124 | Comparative example |
| 506 | 3 (8.8) | III-8 (5.3) | III-10 (0.45) | I-35 (1.2) | 214 | Invention |
| 507 | 4 (25) | III-8 (7.1) | III-10 (0.59) | II-16 (1.6) | 130 | Comparative example |
| 508 | 4 (25) | III-8 (7.1) | III-10 (0.59) | I-35 (1.6) | 223 | Invention |

Table 8 indicates that the emulsions containing a compound represented by formula (I) and the one by (II) are far superior in photographic speed compared with those spectrally sensitized with a dye belonging to (II) alone. In general, the photographic speed of tabular emulsions becomes higher with larger aspect ratios, and the speed increase is remarkable with the emulsions of the present invention containing tabular grains with an aspect ratio of not lower than 8.

As is apparent from the results described above, the combination use of compounds represented by formula (I) with those by formula (II) can specifically result in high speed emulsions, and such preferable effects are enhanced with the use of tabular grains having large aspect ratios, in particular 8 or larger.

EFFECT OF THE INVENTION

By using the formulation of the present invention, silver halide photographic emulsions provided with high solution storage stability, and those provided with high photographic speeds and low graininess and exhibiting low residual coloration even after rapid processing can be prepared.

While the present invention has been described in detail and with reference to specific embodiments thereof, it will be apparent to one skilled in the art that various changes and modifications can be made therein without departing from the sprit and scope thereof.

What is claimed is:

1. A silver halide photographic material comprising at least one silver halide photographic emulsion layer provided on a support, wherein said emulsion layer contains at least one sensitizing methine dye compound represented by formula (I) and at least one sensitizing methine dye compound represented by formula (II):

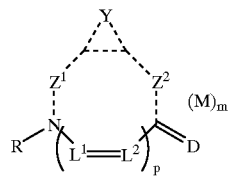

wherein Y represents an atomic group necessary to form a heterocyclic ring or an atomic group necessary to form a benzene ring condensed with a heterocyclic ring, which may further be condensed with another carbocyclic ring or another heterocyclic ring or may be substituted; $Z^1$ and $Z^2$ each represents an atomic group or a single bond necessary to form a nitrogen-containing heterocyclic ring which may be further condensed with another carbocyclic ring or heterocyclic ring or may be substituted; R represents an alkyl group, an aryl group or a heterocyclic ring; D represents a group necessary to form said sensitizing methine dye; $L^1$ and $L^2$ each represents a methine group; p is an integer of 0 or 1; M represents a counter ion and m is an integer of 0, or 1 or more necessary to neutralize the charge of the molecule:

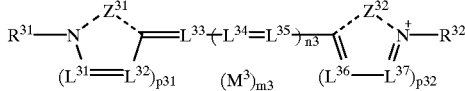

wherein $Z^{31}$ and $Z^{32}$ each represents an atomic group necessary to form a nitrogen-containing heterocyclic ring which may be condensed with an aromatic or non-aromatic carbocyclic ring and may be substituted, provided that the atomic group is not condensed with an aromatic or non-aromatic heterocyclic ring; $R^{31}$ and $R^{32}$ each represents an alkyl group, an aryl group or a heterocyclic ring; $L^{31}$, $L^{32}$, $L^{33}$, $L^{34}$, $L^{35}$, $L^{36}$ and $L^{37}$ each represents a methine group; $p^{31}$ and $p^{32}$ each represents an integer of 0 or 1; $n^3$ represents an integer of 0, 1, 2, 3 or 4; $M^3$ represents a counter ion and $m^3$ is an integer of 0 or 1 or more necessary to neutralize the charge of the molecule.

2. The silver halide photographic material as claimed in claim 1, wherein Y in formula (I) represents an atomic group necessary to form a pyrrole ring, a furan ring or a thiophene ring that may be condensed with a carbocyclic ring or a heterocyclic ring and may be substituted, or an atomic group necessary to form a benzene ring condensed with a pyrrole ring, a furan ring or a thiophene ring.

3. The silver halide photographic material as claimed in claim 1, wherein the formula (I) is chosen from formula (Ia)

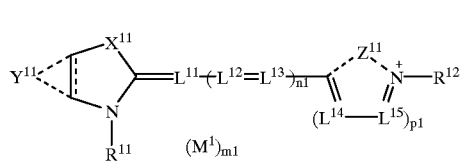

wherein $Y^{11}$ represents an atomic group necessary to form a pyrrole ring, a furan ring, a thiophene ring, an indole ring, a benzofuran ring or a benzothiophene ring, which may be further condensed with a carbocyclic ring or a heterocyclic ring and may be substituted; $X^{11}$ represents an oxygen atom, a sulfur atom, a selenium atom or $NR^{13}$; $R^{11}$, $R^{12}$ and $R^{13}$ each represents an alkyl group, an aryl group or a heterocyclic ring; $Z^{11}$ represents an atomic group necessary to form a nitrogen-containing heterocyclic ring, which may be further condensed with a heterocyclic ring and may be substituted; $L^{11}$, $L^{12}$, $L^{13}$, $L^{14}$ and $L^{15}$ each represents a methine group; $p^1$ represents an integer of 0 or 1; $n^1$ represents an integer of 0, 1, 2, 3 or 4; $M^1$ represents a counter ion and $m^1$ is an integer of 0 or 1 or more necessary to neutralize the charge of the molecule.

4. The silver halide photographic material as claimed in claim 1, wherein the formula (I) is chosen from formula (Ib):

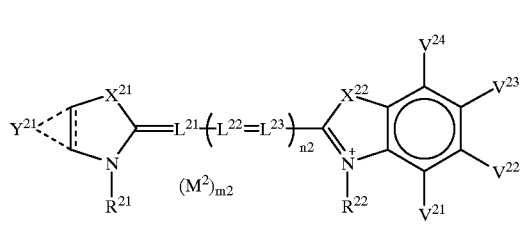

wherein $Y^{21}$ represents an atomic group necessary to form a pyrrole ring, a furan ring or a thiophene ring, which may be further condensed with a carbocyclic ring or a heterocyclic ring and maybe substituted; $X^{21}$ and $X^{22}$ each represents an oxygen atom, a sulfur atom, a selenium atom or $NR^{23}$; $R^{21}$, $R^{22}$ and $R^{23}$ each represents an alkyl group, an aryl group or a heterocyclic ring; $V^{21}$, $V^{22}$, $V^{23}$ and $V^{24}$ each represents a hydrogen atom or a substituent, provided that the adjacent two substituents are not linked together to form a saturated or unsaturated condensed ring; $L^{21}$, $L^{22}$ and $L^{23}$ each represents a methine group; $n^2$ represents an integer of 0, 1, 2, 3 or 4; $M^2$ represents a counter ion and $m^2$ is an integer of 0 or 1 or more necessary to neutralize the charge of the molecule.

5. The silver halide photographic material as claimed in claim 1, wherein the formula (II) is chosen from formula (IIa):

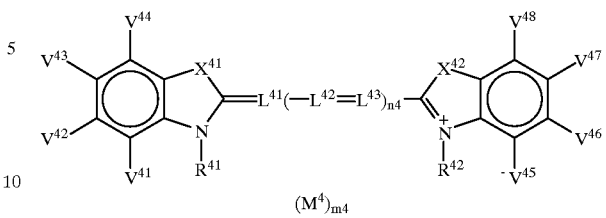

wherein $X^{41}$ and $X^{42}$ each represents an oxygen atom, a sulfur atom, a selenium atom or $NR^{43}$; $V^{41}$, $V^{42}$, $V^{43}$, $V^{44}$, $V^{45}$ $V^{46}$, $V^{47}$, and $V^{48}$ each represents a hydrogen atom or a substituent, provided that the adjacent two substituents may be linked together to form a saturated or unsaturated condensed ring; $R^{41}$, $R^{42}$ and $R^{43}$ each represents an alkyl group, an aryl group or a heterocyclic ring; $L^{41}$, $L^{42}$ and $L^{43}$ each represents a methine group; $n^4$ represents an integer of 0, 1, 2, 3 or 4; $M^4$ represents a counter ion and $m^4$ is an integer of 0 or 1 or more necessary to neutralize the charge of the molecule.

6. The silver halide photographic material as claimed in claim 1, wherein the formula (II) is chosen from formulae (III) and (IV):

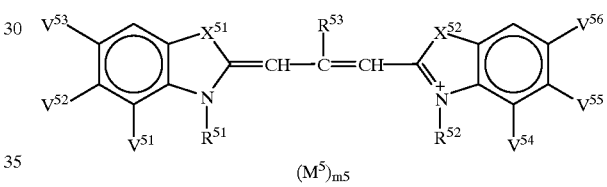

wherein $X^{51}$ and $X^{52}$ each represents an oxygen atom or a sulfur atom; $V^{51}$, $V^{52}$, $V^{53}$, $V^{54}$, $V^{55}$ and $V^{56}$ each represents a hydrogen atom or a substituent, provided that the adjacent two substituents are not linked together to form a saturated or unsaturated condensed ring; $R^{51}$, $R^{52}$ and $R^{53}$ each represents an alkyl group, an aryl group or a heterocyclic ring; $M^5$ represents a counter ion and $m^5$ is an integer of 0 or 1 or more necessary to neutralize the charge of the molecule;

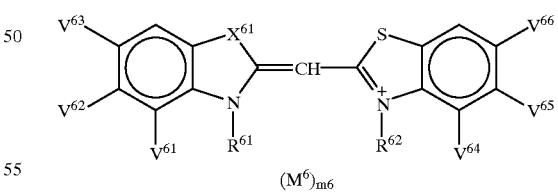

wherein $X^{61}$ represents an oxygen atom or a sulfur atom; $V^{61}$, $V^{62}$, $V^{63}$, $V^{64}$, $V^{65}$ and $V^{66}$ each represents a hydrogen atom or a substituent, provided that the adjacent two substituents are not linked together to form a saturated or unsaturated condensed ring; $R^{61}$ and $R^{62}$ each represents an alkyl group, an aryl group or a heterocyclic ring; $M^6$ represents a counter ion and $m^6$ is an integer of 0 or 1 or more necessary to neutralize the charge of the molecule.

7. The silver halide photographic material as claimed in claim 1, wherein the emulsion of said emulsion layer contains silver halide grains at least 50% of the total projected area of which is tabular grains with an aspect ratio of not lower than 2.

8. The silver halide photographic material as claimed in claim 1, wherein said emulsion layer contains an emulsion subjected to selenium sensitization.

9. The silver halide photographic material as claimed in claim 1, wherein the emulsion of said emulsion layer contains silver halide grains comprising at least 80 mole % of silver chloride and at least 80% of the total projected area of the silver halide grains is tabular grains with an aspect ratio of not lower than 2.

10. The silver halide photographic material as claimed in claim 9, wherein the tabular grains contain at least 0.1 mole % of silver iodide, and has an outermost layer containing 1 to 6 mole % of silver iodide based on the total amount of silver.

11. A method for forming an image by carrying out an image exposure and photographic processing for a silver halide photographic material having at least one silver halide emulsion layer provided on a support, wherein said silver halide photographic material is the one recited in claim 10 and the total processing time of said photographic material is not longer than 75 sec.

12. The method for forming an image as claimed in claim 11, wherein the image exposure is carried out by scanning exposure based on digital signals.

* * * * *